(12) United States Patent
Wright et al.

(10) Patent No.: US 12,424,081 B2
(45) Date of Patent: Sep. 23, 2025

(54) SMART LOCK

(71) Applicant: TeamOfDefenders LLC, Crossroads, TX (US)

(72) Inventors: Nathan W. Wright, Oak Point, TX (US); Mark A. Cieri, Flower Mound, TX (US); Kevin Stacey, Mansfield, TX (US); Daniel Yadov, Rosharon, TX (US)

(73) Assignee: TeamOfDefenders LLC, Denton, TX (US)

( * ) Notice: Subject to any disclaimer, the term of this patent is extended or adjusted under 35 U.S.C. 154(b) by 130 days.

(21) Appl. No.: 18/332,720

(22) Filed: Jun. 10, 2023

(65) Prior Publication Data

US 2024/0127655 A1    Apr. 18, 2024

Related U.S. Application Data

(63) Continuation-in-part of application No. 17/969,116, filed on Oct. 19, 2022, and a continuation-in-part of
(Continued)

(51) Int. Cl.
*G08B 29/00* (2006.01)
*G07C 9/33* (2020.01)
(Continued)

(52) U.S. Cl.
CPC .............. *G08B 25/10* (2013.01); *G07C 9/33* (2020.01); *G08B 13/19602* (2013.01); *H04L 9/3239* (2013.01)

(58) Field of Classification Search
CPC .............. G08B 25/10; G08B 13/19602; G08B 13/19613; G08B 19/00; G08B 29/181;
(Continued)

(56) References Cited

U.S. PATENT DOCUMENTS 10,475,115 B2    11/2019  Minsley
2009/0256676 A1*  10/2009  Piccirillo ........... G07C 9/00309
                                                                340/5.65
(Continued)

OTHER PUBLICATIONS

DaVinci Lock; https://www.davincilock.com/ . No date.

*Primary Examiner* — Anh V La
(74) *Attorney, Agent, or Firm* — Eric Kelly

(57) ABSTRACT

An electromechanical Smart Lock is unlocked by the Smart Lock timely receiving a time sensitive access-code that solves a cryptographic hash algorithm (e.g., SHA-3 or the like) running on that Smart Lock. To enable this functionality, the Smart Lock knows at least three items of information: status of a countdown timer, its cryptographic hash algorithm, and its unique identifier. Further, the Smart Lock may have various elements for receiving the time sensitive access-code, such as, but not limited to, a QR code camera, a barcode scanner, a camera, a microphone, a keypad, and/or optionally, an antenna(s)/radio(s) for RFID/NFC inputs to the Smart Lock. Server(s) may also know the same three items of information for each given Smart Lock; and the Server(s) may provide time sensitive access-codes to (authorized) user(s) and/or to their devices. Users may request, receive, and/or send the time sensitive access-codes via text messaging (or other elements).

42 Claims, 23 Drawing Sheets

Related U.S. Application Data application No. 16/926,041, filed on Jul. 10, 2020, now Pat. No. 11,688,271.

(60) Provisional application No. 63/457,953, filed on Apr. 7, 2023, provisional application No. 63/457,380, filed on Apr. 5, 2023, provisional application No. 63/416,707, filed on Oct. 17, 2022, provisional application No. 63/351,261, filed on Jun. 10, 2022.

(51) Int. Cl.
    *G08B 13/196*      (2006.01)
    *G08B 25/10*      (2006.01)
    *H04L 9/32*      (2006.01)

(58) Field of Classification Search
CPC ...... G08B 29/188; G08B 25/009; G07C 9/33; H04L 9/3239; H04L 12/2803; H04N 7/181
USPC ............. 340/506, 500, 517, 522, 539.1
See application file for complete search history.

(56) References Cited

U.S. PATENT DOCUMENTS

| | | | | |
|---|---|---|---|---|
| 2013/0335193 A1* | 12/2013 | Hanson | ............. | G07C 9/00174 |
| | | | | 340/5.61 |
| 2014/0375422 A1* | 12/2014 | Huber | ................ | G07C 9/00571 |
| | | | | 340/5.61 |
| 2019/0287096 A1* | 9/2019 | Wah | ................... | G06Q 20/3674 |
| 2019/0371105 A1* | 12/2019 | Ye | ........................ | H04W 12/61 |

* cited by examiner

SMART LOCK

PRIORITY NOTICE

The present (instant) U.S. nonprovisional patent application claims priority under 35 U.S.C. § 119(e) to the following four U.S. provisional patent applications: (1) application Ser. No. 63/351,261 filed on Jun. 10, 2022; (2) application Ser. No. 63/416,707 filed on Oct. 17, 2022; (3) application Ser. No. 63/457,380 filed on Apr. 5, 2023; and (4) application Ser. No. 63/457,953 filed on Apr. 7, 2023; wherein all the disclosures of which are all incorporated herein by reference in their entireties; wherein all of these four U.S. provisional patent applications, as well as the current U.S. nonprovisional patent application, all share at least the same two inventors of Nathan W. Wright and Mark A. Cieri.

The present (instant) U.S. nonprovisional patent application claims priority under 35 U.S.C. § 120 to U.S. nonprovisional patent application Ser. No. 16/926,041 filed on Jul. 10, 2020, the disclosure of which is incorporated herein by reference in its entirety. The present (instant) U.S. nonprovisional patent application is a continuation-in-part (CIP) of U.S. nonprovisional patent application Ser. No. 16/926,041 filed on Jul. 10, 2020.

The present (instant) U.S. nonprovisional patent application claims priority under 35 U.S.C. § 120 to U.S. nonprovisional patent application Ser. No. 17/969,116 filed on Oct. 19, 2022, the disclosure of which is incorporated herein by reference in its entirety. The present (instant) U.S. nonprovisional patent application is a continuation-in-part (CIP) of U.S. nonprovisional patent application Ser. No. 17/969,116 filed on Oct. 19, 2022.

STATEMENT REGARDING FEDERAL SPONSORSHIP

No part of this invention was a result of any federally sponsored research.

TECHNICAL FIELD OF THE INVENTION

The present invention relates in general to physical locks; and more specifically to physical smart locks with electronics that may utilize a cryptographic and/or a cryptological hashing algorithm as a means for unlocking (and/or locking) the given smart lock; as well as, electronic devices that may be configured and/or updated by receiving an access code.

COPYRIGHT AND TRADEMARK NOTICE

A portion of the disclosure of this patent application may contain material that is subject to copyright protection. The owner has no objection to the facsimile reproduction by any-one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Use of traditional purely mechanical locks requires one to physically possess a physical key to unlock that purely mechanical lock, and/or for one to remember a combination to unlock that purely mechanical lock, and/or requires one to safely and securely store the physical key and/or the combination. Generally, people do not desire and/or do not prefer to keep and maintain (additional) physical keys, especially as a quantity of locks increases. Also, generally, people do not desire and/or do not prefer to remember a combination to a physical lock; and/or generally, people do not desire and/or do not prefer to safely and securely store a combination to a physical lock. It would be desirable if traditional purely mechanical locks had a simple, convenient, efficient, safe, and secure electronic means of unlocking (and/or locking) the physical locks such that the user does not have to use a physical key to unlock the lock nor does the user have to manually enter a combination (that needs to be remembered and/or safely stored) on mechanical wheels to unlock the given physical lock. Rather it would be convenient if the user could use an electronic means to unlock (and/or lock) the physical lock with some-thing that the user already carries and/or uses, such as, but not limited to, a smartphone (or the like). Such an electronic unlocking and/or locking means could be beneficial when multiple people must have access to the same physical lock and/or especially if some users are (relatively) temporary users.

The market has responded to this need by providing a variety of prior art "smart" locks, namely wired prior art "smart" locks and battery powered prior art "smart" locks.

The wired prior art "smart" locks are generally wired to the building's (preexisting) wired electrical power distribution infrastructure and because these wired prior art "smart" locks essentially always have access to electrical power and because of this, these wired prior art "smart" locks tend to use power hungry wireless communication protocols (e.g., Bluetooth) that utilize more electrical power than desired as compared to battery powered prior art "smart" locks, which should consider minimizing electrical loads to preserve battery life. These wired prior art "smart" locks either use power hungry wired communication protocols such as but not limited to, ethernet, or increasingly use wireless communication protocols that are also significantly power utilizing in protocol execution, such as, but not limited to, WiFi, ZiBee, and Bluetooth to communicate with and control these prior art wired "smart" locks. These types of wired prior art "smart" locks are increasingly used in front doors of homes and residences. To unlock, the user uses their smartphone (or the like) to wirelessly communicate with the wired prior art "smart" lock via the local WiFi network of the given residence (building) or directly via point-to-point communications with Bluetooth (after Bluetooth pairing has been setup and executed between the resident user's smartphone and the smart lock itself).

The battery powered prior art "smart" locks generally utilize direct point-to-point communications between the given smartphone and the given prior art "smart" lock to unlock, e.g., by using direct point-to-point communication means such as, but not limited to, Bluetooth, ZigBee, RFID, NFC, and/or mesh technology (e.g., BLE). With these battery powered prior art "smart" locks there are wireless communications going both ways, i.e., from the smartphone to the lock and from the lock to the smartphone, i.e., the wireless communications are bidirectional and/or two-way. Some such battery powered prior art "smart" locks also use WiFi.

The battery powered prior art "smart" locks often have one or more of the following undesirable problems: (1) longevity friction; (2) poor sustained connectivity reliability; (3) locks that are too physically large and/or too physically bulky due to inherent size of embedded/included electronics and/or its battery; (4) too complex to install, setup, and/or use; (5) too expensive to implement and/or maintain; combinations thereof; and/or the like. The wired prior art "smart" locks generally have the same problems as the battery powered prior art "smart" locks except for the lack of longevity problem.

Longevity friction refers to the problem that the wireless communications utilized by the battery powered prior art "smart" locks generally drain the batteries too quickly which then renders the battery powered prior art "smart" locks unusable. Thus, battery powered prior art "smart" locks are unreliable, the user does not know if the battery powered prior art "smart" lock will work or not due to this battery draining problem. Additionally, the complexity to re-charge or replace the battery is not accessible, not convenient, and/or simply too costly.

Poor sustained connectivity reliability is an inherent problem of relying upon wireless communications of some form between the smartphone (or the like) and the prior art "smart" lock for unlocking, as all current forms of wireless communications can suffer from signal strength problems, signal loss, signal degradation, signal interference, blocked signals, band-width problems, handshake problems, and/or the like. Poor connectivity problems make use of the prior art "smart" locks unreliable and/or unstable. The exact same prior art "smart" lock may work well in one location but terrible in a different location and the user does not know in advance if their desired use location might work adequately or not. Lack of wireless connectivity can leave the user attempting to access the space in a frustrating or even detrimental situation. For businesses that offer access as a service, the support challenges of connectivity can be further detrimental.

Because battery powered prior art "smart" locks have the longevity friction problem, providers of such battery powered prior art "smart" locks have tried to solve that problem by making the battery powered prior art "smart" locks bigger with larger and heavier batteries, which in turn has led to battery powered prior art "smart" locks that are too large and/or too bulky and/or too expensive for many applications and that cannot be miniaturized for certain applications that require a smaller footprint. For example, many padlocks and cabinet locks need to be relatively small and compact as compared to a lock for an entry door to a home or a business. Battery powered prior art "smart" padlocks are large and bulky, essentially having the characteristics of a brick, in terms of size, shape, and weight.

The prior art "smart" locks reliance on wireless communications, (local/direct) pairing, a mobile app (e.g., that may require local/direct pairing and/or that is required for local provisioning), and/or direct point-to-point wireless communications between a smartphone (or the like) and the given prior art "smart" lock for lock unlocking adds undesirable complexity with respect to installation, setup, and/or use of the given prior art "smart" lock for many would be users and as such many would be users opt to not implement such prior art "smart" locks. In other words, the prior art "smart" locks reliance on (two-way and/or bidirectional) wireless communications, (local/direct) pairing, a mobile app (e.g., that may require local/direct pairing), and/or direct point-to-point wireless communications between a smartphone (or the like) and the given prior art "smart" lock thus requires direct and often local provisioning between the given end-user smartphone and the given prior art "smart" lock. "Provisioning" may be a term of art in the electronic/computing devices industry that may refer to an initial setup and configuration of a given electronic/computing device before use of the given electronic/computing device as its intended to be used. Because these prior art "smart" locks use wireless communications going both ways (both directions), i.e., from the smartphone to the lock and from the lock to the smartphone, direct provisioning needs to occur first for such bi-directional wireless communications to be enabled. And often the users who are willing to deal with this added complexity have to hire outside assistance for the installation, setup, provisioning, learning how to use, and/or to troubleshoot future problems when pairing fails and/or the mobile app does not work as intended. Further, both the prior art "smart" lock and the new user must be onboarded and authenticated. The prior art "smart" lock has to be physically installed on the premises; the prior art "smart" lock must be powered up (e.g., which may require prior battery charging); the prior art "smart" lock must be added to the existing WiFi network; if the prior art "smart" lock is a 2.4 GHz device then undesired and/or unnecessary network security vulnerabilities may be introduced; Bluetooth must be enabled on the user's smartphone (or the like); often Bluetooth pairing is needed between that prior art "smart" lock and the user's smartphone (or the like); a user account needs to be setup; the user needs to download and use a mobile app for that prior art "smart" lock, etc. Communications between the new user and customer service of the prior art "smart" lock provider are often needed. Furthermore, after the initial set-up is done, users often forget to leave their Bluetooth radio on or if they decide to enable another approved user to access the lock, the complexity to have the additional user also then provision to that lock and/or download and set-up the mobile app is often onerous and plagued with issues, including technical/customer support issues for the provider of the locking solution. As such, reliance on (bidirectional) wireless communications between a smartphone (or the like) and the given prior art "smart" lock for lock unlocking adds undesirable complexity.

Further, reliance on wireless communications between a smartphone (or the like) and the given prior art "smart" lock for lock unlocking adds undesirable costs to the prior art "smart" lock as this requires use of wireless communications hardware in the prior art "smart" locks themselves (e.g., radios, antennas, NFC/RFID circuit, Bluetooth chipsets, the software [e.g., drivers, APIs, etc.] to run that hardware, and/or the like) and has ongoing maintenance costs with respect to maintaining the wireless networks.

Further, from a prior art perspective there are prior art "smart" locks that require use of an associated (paired and/or provisioned) mobile app that bidirectionally communicates with the given prior art "smart" lock and/or that generates access codes locally within the given mobile app.

Also, from a prior art perspective there are prior art "cloud-managed physical/mechanical combination padlocks," such as taught in U.S. utility patent 10,475,115, which may be marketed as the "DaVinci Lock." These types of prior art locks are not relevant to the present invention because these types of locks are entirely mechanical with no electronics whatsoever. These prior art locks contain a unit ID and an associated combination for unlocking purpose, wherein such information is stored in the cloud and can be provided to end-users on demand based on a rule set. While combinations are stored centrally (in the cloud) and the physical lock distribution can be randomly distributed, each physical lock has only one combination thereby limiting protection and re-use of the lock. The combination of the given physical lock also cannot be changed dynamically nor randomly in a remote fashion, both of which are undesired characteristics. Such cloud-managed physical/mechanical combination padlocks can only provide near real-time enabling of access, but cannot provide real-time disabling of access.

Additionally, in the self-storage industry there is the practice of "overlocking" or lock outs, wherein when a given self-storage unit tenant breaches their lease/rental agreement (such as, but not limited, timely failing to pay the appropriate amount of rent), the lease/rental agreement permits the self-storage facility operator/manager to restrict access to that given tenant. This access restriction is typically done by "overlocking," wherein the self-storage facility operator/manager may replace the tenant's lock with a new/different lock that the given tenant does not have access to or places an overlock around the tenant's lock that prevents the given tenant from accessing their own lock. If that given tenant fails to timely cure the defect, then the contents of that self-storage unit may be sold (auctioned). Whereas, if the given tenant does timely cure the defect, then access to the self-storage unit is provide to the given tenant.

From a prior art perspective, the overlock has been implemented in a variety of ways. Below four examples prior art overlocking are noted.

In the first example, the self-storage facility operator/manager uses a standard (non-electronic) padlock, with physical key for access, and places that company-owned padlock over the tenant's latch/hasp which either has the tenant's own padlock or cylinder lock. This is the least expensive physical cost approach but requires a lot of human implemented manual processes including adding and removal of the company owned padlock by the self-storage facility operator/manager.

In the second example, the self-storage facility operator/manager uses a combination lock (e.g., a "cloud-managed physical/mechanical combination padlock" as noted above) with a centrally stored and centrally dispatched access-combination for the overlocking. Here the self-storage facility operator/manager applies the combination lock over the tenant's latch/hasp. If the tenant timely cures the defect, then the self-storage facility operator/manager will either provide the access-combination to the tenant (e.g., by phone call) or there alternatively can be automated software that provides the access-combination to the tenant. Once the tenant has the access-combination then the tenant can unlock and remove the combination lock from their self-storage unit. The removed combination lock now needs to be returned to the self-storage facility operator/manager. For example, a locked drop box may be used for this return of the combination lock. If the self-storage facility operator/manager does not receive the combination lock back from the tenant, then the tenant may be billed a predetermined amount for replacing that missing combination lock. By way of process, this is taking a basic combination lock and permitting re-accessing of the unit without the self-storage facility operator/manager needing to be physically present.

In the third example, the self-storage facility operator/manager uses a standalone smart lock, such as a Bluetooth lock (e.g., a Bluetooth padlock) for overlocking purposes. Bluetooth locks offer the ability to use a mobile app (e.g., which may be made available by the self-storage facility operator/manager to its tenant) for normal use of accessing facilities or simply for the focused scenario of overlocking. With Bluetooth locks remote key access management may be used, whether for normal entry or for limiting access until payment is made. In an overlocking situation, the self-storage facility operator/manager needs to remove the ability for the tenant to access the Bluetooth lock. In the case of a Bluetooth padlock overlock situation, the same return process as noted for the combination lock could be used. The Bluetooth lock has all of the problems noted above for battery powered prior art "smart" locks.

In the fourth and final overlock example, the self-storage facility has wired (or wireless) electronic locks that are operated with technology such as Bluetooth or the like, that are installed in the access doors. This solution while expensive to implement does avoid the need for having the tenant return the removed overlock, which is a problem with the second and third examples. However, all the Bluetooth lock problems noted above for wired (or wireless) prior art "smart" locks are applicable to this example.

There is a need in the art for a Smart Lock that does not rely upon (bidirectional/two-way) wireless communications between an end-user-terminal-device (like a smartphone or the like) and the given Smart Lock itself. Instead, it would be desirable if unlocking (and/or locking) of the Smart Lock could be accomplished by the (authorized) user simply providing (e.g., presenting, displaying, etc.) a time sensitive access-code to the given Smart Lock and if that provided time sensitive access-code is both timely (not expired) and solves a predetermined cryptographic hash algorithm (e.g., SHA-3) running on that given Smart Lock, then that Smart Lock unlocks (or locks). The (authorized) user may obtain the sensitive access-code by requesting the sensitive access-code from a computer Server (in the cloud). Providing such a smart lock and as described further below and shown in the accompanying drawings may provide a smart lock which is less expensive to manufacture (e.g., because does not include the hardware and firmware to enable [bidirectional/two-way] wireless communications such as Bluetooth, NFC, and/or the like), is less power hungry (e.g., as compared to locks that use wired internet, WiFi, Bluetooth, and/or the like), and/or the users of the contemplated inventive smart locks would not need to locally pair to a mobile device (e.g., smartphone or the like) nor would a mobile app be needed to utilize the given smart lock, i.e., there is no need for local provisioning of such a Smart Lock. Providing such a Smart Lock would also be desirable for use in overlocking scenarios, as such a Smart Lock may have its users authorized or deauthorized within seconds, often in essentially real-time and done so remotely.

It is to these ends that the present invention has been developed.

BRIEF SUMMARY OF THE INVENTION

To minimize the limitations in the prior art, and to minimize other limitations that will be apparent upon reading and understanding the present specification, at least some embodiments of the present invention may describe various Smart Locks, methods of unlocking (and/or locking) those Smart Locks, and/or systems of unlocking (and/or locking) those Smart Locks.

In some embodiments, an electromechanical Smart Lock may be unlocked by the Smart Lock timely receiving a time sensitive access-code that solves a cryptographic hash algorithm (e.g., SHA-3 or the like) running on that Smart Lock. To enable this functionality, the Smart Lock knows (e.g., has access to) at least three items of information: a time (and/or a clock), its cryptographic hash algorithm, and its unique identifier (such as, but not limited to, a serial number [or the like]). Further, the Smart Lock may have various means for receiving the time sensitive access-code (referred to as "Access-code Receiver(s)"), such as, but not limited to, a QR code camera, a barcode scanner, a camera, a microphone, a keypad, antenna(s)/radio(s) for RFID/NFC inputs to the Smart Lock, combinations thereof, and/or the like. Additionally, (authorized) Server(s) may also know the same three items of information for each given Smart Lock; and the Server(s) may provide time sensitive access-codes to (authorized) one or more User(s) (and/or to electronic device(s) [e.g., a smartphone] associated with such user(s)). The (authorized) Users may request, receive, and/or send the time sensitive access-codes via at least one of the following means (as examples): text (SMS) messaging; MMS messaging; mobile phone notifications; verbal voice phone call; voicemail; robocall; wallet pass; software running on the given end user device; (optionally) or while not required, a mobile app; combinations thereof; and/or the like. Users may share between themselves the time sensitive access-code. Thus, multiple users may easily and reliably use for the exact Smart Lock. The User(s) with a time sensitive access-code may present/provide that time sensitive access-code to the Smart Lock in various ways depending upon the type(s) of Access-code Receiver(s) on that given Smart Lock and/or how that User received the time sensitive access-code. For example, if the User received the time sensitive access-code as a QR code (in a text message), then that user need only show that QR code to the Access-code Receiver(s) (e.g., QR code camera/camera) on that given Smart Lock. In some embodiments, the Smart Lock may be locked (re-locked) by manual user input, in a same manner as a traditional only mechanical lock; and/or Smart Lock may be locked (re-locked) by timely receiving a time sensitive access-code; and/or by physically entering the provided time sensitive access code onto a pin-pad (or the like) of that Smart Lock.

In some embodiments, the Smart Lock with respect to unlocking (and/or locking) functionality may not utilize (bidirectional) wireless communications, direct point-to-point communications, pairing, or the like as between the Smart Lock and a given end-user-terminal-device (like a smartphone or the like). However, in some embodiments, the time sensitive access-code may be communicated from a user device (like a smartphone) to the given Smart Lock via, a wireless communication, such as, but not limited to, RFID/NFC (but in some such embodiments, the Smart Lock may not be wirelessly communicating with the user device [e.g., a smartphone], i.e., the wireless communications are one-directional, only from the user device to the Smart Lock). Further, in such embodiments, where the user device (e.g., a smartphone) may wirelessly pass the time sensitive access-code to the Smart Lock, a mobile app may be used on the user device (such as for the user's interface).

It is an objective of the present invention to provide a Smart Lock that does not necessarily utilize nor rely upon (bidirectional) wireless communications between the Smart Lock and an end-user-terminal-device (like a smartphone) for unlocking (and/or locking) the Smart Lock.

It is another objective of the present invention to provide a Smart Lock that does not necessarily utilize nor rely upon (direct) point-to-point (bidirectional) wireless communications between the Smart Lock and the end-user-terminal-device (like a smartphone) for unlocking the Smart Lock.

It is another objective of the present invention to provide a Smart Lock that does not necessarily utilize nor rely upon pairing between the Smart Lock and the end-user-terminal-device (like a smartphone) for unlocking the Smart Lock.

It is another objective of the present invention to provide a Smart Lock that saves electrical power as compared to prior art electronic locks.

It is another objective of the present invention to provide a Smart Lock that consumes less electrical power as compared to prior art electronic locks.

It is another objective of the present invention to provide a Smart Lock that reduces and/or mitigates the longevity friction problem as compared to prior art electronic locks.

It is another objective of the present invention to provide a Smart Lock that may have an extremely long battery life of multiple years before replacing the batteries is needed.

It is another objective of the present invention to provide a Smart Lock that may have an extremely long battery life.

It is another objective of the present invention to provide a Smart Lock that may have an extremely long battery life, of more than two (2) years of normal operation.

It is another objective of the present invention to provide a Smart Lock that may have an extremely long battery life of at least three (3) years.

It is another objective of the present invention to provide a Smart Lock that may have an extremely long battery life, of more than three (3) years of normal operation.

It is another objective of the present invention to provide a Smart Lock that may have an extremely long battery life of at least four (4) years.

It is another objective of the present invention to provide a Smart Lock that may have an extremely long battery life, of more than four (4) years of normal operation.

It is another objective of the present invention to provide a Smart Lock that may have an extremely long battery life of at least five (5) years.

It is another objective of the present invention to provide a Smart Lock that may have an extremely long battery life, of more than five (5) years of normal operation.

It is another objective of the present invention to provide a Smart Lock that may have an extremely long battery life of up to, and in some applications more than ten (10) years, before recharging or replacing the batteries is needed.

It is another objective of the present invention to provide a Smart Lock that eliminates, reduces and/or mitigates the poor connectivity problem as compared to prior art electronic locks.

It is another objective of the present invention to provide a Smart Lock that does not suffer from low of wireless connectivity related issues as compared to prior art electronic locks.

It is another objective of the present invention to provide a Smart Lock that may be smaller as compared to prior art electronic locks.

It is another objective of the present invention to provide a Smart Lock in small padlock form factor that is not like a brick in terms of size, shape, and/or weight.

It is another objective of the present invention to provide a Smart Lock that may be miniaturized as compared to prior art electronic locks.

It is another objective of the present invention to provide a Smart Lock that may be miniaturized as compared to prior art cylinder locks.

It is another objective of the present invention to provide a Smart Lock that is less complex to implement and/or use as compared to prior art electronic locks.

It is another objective of the present invention to provide a Smart Lock that is simpler to install, onboard, setup, maintain, and/or use as compared to prior art electronic locks.

It is another objective of the present invention to provide a system for centralized, cloud-based (server based) access-code management for use with the Smart Locks.

It is another objective of the present invention to provide a same Smart Lock that may be unlocked by one or more users.

It is another objective of the present invention to provide a same Smart Lock that may be unlocked by multiple users.

It is another objective of the present invention to provide a same Smart Lock that may be unlocked by different users.

It is another objective of the present invention to provide a Smart Lock that uses as an authentication mechanism a one-time passcode (OTP) to open/unlock the Smart Lock.

It is another objective of the present invention to provide a Smart Lock that uses as a primary authentication mechanism a one-time passcode (OTP) to open/unlock the Smart Lock It is another objective of the present invention to provide a Smart Lock that uses as an authentication mechanism a one-time passcode (OTP) to open/unlock the Smart Lock by receiving: a QR code, a UPC barcode, a barcode, a 2D code, a 3D code, a randomized serialized alpha-numeric code, an audio-generated code, combinations thereof, and/or the like.

It is another objective of the present invention to provide a Smart Lock that runs/operates a cryptographic hash algorithm as the means for unlocking the Smart Lock.

It is another objective of the present invention to provide a Smart Lock that may have at least one means for receiving a time sensitive access-code for a purpose of unlocking the Smart Lock.

It is another objective of the present invention to provide a Smart Lock that may have one or more means for receiving a time sensitive access-code for a purpose of unlocking the Smart Lock.

It is another objective of the present invention to provide a Smart Lock that may have various means for receiving a time sensitive access-code for a purpose of unlocking the Smart Lock.

It is another objective of the present invention to provide a Smart Lock wherein the means for receiving a time sensitive access-code may be selected from one or more: a QR code camera, a barcode scanner, a camera, a microphone, a keypad, antenna(s)/radio(s) for RFID/NFC inputs to the Smart Lock, combinations thereof, and/or the like.

It is another objective of the present invention to provide a Smart Lock, a system and/or a method that uses that Smart Lock wherein users of the Smart Lock may be authorized or deauthorized within seconds, in real-time and done so remotely.

It is another objective of the present invention to provide a Smart Lock that has lower component costs, lower manufacturing, installation, onboarding, setup, maintenance, and/or use costs/expenses as compared to prior art electronic locks.

It is another objective of the present invention to provide a Smart Lock with one or more radios, antennas, circuits, and/or chipsets configured for wireless communications to enable (bidirectional) communications between that Smart Lock and at least one computer Server.

It is another objective of the present invention to provide a Smart Lock with one or more radios, antennas, circuits, and/or chipsets configured for wireless communications to enable (bidirectional) communications between that Smart Lock and at least one computer Server, wherein such communication may be for checking on the status of the given Smart Lock, configuring the given Smart Lock, updating the given Smart Lock, resetting the given Smart Lock, monitoring data of the given Smart Lock, portions thereof, combinations thereof, and/or the like.

It is another objective of the present invention to provide a Smart Lock with one or more radios, antennas, circuits, and/or chipsets configured for wireless communications to enable (bidirectional) communications between that Smart Lock and at least one computer Server, wherein such communication may be at least in part via Bluetooth, LoRa, NB-IOT, cellular, portions thereof, combinations thereof, and/or the like wireless communication protocol(s) operating on the given Smart Lock.

It is another objective of the present invention to provide a Smart Lock with one or more real time clock (RTC) management strategies to minimize power failure and/or address power failure incidents.

It is another objective of the present invention to provide a Smart Lock with one or more real time clock (RTC) management strategies to minimize power failure and/or address power failure incidents that may comprise one or more of: (1) an aggressive battery management system (approach); (2) using a two or more batteries solution (approach); and/or (3) an ability to pass a new time value to reconfigure the RTC that has been reset due to power loss; portions thereof; combinations thereof; and/or the like.

It is another objective of the present invention to provide a Smart Lock with one or more real time clock (RTC) management strategies to minimize power failure and/or address power failure incidents wherein in an aggressive battery management system (approach) a predetermined programmable percentage of the battery life may be reserved for long term RTC maintenance.

It is another objective of the present invention to provide a Smart Lock with one or more real time clock (RTC) management strategies to minimize power failure and/or address power failure incidents wherein in a two or more batteries approach, at least one (first) dedicated battery may be used for long-term stable RTC maintenance and at least one other (secondary) battery may be used for other Smart Lock electronic functions, such as, but not limited to, unlocking (and/or locking).

It is yet another objective of the present invention to provide a Smart Lock, wherein a given access-code (e.g., a given one-time passcodes [OTPs]) (e.g., from a computer Server) for unlocking (and/or locking) a given Smart Lock, in addition to including the information for unlocking (and/or locking) that given Smart Lock, that given access-code may also comprise other (additional/further) information, commands, configuration parameters, and/or instructions for operation and/or configuration of that given Smart Lock and that given Smart Lock may comprise a capability to read and act upon such other (additional/further) information, commands, configuration parameters, and/or instructions that may be part of (embedded) within the given access-code.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Figure 1:
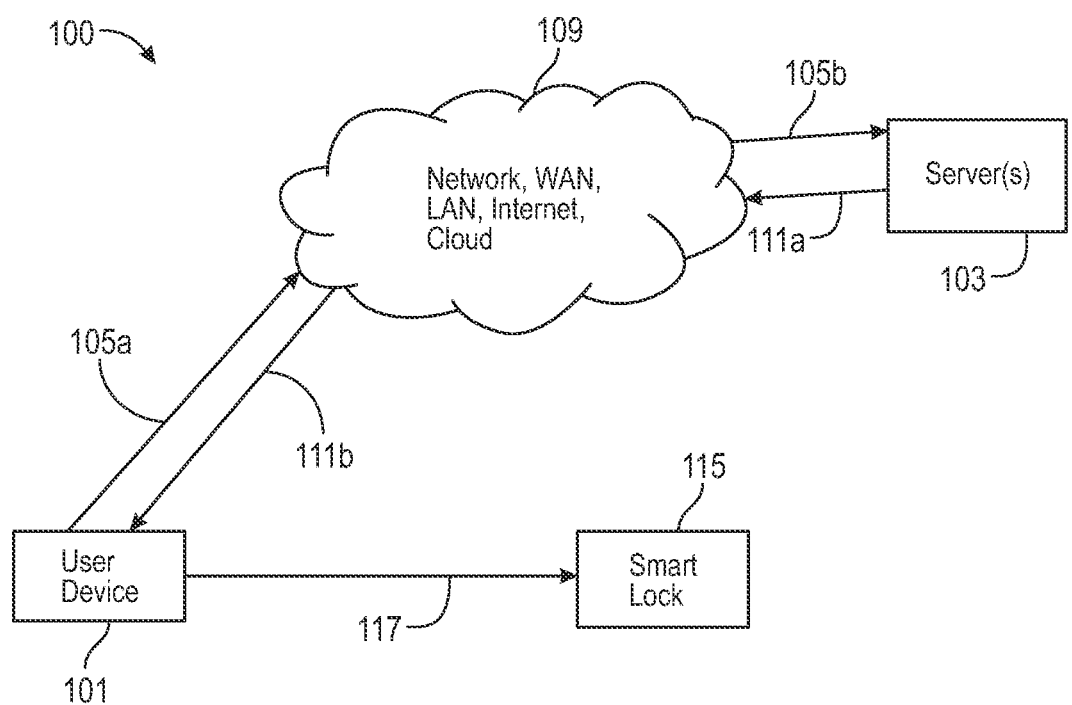
FIG. 1 depicts a block diagram showing communication pathways for unlocking a given Smart Lock according to at least some embodiments of the present invention.

REFERENCE NUMERAL SCHEDULE 100 communication pathways for unlocking smart lock 100
101 User Device 101
103 Server(s) (computing-server(s)) 103
105a request for access transmission 105a
105b request for access transmission 105b
109 network, WAN, LAN, Cloud 109
111a access-code transmission 111a
111b access-code transmission 111b
115 Smart Lock (lock) 115
117 present/provide access-code to Smart Lock 117
200 method of unlocking smart lock 200
201 step of user requesting access to unlock Smart Lock 201
203 step of Server(s) receiving request from User to unlock Smart Lock 203
205 step of Server(s) checking authorization of the User/User Device 205
207 step of Server(S) sending access-code to User Device 207
209 step of User Device receiving access-code 209
211 step of providing access-code to Smart Lock 211
213 step of Smart Lock receiving access-code 213
215 step of Smart Lock checking access-code 215
217 step of Smart Lock unlocking 217
300 communication pathways for unlocking smart lock 300
301 Other User Device(s) 301
303 request for access transmission 303
305 access-code transmission 305
307 present/provide access-code to Smart Lock 307
400 method of unlocking smart lock 400
401 step of Other User requesting access to unlock Smart Lock 401
403 step of User receiving request from the Other User 403
405 step of User checking authorization of the Other User 405
407 step of User sending access-code to Other User 407
409 step of Other User receiving access-code 409
411 step of Other User providing access-code to Smart Lock 411
500 communication pathways for unlocking smart lock 500
501 access-code transmission 501
600 method of unlocking smart lock 600
601 step of Server(s) sending access-code to two (2) or more intended targets 601
603 step of at least one intended target receiving access-code 603
605 step of at least one intended target providing access-code to Smart Lock 605
701 Processor(s) 701
703a Memory 703a
703b Electronic Storage 703b
705 Clock 705
707 Wake-Up Means 707
709 Access-code Receiver(s) 709
711 Electrical/Mechanical Lock Interface/Locking Means (electrical-mechanical-lock-interface) 711
713 Power Source 713
713a first Power Source 713a
713b second Power Source 713b
715 Charge Controller/Circuit 715
715a Charge Controller/Circuit 715a
715b Charge Controller/Circuit 715b
717 Output Means 717
719 Radio(s)/Antenna(s) 719
721 Physical Mechanical Lock Elements (physical-mechanical-lock-elements) 721

800 communication pathways for checking Smart Lock status 800
801a request for Smart Lock status transmission 801a
801b request for Smart Lock status transmission 801b
805a request for Smart Lock status transmission 805a
805b request for Smart Lock status transmission 805b
809a status of Smart Lock transmission 809a
809b status of Smart Lock transmission 809b
813a status of Smart Lock transmission 813a
813b status of Smart Lock transmission 813b
900 method of checking/reporting Smart Lock status 900
901 step of User requesting status of Smart Lock 901
903 step of Server(s) receiving request for status of Smart Lock 903
905 step of Server(s) checking authorization of User/User Device 905
907 step of Server(s) sending request for status of Smart Lock to Smart Lock 907
909 step of Smart Lock receiving request for status 909
911 step of Smart Lock sending status to Server(s) 911
913 step of Server(s) receiving status of Smart Lock 913
915 step of Server(s) sending status of Smart Lock to User/User Device 915
917 step of User/User Device receiving status of Smart Lock 917
1000 padlock or shackle lock (form factor) 1000
1100 hidden shackle lock (form factor) 1100
1200 disc lock (form factor) 1200
1300 cylinder lock (form factor) 1300
1400 latch lock (form factor) 1400
1500 hasp lock (form factor) 1500
1600 deadbolt lock or door lock (form factor) 1600
1700 door knob lock (form factor) 1700
1800 lever handle lock (form factor) 1800
1900 window lock (form factor) 1900
2000 vending machine lock (form factor) 2000
2100 t-handle lock (form factor) 2100
2200 cable (or chain) bike lock (form factor) 2200
2300 u-lock (form factor) 2300
2400 wheel lock (form factor) 2400
2500 motorcycle lock (form factor) 2500
2600 trailer hitch lock (form factor) 2600
2700 trailer hitch lock (form factor) 2700
2800 RV door lock (form factor) 2800
2900 cabinet lock (form factor) 2900
3000 cabinet lock (form factor) 3000
3100 rim latch lock (form factor) 3100
3200 lock box lock (form factor) 3200
3300 handcuffs lock (form factor) 3300
3400 leg irons lock (form factor) 3400

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1 depicts a block diagram showing communication pathways 100 for unlocking a given Smart Lock 115. In some embodiments, FIG. 1 may depict the unlocking communication scenario/environment for a single (or at least one) (authorized) User of that Smart Lock 115. In some embodiments, the (authorized) User using a User Device 101 may request from at least one Server 103 that an access-code be provided to that User/User Device 101 (from the at least one Server 103 or a computing device controlled by at least one Server 103) for a purpose of the User/User Device 101 then providing that access-code to Smart Lock 115 so that Smart Lock 115 may then unlock.

Continuing discussing FIG. 1, in some embodiments, User Device 101 may be a computing device, such as, but not limited to, a computer. In some embodiments, User Device 101 may be selected from one or more of: a smartphone; a tablet computer; a laptop computer; a mobile computer; a handheld compute; a smartwatch; an electronic (key) fob; a wearable computer; a wearable electronic device; a one-way speaker; a two-way speaker; a voice activated speaker; a voice controlled speaker; a smart speaker; at least one light source; at least one sound source; an electronic monitoring sensor; an electronic device capable of transmitting, broadcasting, emitting, showing, and/or displaying an unlock code (access-code); portions thereof; combinations thereof; and/or the like. In some embodiments, User Device 101 may be in wireless communication, wired communication, portions thereof, combinations thereof, and/or the like with Network 109. In some embodiments, User Device 101 may be in indirect communications (e.g., by utilizing at least a portion of Network 109) and/or in intermittent communications with Server(s) 103.

Continuing discussing FIG. 1, in some embodiments, User Device 101 may be used and/or controlled by a User. In some embodiments, the User may be an authorized User, wherein an authorized User may be a person who is authorized to unlock Smart Lock 115. In some embodiments, an authorized User may have at least one of their: User name, User address (e.g., physical, mailing, and/or billing address), User phone number, User email address, User account number, User account name, User name, at least one identifier for that User's User Device 101, combinations thereof, and/or the like associated (linked) with a particular Smart Lock 115 (e.g., by the at least one identifier for that User's User Device 101) in (electronic) records that are accessible, updated, and/or maintained by Server(s) 103.

In some embodiments, the identifier for a given User Device 101 (or a given Other User Device 301) may be selected from one or more of: a serial number, a MAC address, a name, a numeric code, an alphanumeric code, a machine-readable code, a binary code, an optical code, a barcode, a QR code, an address, a code, an IP address of that given User Device 101 (or 301), SIM card information of that given User Device 101 (or 301), a phone number of that given User Device 101 (or 301), a RFID tag of that given User Device 101 (or 301), a NFC tag of that given User Device 101 (or 301), portions thereof, combinations thereof, and/or the like. In some embodiments, the identifier for a given User Device 101 (or a given Other User Device 301) may be configured to be transmitted wireless, such as, but not limited to, for NFC and/or RFID. In some embodiments, the identifier for a given User Device 101 (or a given Other User Device 301) may be unique for each particular User Device 101 (or particular Other User Device 301).

Continuing discussing FIG. 1, in some embodiments, Server 103 may be a computing device, such as, but not limited to, a computer. In some embodiments, Server 103 may be a "computer server" or more simply a "server" as that term is commonly understood in the computing industries. In some embodiments, Servers 103 may be one or more of networked together; distributed; virtual; real; and/or combinations thereof. In some embodiments, at least some Servers 103 may be remotely located from other Servers 103. In some embodiments, Servers 103 may be in communication with one or more databases.

In some embodiments, Server(s) 103 may maintain and/or cause to be centrally-generated, the cloud-based time sensitive access-codes (e.g., as one-time passcodes [OTPs]) for unlocking Smart Locks 115. Note, in contrast, some prior art electronic locks utilize a local mobile app running on a smartphone to locally generate the access codes for that electronic lock; whereas, the access-codes for unlocking (or locking) a given Smart Lock 115 contemplated herein for various embodiments of the present invention may not be locally generated and generated at the Server 103 side. In some embodiments, the time sensitive access-codes (OTPs) may be in an electronic (machine) readable format such as, but not limited to: QR codes; UPC (universal product code) barcodes; barcodes; 2D barcodes (two dimensional codes); 3D barcodes (three dimensional codes); randomized serialized alpha-numeric codes; alpha-numeric codes; numeric codes; alphabetic (letter) codes; other machine-readable images; audio-code (sound/audible code); sequence thereof; combinations thereof; and/or the like; whether machine readable or for keypad (manual) entry on the given Smart Lock 115. In some embodiments, generation of the time sensitive access-codes (OTPs) may be according to a predetermined cycle, interval, and/or cadence, with respect to such a predetermined cycle, interval, and/or cadence running on the Smart Locks 115. In some embodiments, the predetermined cycles, intervals, and/or cadences may be synchronized as between Server(s) 103 and the Smart Locks 115. In some embodiments, the time cycle, interval, and/or cadence may be predetermined and/or adjustable. In some embodiments, this "time cycle, interval, and/or cadence" being referred to here may be a "predetermined-time-interval" that continuously counts down to no time remaining and then resets and starts over; wherein this "predetermined-time-interval" may run on at least some of the electronics of Smart Locks 115 and may be synchronized and running on Server(s) 103. In some embodiments, Smart Lock 115 may be a OTP (one-time passcode/one time passcode) lock.

For example, and without limiting the scope of the present invention, in some embodiments, the time cycle, interval, and/or cadence (the "predetermined-time-interval") may be selected from a predetermined amount of time, such as, but not limited to: one (1) minute, two (2) minutes, three (3) minutes, four (4) minutes, five (5) minutes, six (6) minutes, seven (7) minutes, eight (8) minutes, nine (8) minutes, ten (10) minutes, eleven (11) minutes, twelve (12) minutes, thirteen (13) minutes, fourteen (14) minutes, fifteen (15) minutes, sixteen (16) minutes, seventeen (17) minutes, eighteen (18) minutes, nineteen (19) minutes, twenty (20) minutes, thirty (30) minutes, one (1) hour, one (1) day, one (or 1) week, one (1) month, or one (1) year. In other embodiments, a different predetermined amount of time for the predetermined cycle, interval, and/or cadence (the "predetermined-time-interval") may be selected. In some embodiments, the amount of time for the predetermined cycle, interval, and/or cadence (the "predetermined-time-interval") may be determined upon the given application use case for that particular Smart Lock 115 (e.g., self-storage, short-term vacation rentals, month-to-month rental agreements, an annual lease, showing real-estate to be leased or sold, lockout situations, vehicle locks, etc.). Note, in some embodiments, the predetermined cycle, interval, and/or cadence (the "predetermined-time-interval") may be different between any two physically different Smart Locks 115 (even two or more such Smart Locks 115 of the same model type). However, whatever a given predetermined cycle, interval, and/or cadence (the "predetermined-time-interval") might be for a given Smart Lock 115, if any, that given predetermined cycle, interval, and/or cadence (the "predetermined-time-interval") may be synchronized and/or known to Server 103 for that particular Smart Lock 115 (e.g., as Server 103 may have access to a unique identifier [such as, but not limited to, a serial number or the like] of each Smart Lock 115; and thus, may have a record of the particular predetermined cycle, interval, and/or cadence [the "predetermined-time-interval,"] if any, for each Smart Lock 115). In some embodiments, if the predetermined cycle, interval, and/or cadence (the "predetermined-time-interval") has run (i.e., counted down to zero time remaining [no time remaining]) then a time-sensitive access-code may now be obsolete/expired and may thus not work to unlock Smart Lock 115. In some embodiments, the Server(s) 103 side generated time-sensitive access-code must be provided to the given Smart Lock 115 within the predetermined cycle, interval, and/or cadence (the "predetermined-time-interval") that the time-sensitive access-code was generated in, in order for that Smart Lock 115 to unlock. That the time-sensitive access-codes are only valid for a set amount of time before expiration limits unintended unlocking of Smart Locks 115 while also making sharing of the time-sensitive access-codes possible to enable multi-user capability of the exact same Smart Locks 115.

Note, in some use applications for Smart Lock 115 there may be no need for the access-code to be time-sensitive. In some embodiments, such a predetermined cycle, interval, and/or cadence (the "predetermined-time-interval") may not be necessary for unlocking (and/or locking) of that given Smart Lock 115.

Also note, depending upon the use application, an access-code may not need to be provider to the User every time that User intends to unlock (or lock) a given Smart Lock 115. In some use applications, a User may continue to re-use a provided access-code to unlock or lock a given Smart Lock 115 over the duration of its associated predetermined cycle, interval, and/or cadence (the "predetermined-time-interval"). For example, and without limiting the scope of the present invention, consider a short-term vacation rental use application (such as, but not limited to, an AirBnB or the like use case), where the predetermined cycle, interval, and/or cadence (the "predetermined-time-interval") might be the length of stay at a particular vacation rental (which could be one week, a weekend, or some different duration of stay); wherein the short-term vacation renter might be provided one (single) access-code for unlocking or locking a Smart Lock 115 of that vacation rental property; and wherein that one (single) provided access-code may be good for the entirety of that planned vacation stay. In some embodiments, the predetermined cycle, interval, and/or cadence (the "predetermined-time-interval") of a given Smart Lock 115 (even an already deployed given Smart Lock 115) may be remotely configurable, adjusted, editable, and/or changeable from Server 103 (or an electronic device authorized to do so by Server 103).

In some embodiments, a given Smart Lock 115 may comprise one or more crypto-graphic/cryptological/hash algorithms. In some embodiments, such two or more crypto-graphic/cryptological/hash algorithms may be running at least partially to fully concurrently (simultaneously/in parallel with each other) on a given Smart Lock 115. In some embodiments, this may permit and/or allow for multiple (and often overlapping) OTP time windows. In some embodiments, this may enable use of multiple time-based access-codes to be accepted at the same time. For example, and without limiting the scope of the present invention, in the short-term vacation rental use application (e.g., AirBnB or the like), a guest could have a 24 hour (or some other time interval) valid access-code and the owner could have an access-code with no default time based expiration.

Continuing discussing FIG. 1, in some embodiments, Smart Lock 115 may comprise a (physical) mechanical lock (such as, but not limited to, a padlock, a disc lock, a cylinder lock, a latch lock, a hasp lock, a door lock, a window lock, a vending-machine lock, a T-handle lock, a bike lock, a motorcycle lock, a RV lock, a dead bolt, a knob lock, a door handle lock, a lever handle lock, a cam lock, a wall mounted lock, a rim latch lock, a cabinet lock, a container lock, a locker lock, a lockout lock, a handcuff lock, a shackle lock, portions thereof, combinations thereof, and/or the like) whose unlocking may be controlled with electronics of Smart Lock 115. In some embodiments, Smart Lock 115 unlocking may be controlled by the Smart Lock 115 receiving a non-timed out access-code that solves a cryptographic/cryptological/hash algorithm (predetermined hash-algorithm) running on the Smart Lock 115 (e.g., running on at least some electronics of Smart Lock 115). In some embodiments, the cryptographic/crypto-logical/hash algorithm may be: SHA-3, SHA-2, SHA-1 (wherein "SHA" is an acronym for "Secure Hash Algorithm"), and/or other hashing algorithms that may be solved by providing a (digitized) (machine-readable in some embodiments) access-code to Smart Lock 115. In some embodiments, one or more cryptographic/cryptological/hash algorithms may be in (concurrent) use (running) on a given Smart Lock 115. In some embodiments, Smart Lock 115 knows (e.g., has access to) at least the following three (3) items of information: (i) a time; (ii) its at least one predetermined cryptographic/cryptological/hash algorithm; and (iii) its at least one (unique) identifier (such as, but not limited to, its serial number [or the like]). Note, in some embodiments, Server(s) 103 also knows (e.g., has access to) these same three (3) items of information of: (i) the time; (ii) predetermined cryptographic/cryptological/hash algorithms for each Smart Lock 115; and (iii) serial numbers (or the like) for each Smart Lock 115. In some embodiments, this "(i) the time" being referred to here may be the "predetermined-time-interval" that continuously counts down to no time remaining and then resets and starts over; wherein this "predetermined-time-interval" may run on the at least some of the electronics of Smart Locks 115 and may be synchronized and running on Server(s) 103. In some embodiments, the predetermined hash-algorithm has at least one solution per each of the predetermined-time-interval that has time remaining. Note, because Server(s) 103 know the particular predetermined hash-algorithm running on a given Smart Lock 115 and because Server(s) 103 maintain, monitor, and/or know a countdown counter that is synchronized to the predetermined-time-interval running on that same given Smart Lock 115, then Server(s) 103 know what access-code for each predetermined-time-interval will solve that particular predetermined hash-algorithm running on that same given Smart Lock 115. See also FIG. 7A for Smart Lock 115.

In some embodiments, the OTP algorithm (predetermined hash-algorithm) may depend on a critical "real time clock" (RTC) to keep accurate and valid time. In some embodiments, the RTC of a given Smart Lock 115 may be handled by Clock 705 (see FIG. 7A for Clock 705). In some embodiments, if the RTC is lost on a given Smart Lock 115 then that Smart Lock 115 could be broadly rendered useless from the point of view of being unlocked. In some embodiments, to minimize loss of the RTC on a given Smart Lock 115, then the RTC may require a constant (electrical) power supply (which may be similar to how a traditional electronic/digital watch requires a battery to maintain its time). In some embodiments, to address a need for constant (electrical) power to the RTC of a given Smart Lock 115, that given Smart Lock 115 may employ one or more of the following strategies (approaches): (1) an aggressive battery 713 management system (approach) (e.g., via charge controller/circuit 715); (2) using a two or more batteries 713 solution (approach); (3) an ability to pass a new time value and/or to reconfigure the RTC that has been reset due to power loss; portions thereof; combinations thereof; and/or the like. For example, and without limiting the scope of the present invention, with respect to the (1) strategy of using the aggressive battery 713 management system (approach), some predetermined programmable percentage of the battery life (e.g., the last 30%) may be reserved for long term RTC maintenance; and thus, if this last percentage of the battery life is reached, then the only use of power would be to maintain the RTC and/or to engage a low battery warning, message, and/or notification, which could prevent the User from unlocking that given Smart Lock 115 until its battery 713 may be replaced and/or charged over that minimum percentage of battery life threshold. For example, and without limiting the scope of the present invention, with respect to the (2) strategy of using two or more batteries 713, at least one (first) dedicated battery 713 may be used for long-term stable RTC maintenance and at least one other (secondary) battery 713 may be used for other Smart Lock 115 electronic functions, such as, but not limited to, unlocking (or locking). In some embodiments, the (first) dedicated battery 713 for RTC maintenance may be smaller than the other (second) battery 713. In some embodiments, the (first) dedicated battery 713 for RTC maintenance may be non-rechargeable. In some embodiments, the (first) dedicated battery 713 for RTC maintenance may be a NiCAD (NiCad) (nickel-cadmium) battery. In some embodiments, the (first) dedicated battery 713 for RTC maintenance may be trickle charged from the other (second) battery 713 and/or may be (trickle) recharged using (wireless) energy harvesting. For example, and without limiting the scope of the present invention, with respect to the (3) strategy of passing a new time value to reconfigure the RTC that has been reset due to power loss, this may be accomplished using a rolling code algorithm (or the like) as a backdoor. Pragmatically, a rolling code algorithm may be less secure than a correctly used OTP algorithm. As such, with any "backdoor," there is a risk of bad actors and steps should and/or may need to be taken to mitigate rolling code exploits. In some embodiments, to help avoid a rolling code exploit by a bad actor, Smart Lock 115 may utilize one or more strategies (approaches) of: (a) the given Smart Lock 115 could detect that RTC is reporting a time (and date) near the UNIX epoch (e.g., a default value after an RTC is reset) and trigger a RTC reconfigure event, wherein the RTC reconfigure would not be accepted unless given Smart Lock 115 had a full power loss event; (b) Server 103 side management would not send the RTC reset command (which might be embedded in the access-code) unless a trusted source directs that given Smart Lock 115 should receive the "backup" OTP key (for a purpose of resetting its RTC), wherein this would help to minimize visibility of the rolling code; (c) the given Smart Lock 115 may have a predetermined limit as to a quantity of RTC resets that may be attempted; combinations thereof; and/or the like. With respect to strategy (b), the trusted source in the self-storage application use case, may be a User of User Device 101 that is an employee and/or agent of that given self-storage facility, such as, but not limited to, a manager, supervisor, or the like.

Continuing discussing FIG. 1, in some embodiments, User Device 101 (controlled and/or used by the User) may make request for an access-code for Smart Lock 115 to unlock from Server(s) 103 via request for access transmission 105. In some embodiments, request for access transmission 105 may be one or more transmissions of data and/or information from User Device 101 directed to Server(s) 103 that are requesting the access-code for Smart Lock 115 to unlock from Server(s) 103. In some embodiments, request for access transmission 105*a* may be portion(s) of request for access transmission 105 from User Device 101 to Network 109 and request for access transmission 105*b* may be portion(s) of request for access transmission 105 from Network 109 to Server(s) 103. In some embodiments, request for access transmission 105 may be in at least one of the following formats: a text message from User De-vice(s) 101 to Server(s) 103; a SMS message (short message service message) from User De-vice(s) 101 to Server(s) 103; a MMS message (multimedia messaging service message) from User Device(s) 101 to Server(s) 103; a phone call from User Device(s) 101 to Server(s) 103; an email from the User to Server(s) 103; (optionally) a request (invitation) from a mobile app running on User Device(s) 101 to Server(s) 103; (optionally) a request (invitation) from a mobile smartphone wallet pass (or the like app) running on User Device(s) 101 to Server(s) 103; from a browser, website, web portal, and/or web interface that User Device(s) 101 may be using and directed to Server(s) 103; an invitation from a website, a web portal, or a web interface that User Device 101 is interacting with; an invitation from the User Device(s) 101 to Server(s) 103; an invitation from software running on User Device 101; combinations thereof; and/or the like. In some embodiments, User Device 101 in this paragraph may be replaced with Other User Device 301 (see e.g., FIG. 3 and FIG. 5 for Other User Device 301).

Continuing discussing FIG. 1, in some embodiments, Network 109 may be at least a portion of a computing network, such as, but not limited to, a LAN, a WAN, the Cloud, the Internet, portions thereof, combinations thereof, and/or the like. In some embodiments, Network 109 may comprise at least some networking equipment typical of computing networks, such as, but not limited to, cables, wires, fiber optics, routers, modems, switches, gateways, relays, receivers, transmitters, radios, antennas, computers, databases, portions thereof, combinations thereof, and/or the like. In some embodiments, communications between User Device 101 and Server(s) 103 may be at least partially routed through at least part of Network 109.

Continuing discussing FIG. 1, in some embodiments, upon Server(s) 103 receiving request for access transmission 105 (request for access transmission 105*b*) from User Device 101, Server(s) 103 may then check to see whether or not that User Device 101 and/or that User are authorized to receive access-codes from Server(s) 103 for a purpose of unlocking that given Smart Lock 115. In some embodiments, if the received request for access transmission 105 (request for access transmission 105*b*) was from an authorized User and/or an authorized User Device 101, then Server(s) 103 may provide a time sensitive access-code (OTP) to User Device 101 (and/or to the User) via access-code transmission 111. In some embodiments, if the received request for access transmission 105 (request for access transmission 105*b*) was from an authorized User and/or an authorized User Device 101, then Server(s) 103 may provide an access-code (which may or may not be a OTP) to User Device 101 (and/or to the User) via access-code transmission 111. In some embodiments, access-code transmission 111 may be one or more transmissions of data and/or information from Server(s) 103 directed to User Device 101 that includes a time sensitive access-code for unlocking (and/or locking) Smart Lock 115 if the access-code is provided to Smart Lock 115 within a predetermined amount of time (which may be specific for that particular Smart Lock 115 or for that particular User or that particular User Device 101, and/or the like). In some embodiments, access-code transmission 111 may be one or more transmissions of data and/or information from Server(s) 103 directed to User Device 101 that includes an access-code for unlocking (and/or locking) Smart Lock 115. In some embodiments, access-code transmission 111*a* may be portion(s) of access-code transmission 111 from Server(s) 103 to Network 109 and access-code transmission 111*b* may be portion(s) of access-code transmission 111 from Network 109 to User Device 101.

Continuing discussing FIG. 1, in some embodiments, access-code transmission 111 may be in at least one of the following formats: a text message from Server(s) 103 to User De-vice(s) 101; a SMS message from Server(s) 103 to User Device(s) 101; a MMS message from Server(s) 103 to User Device(s) 101; a phone call from Server(s) 103 to User Device(s) 101; a voicemail from Server(s) 103 to User Device(s) 101; an email from Server(s) 103 to the User(s); (optionally) a notification at a mobile app running on User Device(s) 101 from Server(s) 103; a phone notification displaying or displayed on User Device(s) 101 from Server(s) 103; to a mobile wallet pass software or the like running User Device(s) 101 from Server(s) 103; to a website, web portal, and/or web interface that may be accessed by a browser running on User Device(s) 101 from Server(s) 103; a notification configured to be displayed on a display (screen) of User Device(s) 101; receipt of the provided access-code on/to software running on User Device(s) 101 from Server(s) 103; combinations thereof; and/or the like. Note, in this paragraph User Device(s) 101 may be replaced with Other Device(s) 301.

Continuing discussing FIG. 1, in some embodiments, after User Device 101 has received access-code transmission 111 (access-code transmission 111*b*) from Server(s) 103, then within the allotted predetermined amount of time (if one was required), User Device 101, the User, another, and/or some other device may present/provide access-code 117 to Smart Lock 115. In some embodiments, if Smart Lock 115 has received the access-code from present/provide access-code 117 in a timely manner (if timeliness was required) and if that time sensitive access-code solves the cryptographic/cryptological/hash algorithm running on the Smart Lock 115, then Smart Lock 115 may unlock (or lock if locking was the objective). In some embodiments, if the presented/provided access-code has expired (is too old [expired]), then Smart Lock 115 may not unlock (or may not lock, if locking was the objective). In some embodiments, if the presented/provided access-code does not solve the cryptographic/cryptological/hash algorithm running on the Smart Lock 115, then Smart Lock 115 may not unlock (or may not lock, if locking was the objective).

Continuing discussing FIG. 1, in some embodiments, present/provide access-code 117 may be one or more methods of presenting and/or providing the time sensitive access-code to Smart Lock 115. For example, and without limiting the scope of the present invention, in some embodiments, when the access-code 117 may be displayed on a display (screen) of User Device 101, then the User may present the display of User Device 101 with the access-code displayed to an Access-code Receiver 709 of Smart Lock 115. (See FIG. 7A for Access-code Receiver 709.) In such an example, the access-code may be at least one of: a visual access-code, a QR code (quick response code), a barcode, a two-dimensional code (2D code), a three-dimensional code (3D code), a machine-readable code, an alphanumeric code, a numeric code, a letter code, an audio code, portions thereof, combinations thereof, and/or the like. In such an example, Access-code Receiver 709 may be one or more: cameras, barcode scanners, photo readers, face recognition cameras, microphones, combinations thereof, and/or the like.

In some embodiments, at least one light source that may be sufficiently close to Smart Lock 115 may shine and/or flash light in a pattern, modulated, and/or of particular wavelength (frequency) to function as the visual access-code 117. In some embodiments, this at least one light source may be the User Device 101 or some other light source. In some embodiments, the light emitted (flashed) by the at least one light source in the pattern, modulated, and/or of the particular wavelength (frequency) to function as the visual access-code 117 need not be light that most humans can see (i.e., the flashed light need not be from the human visible light spectrum—but could be). If Smart Lock 115, via its Access-code Receiver 709, cannot detect such emitted light acting as the access-code 117, then that at least one light source may be too far away from that given Smart Lock 115. In such an example, Access-code Receiver 709 may be one or more: cameras, barcode scanners, photo readers, face recognition cameras, microphones, combinations thereof, and/or the like.

For example, and without limiting the scope of the present invention, in some embodiments, when the access-code may be audibly played on speaker(s) of User Device 101, then the User may play the audio access-code out of speaker(s) of User Device 101 to an Access-code Receiver 709 of Smart Lock 115. In such an example, the access-code may be at least one an audio code and/or the like. In such an example, Access-code Receiver 709 may be at least one or more microphones and/or the like.

In some embodiments, at least one sound source that may be sufficiently close to Smart Lock 115 may broadcast (emit) sound in a pattern and/or of particular frequency to function as the auditory access-code 117 (such as, but not limited to, a series of beeps). In some embodiments, this at least one sound source may be the User Device 101 or some other sound source (such as, but not limited to, an electronic monitoring sensor or speaker(s)). In some embodiments, the sound broadcast (emitted) by the at least one sound source in the pattern and/or of the particular frequency to function as the auditory access-code 117 need not be sound that most humans can hear (although it could be in some embodiments). If Smart Lock 115, via its Access-code Receiver 709, cannot detect such broadcast (emitted) sounds acting as the access-code 117, then that at least one sound source may be too far away (or too quiet) from that given Smart Lock 115. In such an example, Access-code Receiver 709 may be one or more: microphones and/or the like.

Continuing discussing FIG. 1, for example, and without limiting the scope of the present invention, in some embodiments, when the access-code may be wirelessly broadcast (transmitted and/or emitted) from User Device 101 to Smart Lock 115, then the User may broadcast the access-code from User Device 101 with User Device 101 being sufficiently close to Smart Lock 115, wherein the Access-code Receiver 709 of Smart Lock 115 may then receive this broadcast. In such an example, the access-code may be a wireless transmission, such as, but not limited to a radio transmission, an IR (infrared) transmission, portions thereof, combinations thereof, and/or the like. In such an example, Access-code Receiver 709 may be one or more: receivers, radios, antennas, wireless communications circuit, wireless communications chipset, combinations thereof, and/or the like. In this example access-code transmissions from User Device 101 to Smart Lock 115 (Access-code Receiver 709) may be examples of RFID (radio frequency communications) communications and/or NFC (near field communications). Note, in this example, Smart Lock 115 may not be communicating wirelessly with User Device 101; that is, Smart Lock 115 may not be transmitting wireless communications directed to User Device 101 and/or Smart Lock 115 does not wirelessly request the access-code from User Device 101. There may not be bidirectional wireless communications between Smart Lock 115 and User Device 101.

Continuing discussing FIG. 1, for example, and without limiting the scope of the present invention, in some embodiments, when the access-code may be audibly spoken by the User and/or automatically generated and emitted from speaker(s) of the User Device 101, then the User may speak the access-code or play the access-code over the speaker(s) of User Device 101 in sufficient proximity to Access-code Receiver 709 of Smart Lock 115. In such an example, the access-code may be a spoken code or an auditory machine-to-machine code. In such an example, Access-code Receiver 709 may be one or more: microphones and/or the like.

In some embodiments, at least one sound source that may be sufficiently close to Smart Lock 115 may broadcast (emit) sound in a pattern and/or of particular frequency to function as the auditory access-code 117 (such as, but not limited to, a series of beeps). In some embodiments, this at least one sound source may be the User Device 101 or some other sound source (such as, but not limited to, an electronic monitoring sensor or speaker(s)). In some embodiments, the sound broadcast (emitted) by the at least one sound source in the pattern and/or of the particular frequency to function as the auditory access-code 117 need not be sound that most humans can hear (although it could be in some embodiments). If Smart Lock 115, via its Access-code Receiver 709, cannot detect such broadcast (emitted) sounds acting as the access-code 117, then that at least one sound source may be too far away (or too quiet) from that given Smart Lock 115. In such an example, Access-code Receiver 709 may be one or more: microphones and/or the like. For example, and without limiting the scope of the present invention, a facility could have local speakers in/on the property and the access-code could be transmitted remotely from the speakers in/on the building to trigger unlocking (or locking) of Smart Lock 115. This could be conventional speakers or two-way voice speakers using two-way communication such as Amazon's Alexa (Echo), Google Home, smart speaker, and/or the like. Further in such an example, a User could simply say out loud, "Alexa, Unlock My Door" which may cause the Amazon Alexa (Echo) smart speaker to then audibly broadcast (emit) the audible access-code 117 to unlock the given Smart Lock 115 associated with "My Door." In such an example, the smart speaker may be an example of a User Device 101.

Continuing discussing FIG. 1, for example, and without limiting the scope of the present invention, in some embodiments, when the access-code may be manually entered in/on Smart Lock 115, then a user may enter the access-code in/to Access-code Receiver 709 of Smart Lock 115. In such an example, the access-code may be an alphanumeric code, a numeric code, a letter code, portions thereof, combinations thereof, and/or the like. In such an example, Access-code Receiver 709 may be one or more: keypads, touchscreens, number wheels, combination dials, combinations thereof, and/or the like. Note, in this example, this user need not be associated with an authenticated User Device 101; i.e., the User Device 101 authenticated User may have provided access-code to this user.

Continuing discussing FIG. 1, in some embodiments, present/provide access-code 117 may be one or more methods of presenting and/or providing the time sensitive access-code to Smart Lock 115 such as, but not limited to: presenting a display (screen) of User Device 101 to Access-code Receiver 709 of Smart Lock 115, wherein the access-code is displayed on that display (screen); presenting a display (screen) of an electronic device to Access-code Receiver 709 of Smart Lock 115, wherein the access-code is displayed on that display; Access-code Receiver 709 of Smart Lock 115 receiving lights of a predetermined and/or particular pattern and/or wavelength (frequency) that operate as the access-code from at least one light source; wirelessly broadcasting (transmitting and/or emitting) the access-code from User Device 101 (or other electronic device) to Access-code Receiver 709 of Smart Lock 115 (wherein the Smart Lock 115 does not wirelessly communicate with the User Device 101); speaking the access-code from the User to Access-code Receiver 709 of Smart Lock 115; playing the access-code over speaker(s) of User Device 101 to Access-code Receiver 709 of Smart Lock 115; Access-code Receiver 709 of Smart Lock 115 receiving sounds of a predetermined and/or particular pattern and/or frequency that operate as the access-code from at least one sound source; (manually) entering the access-code into Access-code Receiver 709 of Smart Lock 115; combinations thereof; and/or the like. Note, wirelessly broadcasting (transmitting and/or emitting) the access-code from User Device 101 (or other electronic device) to Access-code Receiver 709 of Smart Lock 115 (wherein the Smart Lock 115 does not wirelessly communicate with the User Device 101), may include the access-code as a light signal (or pattern of lights), wherein such emitted light may be in the human visual light spectrum and/or not. Note, playing the access-code from the User Device 101 to Access-code Receiver 709 of Smart Lock 115, may be from speaker(s), a display, and/or a projection of the User Device 101.

Also note, in some embodiments, a given access-code (e.g., a given one-time passcodes [OTPs]) (from Server 103) for unlocking a given Smart Lock 115, in addition to including the information for unlocking (or locking) that given Smart Lock 115, that given access-code may also comprise other (additional/further) information, commands, configuration parameters, and/or instructions for operation and/or configuration of that given Smart Lock 115. That is, this other (additional/further) information, commands, configuration parameters, and/or instructions for operation and/or configuration of that given Smart Lock 115 may be embedded within (or may be part of) the access-code (along with the information that unlocks [or locks] that given Smart Lock 115). For example, and without limiting the scope of the present invention, when the User of User Device 101 presents the display (screen) of that User Device 101, with the access-code displayed on that display (screen) (such as, but not limited to, being in a QR code format—but could be in a different format), this other (additional/further) information, commands, and/or instructions for operation and/or configuration of that given Smart Lock 115 may be passed to that given Smart Lock 115, such that given Smart Lock 115 may then accordingly act upon. Thus, when the access-code is being displayed upon the display (screen) of User Device 101, that given Smart Lock 115 may be (at least partially) configured without use of wireless communications being directed to that given Smart Lock 115 and without physical interacting with that given Smart Lock 115. That is, the other (additional/further) information, commands, and/or instructions for operation and/or configuration of that given Smart Lock 115 may be provided to that given Smart Lock 115 (by showing the access-code to that given Smart Lock 115) in a wireless and/or in a contactless manner.

Whereas, if the access-code (with the other (additional/further) information, commands, and/or instructions for operation and/or configuration of that given Smart Lock 115) is being wirelessly transmitted from User Device 101 to that given Smart Lock 115 (e.g., via RFID, NFC, and/or some other wireless communication protocol), then there may be wireless communication from the User Device 101 to that given Smart Lock 115, but the transmission of the other (additional/further) information, commands, and/or instructions for operation and/or configuration of that given Smart Lock 115 would still be done in a contactless manner.

In some embodiments, the other (additional/further) information, commands, configuration parameters, and/or instructions for operation and/or configuration of that given Smart Lock 115 may comprise one or more of: firmware update; RTC ("real time clock") reset and/or reconfigure commands/instructions; LED (and/or light) behavioral instructions for that given Smart Lock 115; buzzer behavioral instructions for that given Smart Lock 115; vibration behavioral instructions for that given Smart Lock 115; speaker behavioral instructions for that given Smart Lock 115; time window (also known as the "time cycle, interval, and/or cadence" or the "predetermined-time-interval") for access-codes (OTPs) to be valid; low battery behavioral instructions for that given Smart Lock 115; warning message/notification that the given Smart Lock 115 may be "not locked"; warning messages/notifications; messages/notifications; portions thereof; combinations thereof; and/or the like.

Further, embedding the other (additional/further) information, commands, configuration parameters, and/or instructions for operation and/or configuration in some predetermined form (format) of (screen) displayable content (such as, but not limited to, a QR code or the like) and/or in a wireless content format may be used to update and/or configure any electronic and/or computing device (i.e., not just Smart Locks 115), as long as that given target electronic and/or computing device to be updated/configured comprises an Access-Code Receiver 709 or the like (and wherein that electronic and/or computing device is programmed to be up-dated/configured in such a manner). See FIG. 7A for a discussion of Access-Code Receiver 709. Updating, configuring, and/or reconfiguring in this manner may be contactless and/or wireless (e.g., wireless when the access-code [with its other instruction] is displayed). And thus, updating, configuring, and/or reconfiguring in this manner may save battery life and be less costly to manufacture as the electronic device (such as, but not limited to, Smart Lock 115) has lower energy consumption versus an electronic device that is updated, configured, and/or reconfigured in different ways (such as using a wired connection, a physical connection, or two-way [bidirectional] wireless communications).

Figure 2:
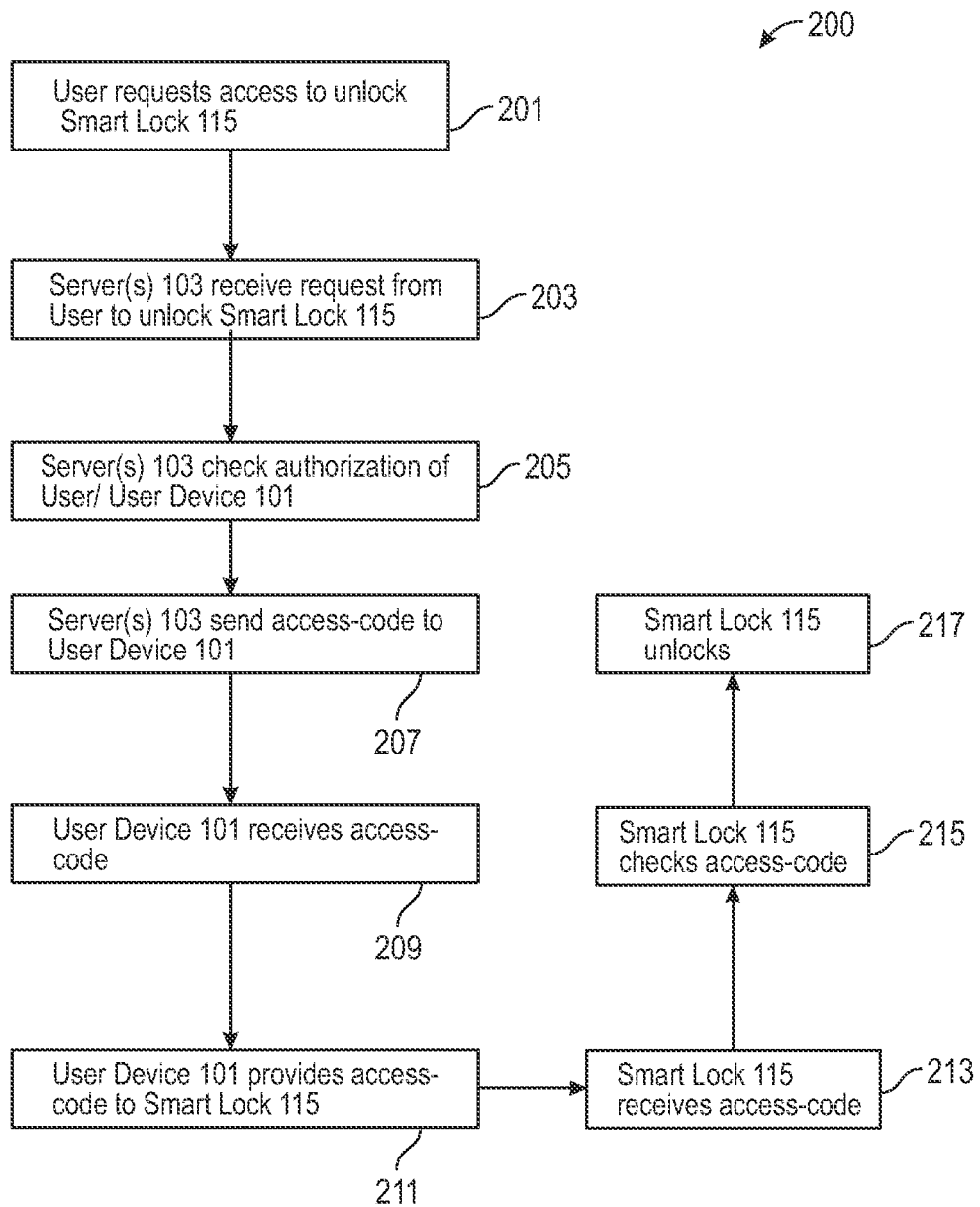
FIG. 2 depicts a method of unlocking a given Smart Lock according to at least some embodiments of the present invention.

FIG. 2 depicts a method 200 of unlocking Smart Lock 115. FIG. 2 may be applicable to the communication pathways 100 of FIG. 1. In some embodiments, method 200 of unlocking Smart Lock 115 may be with respect to unlocking Smart Lock 115 from a single (or at least one) (authorized) User of that Smart Lock 115. In some embodiments, FIG. 2 may show at least one step of method 200. In some embodiments, FIG. 2 may show one or more steps of method 200. In some embodiments, method 200 may comprise at least one step of: step 201, step 203, step 205, step 207, step 209, step 211, step 213, step 215, step, 217, portions thereof, combinations thereof, and/or the like. In some embodiments, method 200 may comprise one or more steps of: step 201, step 203, step 205, step 207, step 209, step 211, step 213, step 215, step, 217, portions thereof, combinations thereof, and/or the like. In some embodiments, at least some of these steps of method 200 may be executed/performed out of numerical order. In some embodiments, at least one of these steps of method 200 may be optional. In some embodiments, at least one of these steps of method 200 may be omitted and/or skipped.

Continuing discussing FIG. 2, in some embodiments, step 201 may be a step of a User and/or of User Device 101 requesting access to unlock Smart Lock 115. In some embodiments, during step 201 the User may use User Device 101 to send and/or to transmit this request to Server(s) 103. In some embodiments, step 201 may entail User Device 101 sending request for access transmission 105 to Server(s) 103. In some embodiments, request for access transmission 105 may utilize at least a portion of Network 109. In some embodiments, step 201 and/or request for access transmission 105 may comprise at least one of: a text message from User Device(s) 101 to Server(s) 103; a SMS message from User Device(s) 101 to Server(s) 103; a MMS message from User Device(s) 101 to Server(s) 103; a phone call from User Device(s) 101 to Server(s) 103; an email from the User to Server(s) 103; (optionally) a request (invitation) from a mobile app running on User Device(s) 101 to Server(s) 103; (optionally) a request (invitation) from a mobile smartphone wallet pass (or the like app) running on User Device(s) 101 to Server(s) 103; from a browser, website, web portal, and/or web interface that User Device(s) 101 may be using and directed to Server(s) 103; an invitation from the User Device(s) 101 to Server(s) 103; combinations thereof; and/or the like, wherein at least some content of the message/transmission may comprise the request for an access-code to unlock (or lock) Smart Lock 115. In some embodiments, at least some content of the message/transmission of step 201 and/or request for access transmission 105 may comprise information that identifies the User and/or that identifies the User Device 101 and/or that includes a serial number of Smart Lock 115 that the User is interested in unlocking. In some embodiments, the information that identifies a given User may be selected from one or more of: User name, User address (e.g., physical, mailing, and/or billing address), User phone number, User email address, User account number, User account name, User name, at least one identifier for that User's User Device 101, combinations thereof, and/or the like. In some embodiments, the information that identifies a given User Device 101 and/or the at least one identifier for a User's User Device 101 may be selected from one or more of: a serial number of that given User Device 101 (or 301), a MAC address of that given User Device 101 (or 301), a name of that given User Device 101 (or 301), a numeric code of that given User Device 101 (or 301), an alphanumeric code of that given User Device 101 (or 301), a machine-readable code of that given User Device 101 (or 301), a binary code of that given User Device 101 (or 301), an optical code of that given User Device 101 (or 301), a barcode of that given User Device 101 (or 301), a QR code of that given User Device 101 (or 301), an address of that given User Device 101 (or 301), a code of that given User Device 101 (or 301), an IP address of that given User Device 101 (or 301), SIM card information of that given User Device 101 (or 301), a phone number of that given User Device 101 (or 301), a RFID tag of that given User Device 101 (or 301), a NFC tag of that given User Device 101 (or 301), portions thereof, combinations thereof, and/or the like. In some embodiments, method 200 may progress from step 201 to step 203.

Continuing discussing FIG. 2, in some embodiments, step 203 may be a step of Server(s) 103 receiving the request from the User and/or from User Device 101 to unlock Smart Lock 115. In some embodiments, step 203 may be a step of Server(s) 103 receiving the request from step 201. In some embodiments, method 200 may progress from step 203 to step 205.

Continuing discussing FIG. 2, in some embodiments, step 205 may be a step of Server(s) 103 checking authorization of the User/User Device 101 such that the User and/or User Device 101 may receive an access-code to unlock Smart Lock 115. In some embodiments, in executing/performing step 205, Server(s) 103 may check (compare) content, data, and/or information of step 201 and/or request for access transmission 105 against a lookup table in a database that is part of Server(s) 103 and/or that is in communication with Server(s) 103. In some embodiments, if this check/comparison is in agreement, then method 200 may progress from step 205 to step 207. In some embodiments, if this check/comparison is not in agreement, then method 200 may not progress from step 205 to step 207; i.e., Server(s) 103 will not provide an access-code to the User and/or to User Device 101.

Continuing discussing FIG. 2, in some embodiments, step 207 may be a step of Server(s) 103 sending an access-code to User Device 101 and/or to the User. In some embodiments, this access-code from Server(s) 103 may be configured for unlocking (or locking) Smart Lock 115, if this access-code is received at Smart Lock 115 within a predetermined amount of time from Server(s) 103 sending/transmitting this access-code to User Device 101 and/or to the User, i.e., in some embodiments, this access-code is time sensitive. Note, the access-code may not be time sensitive in some embodiments. In some embodiments, the access-code may be machine-readable. In some embodiments, during step 207 Server(s) 103 may send and/or may transmit the access-code to the User and/or to User Device 101. In some embodiments, step 207 may entail Server(s) 103 sending/transmitting the access-code, via access-code transmission 111, to the User and/or to User Device 101. In some embodiments, access-code transmission 111 may utilize at least a portion of Network 109. In some embodiments, step 207 and/or access-code transmission 111 may comprise a text message, a SMS message, a MMS message, an email, a phone call, combinations thereof, and/or the like from Server(s) 103 to User Device 101 and/or to the User, wherein at least some content of this message/transmission may comprise the time sensitive access-code to unlock Smart Lock 115. In some embodiments, method 200 may progress from step 207 to step 209.

Continuing discussing FIG. 2, in some embodiments, method 200 (and/or method 400) may begin with step 205 and/or step 207. (See e.g., FIG. 4 for method 400). In some embodiments, method 200 (and/or method 400), via step 207, may stream, push, and/or the like an appropriate access-code to User Device 101 (and/or to User Device 301) for unlocking (or locking) Smart Lock 115. In some embodiments, method 200 (and/or method 400), via step 207, may stream, push, and/or the like an appropriate access-code to User Device 101 (and/or to User Device 301) for unlocking (or locking) Smart Lock 115, one time, periodically, or intermittently. In some embodiments, step 207 need not be triggered by prior execution of step 201. In some embodiments, step 207 need not be triggered by prior execution of step 401 (see e.g., FIG. 4 for step 401).

Continuing discussing FIG. 2, in some embodiments, step 209 may be a step of User Device 101 and/or of the User receiving the access-code from the Server(s) 103. In some embodiments, step 209 may be a step of User Device 101 and/or of the User receiving the access-code from step 207. In some embodiments, method 200 may progress from step 209 to step 211.

Continuing discussing FIG. 2, in some embodiments, step 211 may be a step of the User and/or User Device 101 presenting and/or providing the access-code (from steps 207 and 209) to Smart Lock 115. In some embodiments, step 211 may be executed and/or performed at least in part by the User and/or User Device 101 initiating present/provide access-code 117. In some embodiments, depending upon the types of Access-code Receiver(s) 709 of Smart Lock 115 (such as, but not limited to, a camera, a barcode scanner, a photo reader, a face recognition camera, a keypad, a touch pad, a touch screen, a keypad, a number wheel, a microphone, combinations thereof, and/or the like); and/or depending upon the format of access-code transmission 111 (such as, but not limited to, a text message from Server(s) 103 to User Device(s) 101; a SMS message from Server(s) 103 to User Device(s) 101; a MMS message from Server(s) 103 to User Device(s) 101; a phone call from Server(s) 103 to User Device(s) 101; a voicemail from Server(s) 103 to User Device(s) 101; an email from Server(s) 103 to the User(s); (optionally) a notification at a mobile app running on User Device(s) 101 from Server(s) 103; a phone notification displaying or displayed on User Device(s) 101 from Server(s) 103; to a mobile wallet pass software or the like running User Device(s) 101 from Server(s) 103; to a website, web portal, web interface that may be accessed by a browser running User Device(s) 101 from Server(s) 103; a notification configured to be displayed on a display of User Device(s) 101; receipt of the provided access-code on software running on User Device(s) 101 from Server(s) 103; combinations thereof; and/or the like—that include the access-code), present/provide access-code 117, as step 211, may be executed in one or more ways, such as, but not limited to: presenting a display (screen) of User Device 101 to Access-code Receiver 709 of Smart Lock 115, wherein the access-code is displayed on that display (screen); presenting a display (screen) of an electronic device to Access-code Receiver 709 of Smart Lock 115, wherein the access-code is displayed on that display; Access-code Receiver 709 of Smart Lock 115 receiving lights of a predetermined and/or particular pattern and/or wavelength (frequency) that operate as the access-code from at least one light source; wirelessly broadcasting (transmitting and/or emitting) the access-code from User Device 101 (or other electronic device) to Access-code Receiver 709 of Smart Lock 115 (wherein the Smart Lock 115 does not wirelessly communicate with the User Device 101); speaking the access-code from the User to Access-code Receiver 709 of Smart Lock 115; playing the access-code over speaker(s) of User Device 101 to Access-code Receiver 709 of Smart Lock 115; Access-code Receiver 709 of Smart Lock 115 receiving sounds of a predetermined and/or particular pattern and/or frequency that operate as the access-code from at least one sound source; (manually) entering the access-code into Access-code Receiver 709 of Smart Lock 115; combinations thereof; and/or the like. In some embodiments, method 200 may progress from step 211 to step 213.

Continuing discussing FIG. 2, in some embodiments, step 211 may at least in part entail first waking-up Smart Lock 115 before presenting/providing 117 the access-code to Smart Lock 115. In some embodiments, when Smart Lock 115 may be locked, a default state, status, and/or stage of Smart Lock 115 may be a dormant/sleep mode that may be configured to minimize electrical power consumption and/or be a low power mode of Smart Lock 115. In some embodiments, Smart Lock 115 may need to be woken-up out of this dormant/sleep mode (low power mode) into a more active power mode (awake mode). In some embodiments, waking-up Smart Lock 115 may entail one or more of: physically moving Smart Lock 115 from one physical position to another physical position (and/or repeating such movement of Smart Lock 115); physically oscillating Smart Lock 115; the User shaking (jiggling) Smart Lock 115; speaking a predetermined wake-up phrase/command/instruction to Smart Lock 115; causing User Device 101 to broadcast a wake-up signal to Smart Lock 115; causing User Device 101 to emit the predetermined wake-up phrase/command/instruction from speaker(s) of User Device 101 to Smart Lock 115; Smart Lock 115 detecting motion external to Smart Lock 115 (e.g., via an optical sensor, PIR sensor, and/or acoustical sensor); pressing a (wakeup) button on Smart Lock 115; combinations thereof; and/or the like. In some embodiments, waking-up Smart Lock 115 may be a first aspect of step 211 (before presenting/providing 117 the access-code to Smart Lock 115).

Continuing discussing FIG. 2, in some embodiments, step 213 may be a step of Smart Lock 115 receiving the presented/provided access-code from step 211. In some embodiments, step 213 may be a step of Smart Lock 115 receiving the presented/provided access-code from User Device 101 and/or from the User. In some embodiments, method 200 may progress from step 213 to step 215.

Continuing discussing FIG. 2, in some embodiments, step 215 may be a step of Smart Lock 115 checking the received access-code. In some embodiments, this step 215 check may entail both making sure that the received access-code is timely (not expired) and making sure that the timely received access-code solves the predetermined and known (e.g., known by Smart Lock 115) cryptographic/cryptological/hash algorithm (predetermined hash-algorithm) running on at least some electronics of the Smart Lock 115. In some embodiments, if this step 215 check is both timely and solves the predetermined cryptographic/cryptological/hash algorithm (predetermined hash-algorithm) running on the Smart Lock 115, then method 200 may progress from step 215 to step 217. In some embodiments, step 215 may be a step of Smart Lock 115 of checking if the access-code is received in a timely manner at Smart Lock 115 and if the access-code solves the predetermined hash-algorithm running on the at least some electronics of Smart Lock 115. In some embodiments, also running on the at least some of the electronics of Smart Lock 115 is the predetermined-time-interval that continuously counts down to no time remaining and then resets and starts over. In some embodiments, the predetermined hash-algorithm has at least one solution per each of the predetermined-time-interval that has time remaining. In some embodiments, receiving the access-code at Smart Lock 115 is received in the timely manner, if the received access-code at Smart Lock 115 is the at least one solution to the predetermined hash-algorithm for a particular of the predetermined-time-internal that has not reached zero. Note, because Server(s) 103 know the particular predetermined hash-algorithm running on a given Smart Lock 115 and because Server(s) 103 maintain, monitor, and/or know a countdown counter that is synchronized to the predetermined-time-interval running on that same given Smart Lock 115, then Server(s) 103 know what access-code for each predetermined-time-interval will solve that particular predetermined hash-algorithm running on that same given Smart Lock 115. In some embodiments, if this step 215 check is not timely (e.g., the received access-code has expired) or the received access-code does not solve the predetermined cryptographic/cryptological/hash algorithm running on the Smart Lock 115, then method 200 may not progress from step 215 to step 217; i.e., Smart Lock 115 may not unlock.

Continuing discussing FIG. 2, in some embodiments, step 217 may be a step of Smart Lock 115 unlocking. In some embodiments, step 217 may entail Smart Lock 115 electrically energizing/actuating Electrical/Mechanical Lock Interface/Locking Means 711 such that the mechanical locking aspect of Smart Lock 115 may then unlock and/or open. See FIG. 7A for Electrical/Mechanical Lock Interface/Locking Means 711. In some embodiments, completion of step 217 may result in Smart Lock 115 being unlocked and/or open. In some embodiments, locking (or re-locking) of Smart Lock 115 may be accomplished by a person exerting a mechanical closing motion onto Smart Lock 115 as would be typical to lock a purely (physical) mechanical lock without electronics (e.g., locking [or closing] a standard dumb padlock).

Figure 3:
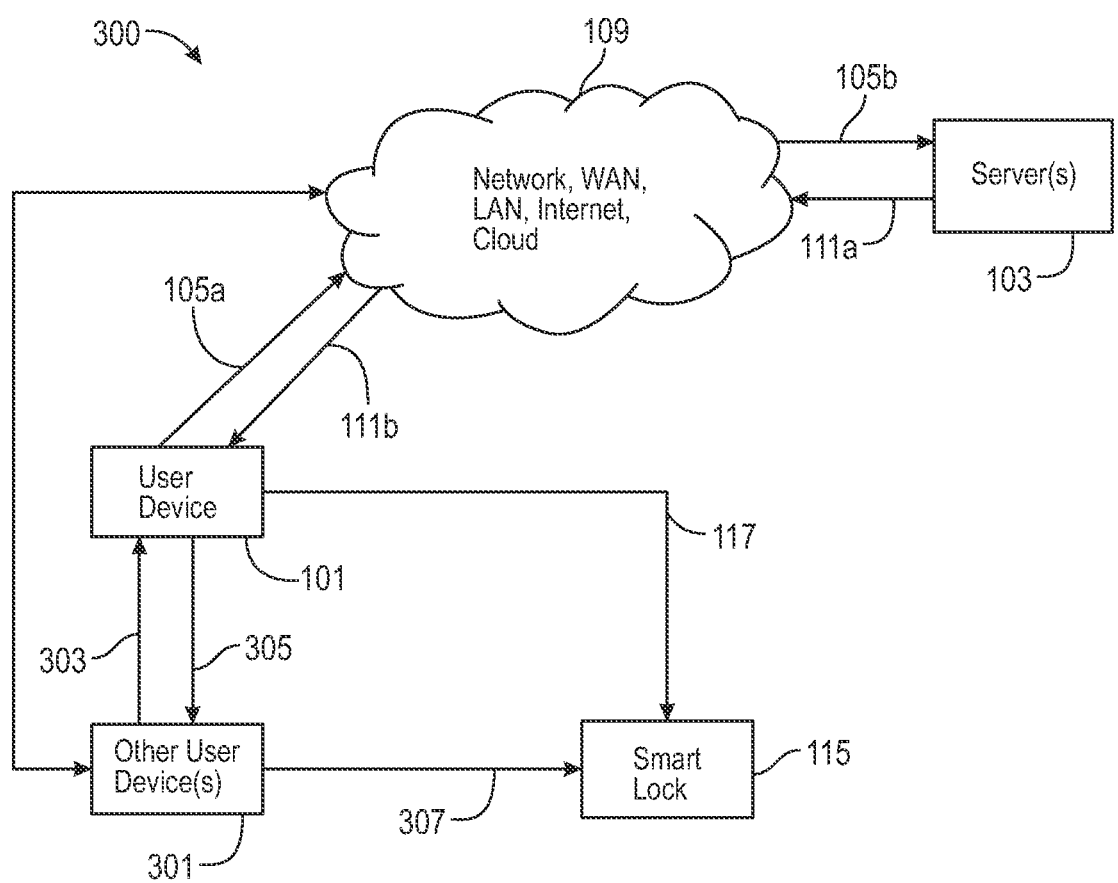
FIG. 3 depicts a block diagram showing other communication pathways for unlocking a given Smart Lock according to at least some embodiments of the present invention.

FIG. 3 depicts a block diagram showing communication pathways 300 for unlocking a given Smart Lock 115. In some embodiments, FIG. 3 may depict the unlocking (or locking) communication scenario/environment for multiple (authorized) Users of that Smart Lock 115. In some embodiments, the (authorized) Users using a User Device 101 and/or using Other User Device(s) 301 may request from at least one Server 103 that an access-code be provided to at least one such User and/or to Other User Device(s) 301 (from the at least one Server 103 or a computing device controlled by at least one Server 103) for a purpose of the at least one User and/or the Other User Device(s) 301 then providing that access-code to Smart Lock 115 so that Smart Lock 115 may then unlock.

Continuing discussing FIG. 3, in some embodiments, Other User Device 301 may be a same type of device as User Device 101, but a different device and used and/or controlled by a different person (e.g., the Other User). In some embodiments, Other User Device 301 may be a computing device, such as, but not limited to, a computer. In some embodiments, Other User Device 301 may be selected from one or more of: a smartphone; a tablet computer; a laptop computer; a mobile computer; a handheld compute; a smartwatch; an electronic (key) fob; a wearable computer; a wearable electronic device; a one (1) way speaker; a two (2) way speaker; a voice activated speaker; a voice controlled speaker; a smart speaker; at least one light source; at least one sound source; an electronic monitoring sensor; an electronic device capable of transmitting, broadcasting, emitting, showing, and/or displaying an unlock code (access-code); portions thereof; combinations thereof; and/or the like. In some embodiments, Other User Device 301 may be in wireless communication, wired communication, portions thereof, combinations thereof, and/or the like with User Device 101. In some embodiments, Other User Device 301 may be in direct or indirect communication with User Device 101. In some embodiments, Other User Device 301 may be in wireless communication, wired communication, portions thereof, combinations thereof, and/or the like with Network 109. In some embodiments, Other User Device 301 may be in indirect communications (e.g., by utilizing at least a portion of Network 109) and/or intermittent communications with Server(s) 103.

Continuing discussing FIG. 3, whereas User Device 101 may be used and/or controlled by the User, in some embodiments, Other User Device 301 maybe used and/or controlled by an Other User. In some embodiments, the Other User may be an authorized Other User, wherein an authorized Other User may be a person who is authorized to unlock Smart Lock 115. In some embodiments, an authorized Other User may have at least one of their: Other User name, Other User address (e.g., physical, mailing, and/or billing address), Other User phone number, Other User email address, Other User account number, Other User account name, user name, at least one identifier for that Other User's Other User Device 301, combinations thereof, and/or the like associated (linked) with a particular Smart Lock 115 (e.g., by the at least one identifier for that Other User's Other User Device 301) in (electronic) records that are accessible, updated, and/or maintained by Server(s) 103. In some embodiments, the Other User may be authorized to unlock (or lock) Smart Lock 115 at least once, by the (authorized) User and/or by Server(s) 103.

Continuing discussing FIG. 3, in some embodiments, Other User Device(s) 301 (controlled and/or used by the Other User(s)) may make a request for an access-code for Smart Lock 115 to unlock from the User and/or from User Device 101 via request for access transmission 303. In some embodiments, request for access transmission 303 may be one or more transmissions of data and/or information from Other User Device(s) 301 directed to User Device 101 that are requesting the access-code for unlocking Smart Lock 115. In some embodiments, request for access transmission 303 may in at least one of the following formats: a text message from Other User Device(s) 301 to User Device 101; a SMS message (short message service message) from Other User Device(s) 301 to User Device 101; a MMS message (multimedia messaging service message) from Other User Device(s) 301 to User Device 101; a phone call from Other User Device(s) 301 to User Device 101; an email from the Other User to the User; (optionally) a request (invitation) from a mobile app running on Other User De-vice(s) 301 to User Device 101; (optionally) a request (invitation) from a mobile smartphone wallet pass (or the like app) running on Other User Device(s) 301 to User Device 101; from a browser, website, web portal, and/or web interface that Other User Device(s) 301 may be using and directed to User Device(s) 101; an invitation from the Other User Device(s) 301 to User Device 101; a displayed communication from the Other Device 301 to the User Device 101; a visual communication from the Other Device 301 to the User Device 101; an auditory (sound) communication from the Other Device 301 to the User Device 101; a verbal communication from the Other User(s) to the User; a written communication from the Other User(s) to the User; a communication from Other User Device 301 to User Device 101; a communication from social media (from an account linked to the Other User and/or to Other User Device 301) to User Device 101; a communication from a messaging platform (from an account linked to the Other User and/or to Other User Device 301) to User Device 101; combinations thereof; and/or the like. Note, communications between Other Device 301 and User Device 101 may be routed at least partially through Network/Internet 109 and/or direct device-to-device communications may also be utilized.

Continuing discussing FIG. 3, in some embodiments, after the User and/or User Device 101 has received the request for access transmission 303, the User may then check to see whether or not that Other User Device 301 and/or that Other User are authorized to receive access-codes for unlocking Smart Lock 115. In some embodiments, if the received request for access transmission 303 was from an authorized Other User and/or from an authorized Other User Device 301, then the User and/or User Device 101 may provide the time sensitive access-code to the authorized Other User and/or the authorized Other User Device 301 via access-code transmission 305. In some embodiments, the User and/or User Device 101 may already have access to the time sensitive access-code from Server(s) 103 (see e.g., FIG. 1 and FIG. 2 and their above discussions). In some embodiments, access-code transmission 305 may be one or more transmissions of data and/or information from the User and/or from User Device 101 directed to Other User Device 301 and/or directed to the Other User that includes the time sensitive access-code for unlocking Smart Lock 115. In some embodiments, access-code transmission 305 may be in at least one of the following formats: a text message from User Device 101 to Other User Device(s) 301; a SMS message from User Device 101 to Other User De-vice(s) 301; a MMS message from User Device 101 to Other User Device(s) 301; a phone call from User Device 101 to Other User Device(s) 301; an email from the User to the Other User(s); (optionally) from a mobile app running on User Device 101 to Other User Device 301; from a mobile smartphone wallet pass (or the like app) running on User Device 101 to Other User Device 101; from a browser, website, web portal, and/or web interface that User Device 101 may be using and directed to Other User Device 301; from the User Device 101 to Other User Device 301; a displayed content from the User Device 101 to the Other User Device 301; a visual communication from the User Device 101 to the Other User Device 301; an auditory (sound) communication from the User Device 201 to the Other User Device 301; a verbal communication from the User to the Other User(s); a written communication from the User to the Other User(s); a communication from User Device 101 to Other User Device 301; a communication from social media (from an account linked to the User and/or to User Device 101) to Other User Device 301; a communication from a messaging platform (from an account linked to the User and/or to User Device 101) to Other User Device 301; combinations thereof; and/or the like. In some embodiments, access-code transmission 305 may comprise a screenshot (screen grab/screen capture) of the access-code received onto User Device 101. In some embodiments, access-code transmission 305 may comprise a screenshot (screen grab/screen capture) of the access-code received onto User Device 101 as well as sharing that screenshot (screen share) from user Device 101 with Other Device(s) 301. In some embodiments, one or more social media platforms and/or messaging platforms, such as, but not limited to, FaceTime, Slack, Teams, Group Me, and/or various other messaging platforms, may be utilized in requesting and/or for providing the access-code(s) as between Users and/or Other Users and/or as between User Devices 101 and/or Other User Devices 301.

Continuing discussing FIG. 3, in some embodiments, after Other User Device(s) 301 and/or the Other User(s) have received the time sensitive access-code, via access-code transmission 305, from the User and/or from the User Device 101, then within the allotted predetermined amount of time, Other User Device(s) 301 and/or the Other User(s) may present/provide 307 the access-code to Smart Lock 115. In some embodiments, if Smart Lock 115 has received the access-code from present/provide access-code 307 in a timely manner and if that time sensitive access-code solves the cryptographic/cryptological/hash algorithm running on the Smart Lock 115, then Smart Lock 115 may unlock. In some embodiments, if the presented/provided access-code has expired (is too old [expired]), then Smart Lock 115 may not unlock. In some embodiments, if the presented/provided access-code does not solve the cryptographic/cryptological/hash algorithm running on the Smart Lock 115, then Smart Lock 115 may not unlock.

Continuing discussing FIG. 3, in some embodiments, present/provide access-code 307 may be one or more methods of presenting and/or providing the time sensitive access-code to Smart Lock 115. For example, and without limiting the scope of the present invention, in some embodiments, when the access-code may be displayed on a display/screen of Other User Device 301, then the Other User may present the display/screen of Other User Device 301 with the access-code displayed to Access-code Receiver 709 of Smart Lock 115. (See FIG. 7A for Access-code Receiver 709.) In such an example, the access-code may be a visual access-code, a QR code (quick response code), a barcode, a two-dimensional code (2D code), a three-dimensional code (3D code), a machine-readable code, an alphanumeric code, a numeric code, a letter code, audio code (sound/audible code), portions thereof, combinations thereof, and/or the like. In such an example, Access-code Receiver 709 may be one or more: cameras, barcode scanners, photo readers, face recognition cameras, microphones, combinations thereof, and/or the like.

Continuing discussing FIG. 3, for example, and without limiting the scope of the present invention, in some embodiments, when the access-code may be wirelessly broadcast (transmitted and/or emitted) from Other User Device 301 to Smart Lock 115, then the Other User may broadcast the access-code from Other User Device 301 with Other User Device 301 being sufficiently close to Smart Lock 115, wherein the Access-code Receiver 709 of Smart Lock 115 may then receive this broadcast of the access-code. In such an example, the access-code may be a wireless transmission, such as, but not limited to a radio transmission, an IR (infrared) transmission, portions thereof, combinations thereof, and/or the like. In such an example, Access-code Receiver 709 may be one or more: receivers, radios, antennas, combinations thereof, and/or the like. In this example access-code transmissions from Other User Device 301 to Smart Lock 115 (Access-code Receiver 709) may be examples of RFID communications and/or NFC.

Continuing discussing FIG. 3, for example, and without limiting the scope of the present invention, in some embodiments, when the access-code may be audibly spoken by the Other User and/or emitted from speaker(s) of the Other User Device 301, then the Other User may speak the access-code or play the access-code over the speaker(s) of Other User Device 301 in sufficient proximity to Access-code Receiver 709 of Smart Lock 115. In such an example, the access-code may be a spoken code or an auditory machine-to-machine code. In such an example, Access-code Receiver 709 may be one or more: microphones and/or the like.

Continuing discussing FIG. 3, for example, and without limiting the scope of the present invention, in some embodiments, when the access-code may be manually entered in on Smart Lock, then the Other User may enter the access-code in/to Access-code Receiver 709 of Smart Lock 115. In such an example, the access-code may be an alphanumeric code, a numeric code, a letter code, portions thereof, combinations thereof, and/or the like. In such an example, Access-code Receiver 709 may be one or more: keypads, touchscreens, number wheels, combinations thereof, and/or the like.

Continuing discussing FIG. 3, in some embodiments, present/provide access-code 307 may be one or more methods of presenting and/or providing the time sensitive access-code to Smart Lock 115 such as, but not limited to: presenting a display/screen of Other User Device 301 to Access-code Receiver 709 of Smart Lock 115, wherein shown in that dis-play/screen is the access-code; wirelessly broadcasting (transmitting and/or emitting) the access-code from Other User Device 301 to Access-code Receiver 709 of Smart Lock 115;

speaking the access-code from the Other User to Access-code Receiver 709 of Smart Lock 115; playing the access-code over speaker(s) of Other User Device 301 to Access-code Receiver 709 of Smart Lock 115; (manual) entering the access-code into Access-code Receiver 709 of Smart Lock 115; and/or the like.

Figure 4:
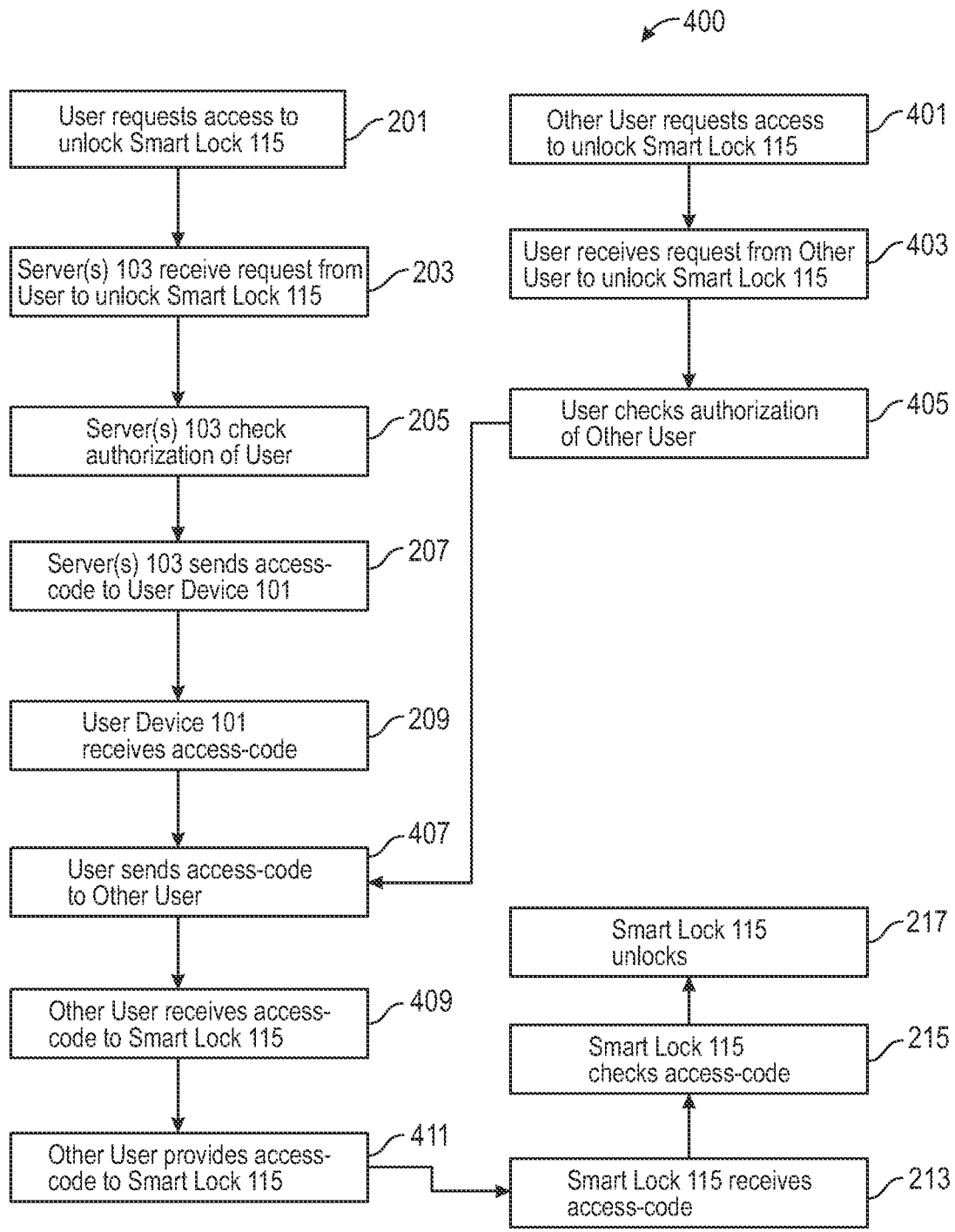
FIG. 4 depicts another method of unlocking a given Smart Lock according to at least some embodiments of the present invention.

FIG. 4 depicts a method 400 of unlocking Smart Lock 115. FIG. 4 may be applicable to the communication pathways 300 of FIG. 3. In some embodiments, method 400 of unlocking Smart Lock 115 may be with respect to unlocking Smart Lock 115 from multiple (authorized) Users of that Smart Lock 115. In some embodiments, FIG. 4 may show at least one step of method 400. In some embodiments, FIG. 4 may show one or more steps of method 400. In some embodiments, method 400 may comprise at least one step of: step 201, step 203, step 205, step 207, step 209, step 401, step 403, step 405, step 407, step 409, step 411, step 213, step 215, step, 217, portions thereof, combinations thereof, and/or the like. In some embodiments, method 400 may comprise one or more steps of: step 201, step 203, step 205, step 207, step 209, step 401, step 403, step 405, step 407, step 409, step 411, step 213, step 215, step, 217, portions thereof, combinations thereof, and/or the like. In some embodiments, at least some of these steps of method 400 may be executed/performed out of numerical order. In some embodiments, at least one of these steps of method 400 may be optional. In some embodiments, at least one of these steps of method 400 may be omitted and/or skipped. In some embodiments, execution/performance of step 201, step 203, step 205, step 207, and/or of step 209 must be completed before execution/performance of step 407; however, step 401, 403, and/or step 405 may be executed/performed before, after, concurrently, and/or combinations thereof with respect to executing/performing step 201, step 203, step 205, step 207.

Continuing discussing FIG. 4, in some embodiments, step 201 may be a step of a User and/or of User Device 101 requesting access to unlock Smart Lock 115. In some embodiments, during step 201 the User may use User Device 101 to send and/or to transmit this request to Server(s) 103. In some embodiments, step 201 may entail User Device 101 sending request for access transmission 105 to Server(s) 103. In some embodiments, request for access transmission 105 may utilize at least a portion of Network 109. In some embodiments, step 201 and/or request for access transmission 105 may comprise a text message, a SMS message, a MMS message, an email, a phone call, combinations thereof, and/or the like from User Device 101 to Server(s) 103, wherein at least some content of the message/transmission may comprise the request for an access-code to unlock Smart Lock 115. In some embodiments, at least some content of the message/transmission of step 201 and/or request for access transmission 105 may comprise information that identifies the User and/or that identifies the User Device 101 and/or that includes the at least one identifier for a given Smart Lock 115 that the User is interested in unlocking (or locking). In some embodiments, the information that identifies the User may be selected from one or more of: User name, User address (e.g., physical, mailing, and/or billing address), User phone number, User email address, User account number, User account name, User name, the at least one identifier for that User's User Device 101, combinations thereof, and/or the like. In some embodiments, the information that identifies a given User Device 101 and/or the at least one identifier for a User's User Device 101 may be selected from one or more of: a MAC address of that given User Device 101, an IP address of that given User Device 101, a serial number of that given User Device 101, SIM card information of that given User Device 101, a phone number of that given User Device 101, a RFID tag of that given User Device 101, a NFC tag of that given User Device 101, portions thereof, combinations thereof, and/or the like. In some embodiments, method 400 may progress from step 201 to step 203.

Continuing discussing FIG. 4, in some embodiments, step 203 may be a step of Server(s) 103 receiving the request from the User and/or from User Device 101 to unlock Smart Lock 115. In some embodiments, step 203 may be a step of Server(s) 103 receiving the request from step 201. In some embodiments, method 400 may progress from step 203 to step 205.

Continuing discussing FIG. 4, in some embodiments, step 205 may be a step of Server(s) 103 checking authorization of the User/User Device 101 such that the User and/or User Device 101 may receive an access-code to unlock Smart Lock 115. In some embodiments, in executing/performing step 205, Server(s) 103 may check (compare) content, data, and/or information of step 201 and/or request for access transmission 105 against a lookup table in a database that is part of Server(s) 103 and/or that is in communication with Server(s) 103. In some embodiments, if this check/comparison is in agreement, then method 400 may progress from step 205 to step 207. In some embodiments, if this check/comparison is not in agreement, then method 400 may not progress from step 205 to step 207; i.e., Server(s) 103 will not provide an access-code to the User and/or to User Device 101.

Continuing discussing FIG. 4, in some embodiments, step 207 may be a step of Server(s) 103 sending an access-code to User Device 101 and/or to the User. In some embodiments, this access-code from Server(s) 103 may be configured for unlocking Smart Lock 115, if this access-code is received at Smart Lock 115 within a predetermined amount of time from Server(s) 103 sending/transmitting this access-code to User Device 101 and/or to the User, i.e., in some embodiments, this access-code is time sensitive. In some embodiments, the access-code may be machine readable. In some embodiments, during step 207 Server(s) 103 may send and/or may transmit the access-code to the User and/or to User Device 101. In some embodiments, step 207 may entail Server(s) 103 sending/transmitting the access-code, via access-code transmission 111, to the User and/or to User Device 101. In some embodiments, access-code transmission 111 may utilize at least a portion of Network 109. In some embodiments, step 207 and/or access-code transmission 111 may comprise a text message, a SMS message, a MMS message, an email, a phone call, combinations thereof, and/or the like from Server(s) 103 to User Device 101 and/or to the User, wherein at least some content of this message/transmission may comprise the time sensitive access-code to unlock Smart Lock 115. In some embodiments, method 400 may progress from step 207 to step 209.

Continuing discussing FIG. 4, in some embodiments, step 209 may be a step of User Device 101 and/or of the User receiving the access-code from the Server(s) 103. In some embodiments, step 209 may be a step of User Device 101 and/or of the User receiving the access-code from step 207. In some embodiments, method 400 may progress from step 209 to step 407.

Continuing discussing FIG. 4, in some embodiments, step 401 may be a step of at least one Other User and/or of at least one Other User Device 301 requesting access to unlock (or lock) Smart Lock 115. In some embodiments, during step 401 the Other User may use Other User Device 301 to send and/or to transmit this request to User Device 101. In some embodiments, step 401 may entail Other User Device 301 sending request for access transmission 303 to User Device 101. In some embodiments, request for access transmission 303 may utilize at least a portion of Network 109. In some embodiments, step 401 and/or request for access transmission 303 may comprise a text message, a SMS message, a MMS message, an email, a phone call, (optionally) a request from a mobile app running on Other User Device 301, combinations thereof, and/or the like from Other User Device 301 to User Device 101, wherein at least some content of the message/transmission may comprise the request for an access-code to unlock Smart Lock 115. In some embodiments, at least some content of the message/transmission of step 401 and/or request for access transmission 303 may comprise information that identifies the Other User and/or that identifies the User Device 301 and/or that includes a serial number of Smart Lock 115 that the Other User is interested in unlocking; such that, the User and/or User Device 101 knows who that Other User is, knows the Other User Device 301, and/or knows which Smart Lock 115 is desired to be unlocked. In some embodiments, the information that identifies the Other User may be selected from one or more of: an Other User name, an Other User address (e.g., physical and/or mailing address), an Other User phone number, an Other User email address, combinations thereof, and/or the like. In some embodiments, the information that identifies Other User Device 301 may be selected from one or more of: a MAC address of Other User Device 301, an IP address of Other User Device 301, a serial number of Other User Device 301, SIM card information of Other User Device 301, a phone number of Other User Device 301, combinations thereof, and/or the like. In some embodiments, method 400 may progress from step 401 to step 403.

Continuing discussing FIG. 4, in some embodiments, method 400 may begin with step 205 and/or step 207. In some embodiments, method 400, via step 207, may stream, push, and/or the like an appropriate access-code to User Device 101 (and/or to User Device 301) for unlocking (or locking) Smart Lock 115. In some embodiments, method 400, via step 207, may stream, push, and/or the like an appropriate access-code to User Device 101 (and/or to User Device 301) for unlocking (or locking) Smart Lock 115, one time, periodically, or intermittently. In some embodiments, step 207 need not be triggered by prior execution of step 201. In some embodiments, step 207 need not be triggered by prior execution of step 401.

Continuing discussing FIG. 4, in some embodiments, step 403 may be a step of the User and/or User Device 101 receiving the request from the Other User and/or from Other User Device 301 to unlock Smart Lock 115. In some embodiments, step 403 may be a step of the User and/or User Device 101 receiving the request from step 401. In some embodiments, method 400 may progress from step 403 to step 405.

Continuing discussing FIG. 4, in some embodiments, step 405 may be a step of the User and/or User Device 101 checking authorization of the Other User and/or of Other User Device 301 such that the Other User and/or Other User Device 301 may receive the access-code to unlock Smart Lock 115. In some embodiments, in executing/performing step 405, the User and/or User Device 101 may check (compare) content, data, and/or information of step 401 and/or request for access transmission 303 against a lookup table in a database. In some embodiments, this step 405 check may be a simple as whether or not the user knows the Other User; and/or whether or not the User has a preexisting relationship with the Other User. In some embodiments, if this check/comparison is in agreement, then method 400 may progress from step 405 to step 407. In some embodiments, if this check/comparison is not in agreement, then method 400 may not progress from step 405 to step 407; i.e., the User and/or User Device 101 will not provide the access-code to the Other User and/or of Other User Device 301.

Continuing discussing FIG. 4, in some embodiments, step 407 may be a step of the User and/or User Device 101 sending the access-code to Other User Device 301 and/or to the Other User. In some embodiments, this access-code from the User and from User Device 101 may be for unlocking (or locking) Smart Lock 115, if this access-code is received at Smart Lock 115 within a predetermined amount of time from Server(s) 103 sending/transmitting this access-code to User Device 101 and/or to the User, i.e., in some embodiments, this access-code is time sensitive. In some embodiments, during step 407 the User and/or User Device 101 may send and/or may transmit the access-code to Other User Device 301 and/or to the Other User. In some embodiments, step 407 may entail the User and/or User Device 101 sending/transmitting the access-code, via access-code transmission 305, to Other User Device 301 and/or to the Other User. In some embodiments, access-code transmission 305 may utilize at least a portion of Network 109. In some embodiments, step 407 and/or access-code transmission 305 may comprise and/or may be delivered using at least one of: a text message, a SMS message, a MMS message, an email, a phone call, a voicemail, a video call, a videomail, a video, a verbal communication, a written communication, a visual communication, an auditory communication, a sound recording, a sound file, an audiovisual file, use of a messaging service, a messaging platform, a direct message (DM) communication, a mobile app messaging service, a social media messaging service, an onscreen notification, a web app notification, combinations thereof, and/or the like from the User and/or User Device 101 to the Other User Device 301 and/or to the Other User, wherein at least some content of this message/transmission may comprise the time sensitive access-code to unlock (or lock) Smart Lock 115. In some embodiments, method 400 may progress from step 407 to step 409.

In some embodiments, steps 401 to 407 or steps 401 to 405 may be executed in real-time or near real-time (e.g., within longevity of a given access-code) with respect to the moment when the Other User may need to (requests) unlock (or lock) Smart Lock 115. However, in other embodiments, the Other User and/or the Other User's Other User Device 301, may go through steps 401 or 405 (or the like) to authorize and/or validate the Other User and/or the Other User's Other User Device 301 for unlocking (or locking) Smart Lock 115 in advance of when the Other User may need/desire to unlock (or lock) Smart Lock 115. In some embodiments, the User may select a predetermined and/or custom window of time (for counting down sometime in the future) that the Other User and/or the Other User's Other User Device 301 may be authorized for unlocking (or locking) Smart Lock 115. For example, and without limiting the scope of the present invention, the predetermined and/or the custom window of time may be: five minutes, ten minutes, fifteen minutes, twenty minutes, twenty-five minutes, thirty minutes, forty-five minutes, one hour, two hours, three hours, four hours, five hours, six hours, seven hours, eight hours, one day, one week, one month, indefinitely, or some other predetermined and custom amount of time. In other embodiments, this predetermined and/or this custom window of time may be some other amount of time. In some embodiments, this predetermined and/or this custom window of time may also be changed (e.g., at the Server 103 side and/or authorized by Server 103).

Continuing discussing FIG. 4, in some embodiments, step 409 may be a step of Other User Device 301 and/or to the Other User receiving the access-code from the User Device 101 and/or of the User. In some embodiments, step 409 may be a step of Other User Device 301 and/or to the Other User receiving the access-code from step 407. In some embodiments, method 400 may progress from step 409 to step 411.

Continuing discussing FIG. 4, in some embodiments, step 411 may be a step of the Other User and/or Other User Device 301 presenting and/or providing the access-code (from steps 207, 209, 407 and 409) to Smart Lock 115. In some embodiments, step 411 may be executed and/or performed at least in part by the Other User and/or Other User Device 301 initiating present/provide access-code 307. In some embodiments, depending upon the types of Access-code Receiver(s) 709 of Smart Lock 115 (such as, but not limited to, a camera, a barcode scanner, a photo reader, a face recognition camera, a keypad, a touch pad, a touch screen, a keypad, a number wheel, a microphone, combinations thereof, and/or the like); and/or depending upon the format of access-code transmission 111 (such as, but not limited to, a text message, a SMS message, a MMS message, an email, a phone call, combinations thereof, and/or the like—that include the access-code), present/provide access-code 307 may be executed in one or more ways, such as, but not limited to: presenting a display/screen of Other User Device 301 to Access-code Receiver 709 of Smart Lock 115, wherein that display/screen is displaying the access-code; wirelessly broadcasting the access-code from Other User Device 301 to Access-code Receiver 709 of Smart Lock 115; speaking the access-code from the Other User to Access-code Receiver 709 of Smart Lock 115; playing the access-code over speaker(s) of Other User Device 301 to Access-code Receiver 709 of Smart Lock 115; entering the access-code into Access-code Receiver 709 of Smart Lock 115; and/or the like. In some embodiments, method 400 may progress from step 411 to step 213.

Continuing discussing FIG. 4, in some embodiments, step 411 may at least in part entail first waking-up Smart Lock 115 before presenting/providing 307 the access-code to Smart Lock 115. In some embodiments, when Smart Lock 115 may be locked, a default state, status, and/or stage of Smart Lock 115 may be a dormant/sleep mode that may be configured to minimize electrical power consumption and/or be a low power mode of Smart Lock 115. In some embodiments, Smart Lock 115 may need to be woken-up out of this dormant/sleep mode (low power mode) into a more active power mode (awake mode). In some embodiments, waking-up Smart Lock 115 may entail the User jiggling (shaking) Smart Lock 115, speaking a predetermined wake-up phrase/command/instruction to Smart Lock 115, causing User Device 101 to broadcast a wake-up signal to Smart Lock 115, causing User Device 101 to emit the predetermined wake-up phrase/command/instruction from speaker(s) of User Device 101 to Smart Lock 115, pressing a (wakeup) button on Smart Lock 115, combinations thereof, and/or the like. In some embodiments, waking-up Smart Lock 115 may be a first aspect of step 411 (before presenting/providing 307 the access-code to Smart Lock 115). See also step 211.

Continuing discussing FIG. 4, in some embodiments, step 213 may be a step of Smart Lock 115 receiving the presented/provided access-code from step 411. In some embodiments, step 213 may be a step of Smart Lock 115 receiving the presented/provided access-code from Other User Device 301 and/or from the Other User. In some embodiments, method 400 may progress from step 213 to step 215.

Continuing discussing FIG. 4, in some embodiments, step 215 may be a step of Smart Lock 115 checking the received access-code. In some embodiments, this step 215 check may entail both making sure that the received access-code is timely (not expired) and making sure that the timely received access-code solves the predetermined and known (e.g., known by Smart Lock 115) cryptographic/cryptological/hash algorithm running on the Smart Lock 115. In some embodiments, if this step 215 check is both timely and solves the predetermined cryptographic/cryptological/hash algorithm running on the Smart Lock 115, then method 400 may progress from step 215 to step 217. In some embodiments, if this step 215 check is not timely (e.g., the received access-code has expired) or the received access-code does not solve the predetermined cryptographic/cryptological/hash algorithm running on the Smart Lock 115, then method 400 may not progress from step 215 to step 217; i.e., Smart Lock 115 may not unlock.

Continuing discussing FIG. 4, in some embodiments, step 217 may be a step of Smart Lock 115 unlocking. In some embodiments, step 217 may entail Smart Lock 115 electrically energizing/actuating Electrical/Mechanical Lock Interface/Locking Means 711 such that the mechanical locking aspect of Smart Lock 115 may then unlock and/or open. See FIG. 7A for Electrical/Mechanical Lock Interface/Locking Means 711. In some embodiments, completion of step 217 may result in Smart Lock 115 being unlocked and/or open. In some embodiments, locking (or re-locking) of Smart Lock 115 may be accomplished by a person exerting a mechanical closing motion onto Smart Lock 115 as would be typical to lock a purely mechanical lock.

Figure 5:
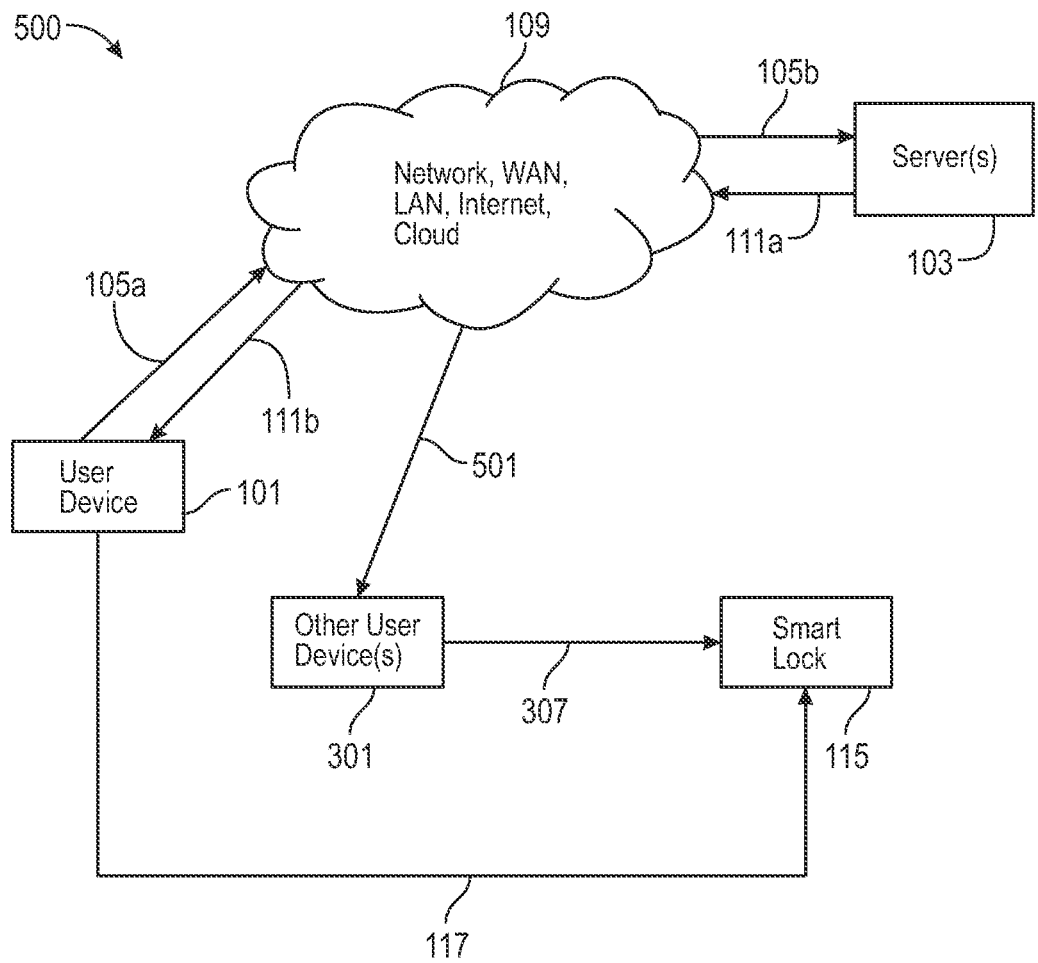
FIG. 5 depicts a block diagram showing still other communication pathways for unlocking a given Smart Lock according to at least some embodiments of the present invention.

FIG. 5 depicts a block diagram showing communication pathways 500 for unlocking a given Smart Lock 115. In some embodiments, FIG. 5 may depict the unlocking communication scenario/environment for multiple (authorized) Users of that Smart Lock 115. In some embodiments, the (authorized) Users using a User Device 101 and/or using Other User De-vice(s) 301 may request from at least one Server 103 that an access-code be provided to at least one such User and/or to at least one Other User Device(s) 301 (from the at least one Server 103 or a computing device controlled by at least one Server 103) for a purpose of the at least one User and/or the Other User Device(s) 301 then providing that access-code to Smart Lock 115 so that Smart Lock 115 may then unlock.

Continuing discussing FIG. 5, in some embodiments, after Server(s) 103 have received at least one request for access transmission 105 from at least one authorized User and/or from at least one authorized User Device 101/Other User Device 301, then Server(s) 103 may cause access-code transmissions 111 and 501, containing a time sensitive access-code, to be sent/transmitted to all User Device(s) 101 and/or to Other User Device(s) 301 that are associated, linked, registered, and/or authorized with that particular Smart Lock 115 that is desired to be unlocked (or lock). In some embodiments, after Server(s) 103 have received at least one request for access transmission 105 from at least one authorized User and/or from at least one authorized User Device 101/Other User Device 301, then Server(s) 103 may cause access-code transmissions 111 and 501, containing a time sensitive access-code, to be sent/transmitted to at least one User Device 101 and to at least one Other User Device 301 that are associated, linked, registered and/or authorized with that particular Smart Lock 115 that is desired to be unlocked (or locked). In some embodiments, access-code transmission 501 may be one or more transmissions of data and/or information from Server(s) 103 (directly) directed to Other User Device(s) 301 that includes the time sensitive access-code for unlocking (or locking) Smart Lock 115 if the access-code is provided to Smart Lock 115 within a predetermined amount of time (or within a timely fashion). Thus, a difference between FIG. 5 and FIG. 3, is that in FIG. 3 Other User Device 301 may receive the access-code from the User and/or from the User Device 101; whereas, in FIG. 5 the Other User and/or Other User Device 301 may receive the access-code from Server(s) 103 and not from the User and/or not from the User Device 101. In some embodiments, a difference between communication pathways 500 and communication pathways 300, is that in communication pathways 300 Other User Device 301 may receive the access-code (directly) from the User and/or from the User Device 101 (and not directly from Server(s) 103); whereas, in communication pathways 500 the Other User and/or Other User Device 301 may receive the access-code (directly) from Server(s) 103 and not from the User and/or not from the User Device 101. In some embodiments, access-code transmission 501 may be in at least one of the following formats: a text message from Server(s) 103 to Other User Device(s) 301; a SMS message from Server(s) 103 to Other User Device(s) 301; a MMS message from Server(s) 103 to Other User Device(s) 301; a phone call from Server(s) 103 to Other User Device(s) 301; a voicemail from Server(s) 103 to Other User Device(s) 301; an email from Server(s) 103 to the Other User(s); (optionally) a notification at a mobile app running on Other User Device(s) 301 from Server(s) 103; a phone notification displaying or displayed on Other User Device(s) 301 from Server(s) 103; to a mobile wallet pass software or the like running Other User Device(s) 301 from Server(s) 103; to a website, web portal, and/or web interface that may be accessed by a browser running on Other User Device(s) 301 from Server(s) 103; a notification configured to be displayed on a display (screen) of Other User Device(s) 301; receipt of the provided access-code on/to software running on Other User De-vice(s) 301 from Server(s) 103; combinations thereof; and/or the like.

Continuing discussing FIG. 5, in some embodiments, after Other User Device(s) 301 and/or the Other User(s) have received the (same/identical) time sensitive access-code (OTP), via access-code transmission 501, from Server(s) 103, then within the allotted predetermined amount of time, Other User Device(s) 301 and/or the Other User(s) may present/provide 307 the access-code to Smart Lock 115 (for a purpose of unlocking or locking that Smart Lock 115). In some embodiments, if Smart Lock 115 has received the access-code from present/provide access-code 307 in a timely manner and if that time sensitive access-code solves the cryptographic/cryptological/hash algorithm running on the Smart Lock 115, then Smart Lock 115 may unlock (or lock). In some embodiments, if the presented/provided access-code has expired (is too old [expired]), then Smart Lock 115 may not unlock (or may not lock). In some embodiments, if the presented/provided access-code does not solve the crypto-graphic/cryptological/hash algorithm running on the Smart Lock 115, then Smart Lock 115 may not unlock (or may not lock).

Figure 6:
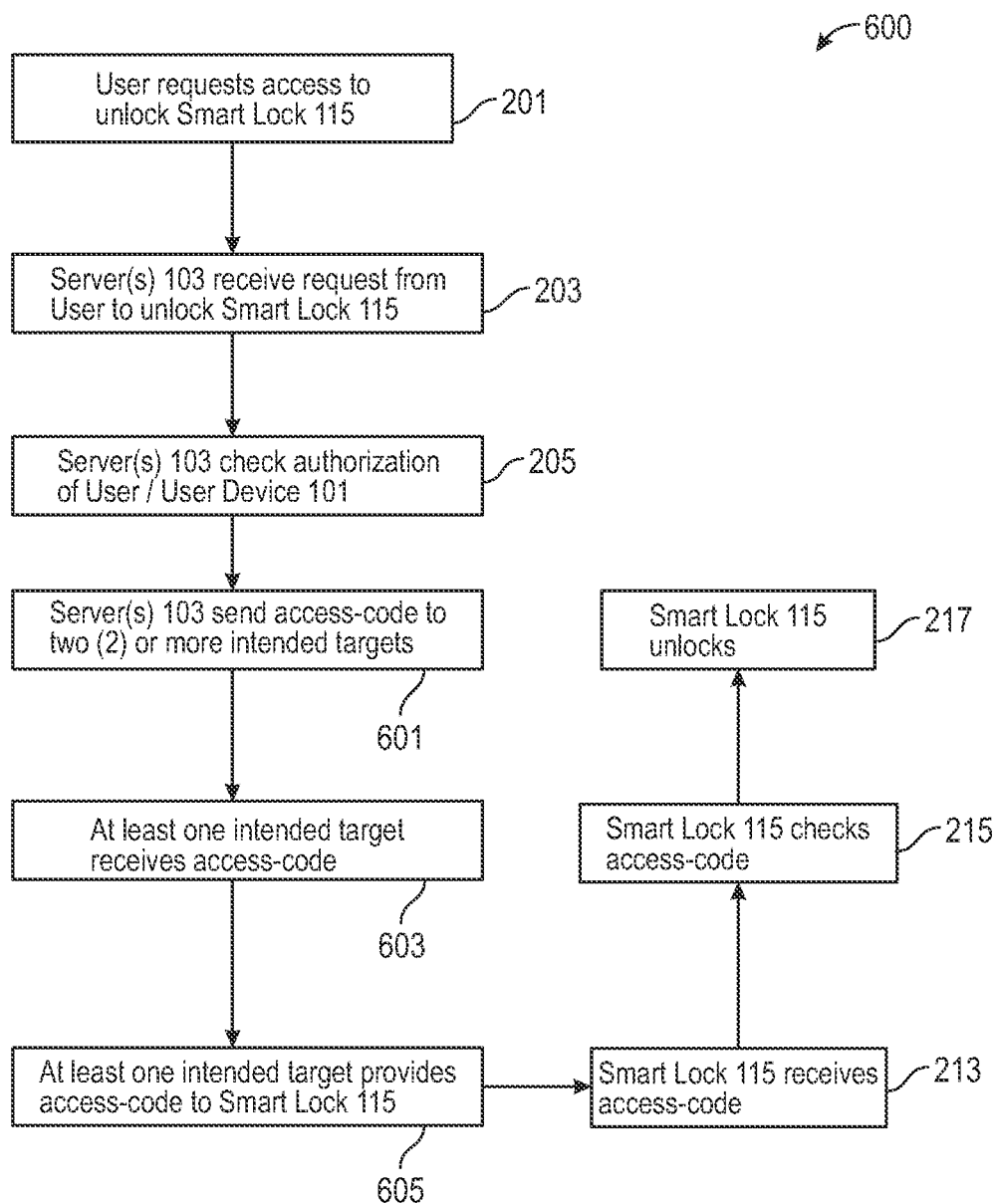
FIG. 6 depicts still another method of unlocking a given Smart Lock according to at least some embodiments of the present invention.

FIG. 6 depicts a method 600 of unlocking Smart Lock 115. FIG. 6 may be applicable to the communication pathways 500 of FIG. 5. In some embodiments, method 600 of unlocking Smart Lock 115 may be with respect to unlocking Smart Lock 115 for multiple (authorized) Users of that Smart Lock 115. In some embodiments, FIG. 6 may show at least one step of method 600. In some embodiments, FIG. 6 may show one or more steps of method 600. In some embodiments, method 600 may comprise at least one step of: step 201, step 203, step 205, step 601, step 603, step 605, step 213, step 215, step, 217, portions thereof, combinations thereof, and/or the like. In some embodiments, method 600 may comprise one or more of: step 201, step 203, step 205, step 601, step 603, step 605, step 213, step 215, step, 217, portions thereof, combinations thereof, and/or the like. In some embodiments, at least some of these steps of method 600 may be executed/performed out of numerical order. In some embodiments, at least one of these steps of method 600 may be optional. In some embodiments, at least one of these steps of method 600 may be omitted and/or skipped.

Continuing discussing FIG. 6, in some embodiments, step 201 may be a step of a User and/or of User Device 101 requesting access to unlock Smart Lock 115. In some embodiments, during step 201 the User may use User Device 101 to send and/or to transmit this request to Server(s) 103. In some embodiments, step 201 may entail User Device 101 sending request for access transmission 105 to Server(s) 103. In some embodiments, request for access transmission 105 may utilize at least a portion of Network 109. In some embodiments, step 201 and/or request for access transmission 105 may comprise at least one of: a text message from User Device(s) 101 to Server(s) 103; a SMS message from User Device(s) 101 to Server(s) 103; a MMS message from User Device(s) 101 to Server(s) 103; a phone call from User Device(s) 101 to Server(s) 103; an email from the User to Server(s) 103; (optionally) a request (invitation) from a mobile app running on User Device(s) 101 to Server(s) 103; (optionally) a request (invitation) from a mobile smartphone wallet pass (or the like app) running on User Device(s) 101 to Server(s) 103; from a browser, website, web portal, and/or web interface that User Device(s) 101 may be using and directed to Server(s) 103; an invitation from the User Device(s) 101 to Server(s) 103; combinations thereof; and/or the like, from User Device 101 (and/or from the User) to Server(s) 103, wherein at least some content of this request message/transmission may comprise the request for an access-code to unlock (or lock) Smart Lock 115. In some embodiments, at least some content of the message/transmission of step 201 and/or request for access transmission 105 may comprise information that identifies the User and/or that identifies the User Device 101 and/or that includes the at least one identifier of that given Smart Lock 115 that the User is interested in unlocking (or locking). In some embodiments, the information that identifies the User may be selected from one or more of: User name, User address (e.g., physical, mailing, and/or billing address), User phone number, User email address, User account number, User account name, User name, at least one identifier for that User's User Device 101, combinations thereof, and/or the like. In some embodiments, the information that identifies a given User Device 101 and/or the at least one identifier for a User's User Device 101 may be selected from one or more of: a MAC address of that given User Device 101, an IP address of that given User Device 101, a serial number of that given User Device 101, SIM card information of that given User Device 101, a phone number of that given User Device 101, a RFID tag of that given User Device 101, a NFC tag of that given User Device 101, portions thereof, combinations thereof, and/or the like. In some embodiments, in step 201 of method 600, the request to unlock (or lock) a particular/given Smart Lock 115 may be made from any one User, User Device 101, Other User, and/or Other User Device 301. In some embodiments, method 600 may progress from step 201 to step 203.

Continuing discussing FIG. 6, in some embodiments, step 203 may be a step of Server(s) 103 receiving the request from the User and/or from User Device 101 to unlock (or lock) the given Smart Lock 115. In some embodiments, step 203 may be a step of Server(s) 103 receiving the request from/of step 201. In some embodiments, method 600 may progress from step 203 to step 205.

Continuing discussing FIG. 6, in some embodiments, step 205 may be a step of Server(s) 103 checking authorization of the User/User Device 101 such that the User and/or User Device 101 may receive an access-code to unlock Smart Lock 115. In some embodiments, in executing/performing step 205, Server(s) 103 may check (compare) content, data, and/or information of step 201 and/or of the request for access transmission 105 against a lookup table in a database that is part of Server(s) 103 and/or that is in communication with Server(s) 103. In some embodiments, if this check/comparison is in agreement, then method 600 may progress from step 205 to step 601. In some embodiments, if this check/comparison is not in agreement, then method 600 may not progress from step 205 to step 601; i.e., Server(s) 103 will not provide an access-code to the User and/or to User Device 101 and Server(s) 103 will not provide an access-code to the Other Use and/or to the Other User Device 301.

Continuing discussing FIG. 6, in some embodiments, step 601 may be a step of Server(s) 103 sending an access-code to two or more User Devices, such as, User Device(s) 101 and Other User Device(s) 301. In some embodiments, step 601 may be a step of Server(s) 103 sending an access-code to two or more Users and/or two or more Other Users. In some embodiments, step 601 may be a step of Server(s) 103 sending an access-code to two or more intended targets. In some embodiments, the intended targets may be at least two, any, and/or all User Devices 101, Other User Devices 301, Users, and/or Other Users that Server(s) 103 have records (accessible by Server(s) 103) of being associated, linked, and/or authorized with a particular/given Smart Lock 115 (e.g., by virtue of the at least one identifier for that particular Smart Lock 115). In some embodiments, this step 601 outgoing transmissions from Server(s) 103, with the (same) access-codes, may be directed to at least two, any, and/or all User Devices 101, Other User Devices 301, Users, and/or Other Users that Server(s) 103 have records of being associated, linked, and/or authorized with a particular/given Smart Lock 115 (e.g., by the at least one identifier for that particular Smart Lock 115). In some embodiments, in method 600, only one User and/or User Device/Other User Device need make the request for unlocking (or locking) the particular/given Smart Lock 115 (e.g., step 201); but then in step 601 at least two, any, and/or all User Devices 101, Other User Devices 301, Users, and/or Other Users that Server(s) 103 have records of being associated, linked, and/or authorized with a particular/given Smart Lock 115 may then be sent the access-code for that particular/given Smart Lock 115. In some embodiments, this access-code from Server(s) 103 may be configured for unlocking (or locking) the given Smart Lock 115, if this access-code is received at the given Smart Lock 115 within a predetermined amount of time from Server(s) 103 sending/transmitting this access-code to the two or more User Devices and/or to the two or more Users, i.e., in some embodiments, this access-code is time sensitive. In some embodiments, the access-code may be machine readable. In some embodiments, during step 601 Server(s) 103 may send and/or may transmit the access-code to the User(s), to User Device(s) 101, to Other User(s), and/or to Other User Device(s) 301. In some embodiments, step 601 may entail Server(s) 103 sending/transmitting the access-code, via access-code transmissions 111 and 501, to the User(s), to User Device(s) 101, to Other User(s), and/or to Other User Device(s) 301. In some embodiments, access-code transmissions 111 and/or 501 may utilize at least a portion of Network 109. In some embodiments, step 601 and/or access-code transmissions 111 and/or 501 may comprise at least one of: a text message; a SMS message; a MMS message; a phone call; a voicemail; an email; (optionally) a notification at a mobile app running on User Device(s) 101 and/or on Other User Device(s) 301; a phone notification displaying or displayed on User Device(s) 101 and/or on Other User Device(s) 301; to a mobile wallet pass software or the like running on User Device(s) 101 and/or on Other User Device(s) 301; to a website, web portal, and/or web interface that may be accessed by a browser running on User Device(s) 101 and/or on Other User Device(s) 301; a notification configured to be displayed on a display (screen) of User Device(s) 101 and/or on Other User Device(s) 301; receipt of the provided access-code on/to software running on User Device(s) 101 and/or on Other User De-vice(s) 301; combinations thereof; and/or the like from Server(s) 103 to the User(s), to User Device(s) 101, to Other User(s), and/or to Other User Device(s) 301, wherein at least some content of this message/transmission may comprise the time sensitive access-code to unlock (or lock) Smart Lock 115. In some embodiments, method 600 may progress from step 601 to step 603.

Continuing discussing FIG. 6, in some embodiments, method 600 may begin with step 601. In some embodiments, method 600, via step 601, may stream, push, and/or the like an appropriate access-code to User Device 101 and/or to User Device 301 for unlocking (or locking) Smart Lock 115. In some embodiments, method 600, via step 601, may stream, push, and/or the like an appropriate access-code to User Device 101 and/or to User Device 301 for unlocking (or locking) Smart Lock 115, one time, periodically, or intermittently. In some embodiments, step 601 need not be triggered by prior execution of step 201.

Continuing discussing FIG. 6, in some embodiments, step 603 may be a step of at least one of the intended targets of the step 601 transmission and/or of the access-code transmissions 111 and/or 501 receiving that transmission with the time sensitive access-code. In some embodiments, the intended targets may be at least two, any, and/or all User Devices 101, Other User Devices 301, Users, and/or Other Users that Server(s) 103 have records (accessible by Server(s) 103) of being associated, linked, and/or authorized with a particular/given Smart Lock 115. In some embodiments, step 603 may be a step of the at least one intended target receiving the access-code from step 601. In some embodiments, method 600 may progress from step 603 to step 605.

Continuing discussing FIG. 6, in some embodiments, step 605 may be a step of the at least one intended targets (e.g., shown as Other User Device(s) 301 in FIG. 5) presenting and/or providing the access-code (from steps 601 and 603) to Smart Lock 115 (for a purpose of unlocking or locking that given Smart Lock 115). In some embodiments, step 605 may be executed and/or performed at least in part by the at least one intended target initiating present/provide access-code 307 of FIG. 5. In some embodiments, depending upon the types of Access-code Receiver(s) 709 of Smart Lock 115 (such as, but not limited to, a camera, a barcode scanner, a photo reader, a face recognition camera, a keypad, a touch pad, a touch screen, a keypad, a number wheel, a microphone, combinations thereof, and/or the like); and/or depending upon the format of access-code transmission 111 and/or 501 (such as, but not limited to, a text message from Server(s) 103 to User Device(s) 101/301; a SMS message from Server(s) 103 to User Device(s) 101/301; a MMS message from Server(s) 103 to User Device(s) 101/301; a phone call from Server(s) 103 to User Device(s) 101/301; a voicemail from Server(s) 103 to User Device(s) 101/301; an email from Server(s) 103 to the User(s)/Other User(s); (optionally) a notification at a mobile app running on User Device(s) 101/301 from Server(s) 103; a phone notification displaying or displayed on User Device(s) 101/301 from Server(s) 103; to a mobile wallet pass software or the like running User Device(s) 101/301 from Server(s) 103; to a website, web portal, and/or web interface that may be accessed by a browser running on User Device(s) 101/301 from Server(s) 103; a notification configured to be displayed on a display (screen) of User Device(s) 101/301; receipt of the provided access-code on/to software running on User Device(s) 101/301 from Server(s) 103; combinations thereof; and/or the like—that include the access-code), present/provide access-code 307/117, as step 605, may be executed in one or more ways, such as, but not limited to: presenting a display (screen) of User Device 301/101 to Access-code Receiver 709 of Smart Lock 115, wherein the access-code is displayed on that display (screen); presenting a display (screen) of an electronic device to Access-code Receiver 709 of Smart Lock 115, wherein the access-code is displayed on that display; Access-code Receiver 709 of Smart Lock 115 receiving lights of a predetermined and/or particular pattern and/or wavelength (frequency) that operate as the access-code from at least one light source; wirelessly broadcasting (transmitting and/or emitting) the access-code from User Device 301/101 (or other electronic device) to Access-code Receiver 709 of Smart Lock 115 (wherein the Smart Lock 115 does not wirelessly communicate with the User Device 301/101); speaking the access-code from the Other User to Access-code Receiver 709 of Smart Lock 115; playing the access-code over speaker(s) of User Device 301/101 to Access-code Receiver 709 of Smart Lock 115; Access-code Receiver 709 of Smart Lock 115 receiving sounds of a predetermined and/or particular pattern and/or frequency that operate as the access-code from at least one sound source; (manually) entering the access-code into Access-code Receiver 709 of Smart Lock 115; combinations thereof; and/or the like. In some embodiments, method 600 may progress from step 605 to step 213.

Continuing discussing FIG. 6, in some embodiments, step 605 may at least in part entail first waking-up Smart Lock 115 before presenting/providing 307 (of FIG. 5) the access-code to Smart Lock 115. In some embodiments, when Smart Lock 115 may be locked, a default state, status, and/or stage of Smart Lock 115 may be a dormant/sleep mode that may be configured to minimize electrical power consumption and/or be a low power mode of Smart Lock 115. In some embodiments, Smart Lock 115 may need to be woken-up out of this dormant/sleep mode (low power mode) into a more active power mode (awake mode) in order to unlock. In some embodiments, waking-up Smart Lock 115 may entail the User and/or the Other User jiggling (shaking) Smart Lock 115, speaking a predetermined wake-up phrase/command/instruction to Smart Lock 115, causing the at least one intended target to broadcast a wake-up signal to Smart Lock 115, or causing the at least one intended target to emit the predetermined wake-up phrase/command/instruction from speaker(s) of the at least one intended target to Smart Lock 115. In some embodiments, waking-up Smart Lock 115 may be a first aspect of step 605 (before presenting/providing 307 [of FIG. 5] the access-code to Smart Lock 115).

Continuing discussing FIG. 6, in some embodiments, step 213 may be a step of Smart Lock 115 receiving the presented/provided access-code from step 605. In some embodiments, step 213 may be a step of Smart Lock 115 receiving the presented/provided access-code from the at least one intended target. In some embodiments, method 600 may progress from step 213 to step 215.

Continuing discussing FIG. 6, in some embodiments, step 215 may be a step of Smart Lock 115 checking the received access-code. In some embodiments, this step 215 check may entail both making sure that the received access-code is timely (not expired) and making sure that the timely received access-code solves the predetermined and known (e.g., known by Smart Lock 115) cryptographic/cryptological/hash algorithm running on the Smart Lock 115. In some embodiments, if this step 215 check is both timely and solves the predetermined cryptographic/cryptological/hash algorithm running on the Smart Lock 115, then method 600 may progress from step 215 to step 217. In some embodiments, if this step 215 check is not timely (e.g., the received access-code has expired) or the received access-code does not solve the predetermined cryptographic/cryptological/hash algorithm running on the Smart Lock 115, then method 600 may not progress from step 215 to step 217; i.e., Smart Lock 115 may not unlock.

Continuing discussing FIG. 6, in some embodiments, step 217 may be a step of Smart Lock 115 unlocking. In some embodiments, step 217 may entail Smart Lock 115 electrically energizing/actuating Electrical/Mechanical Lock Interface/Locking Means 711 such that the mechanical locking aspect of Smart Lock 115 may then unlock and/or open. See FIG. 7A for Electrical/Mechanical Lock Interface/Locking Means 711. In some embodiments, completion of step 217 may result in Smart Lock 115 being unlocked and/or open. In some embodiments, locking (or re-locking) of Smart Lock 115 may be accomplished by a person exerting a mechanical closing motion onto Smart Lock 115 as would be typical to lock a purely mechanical lock.

Figure 7A:
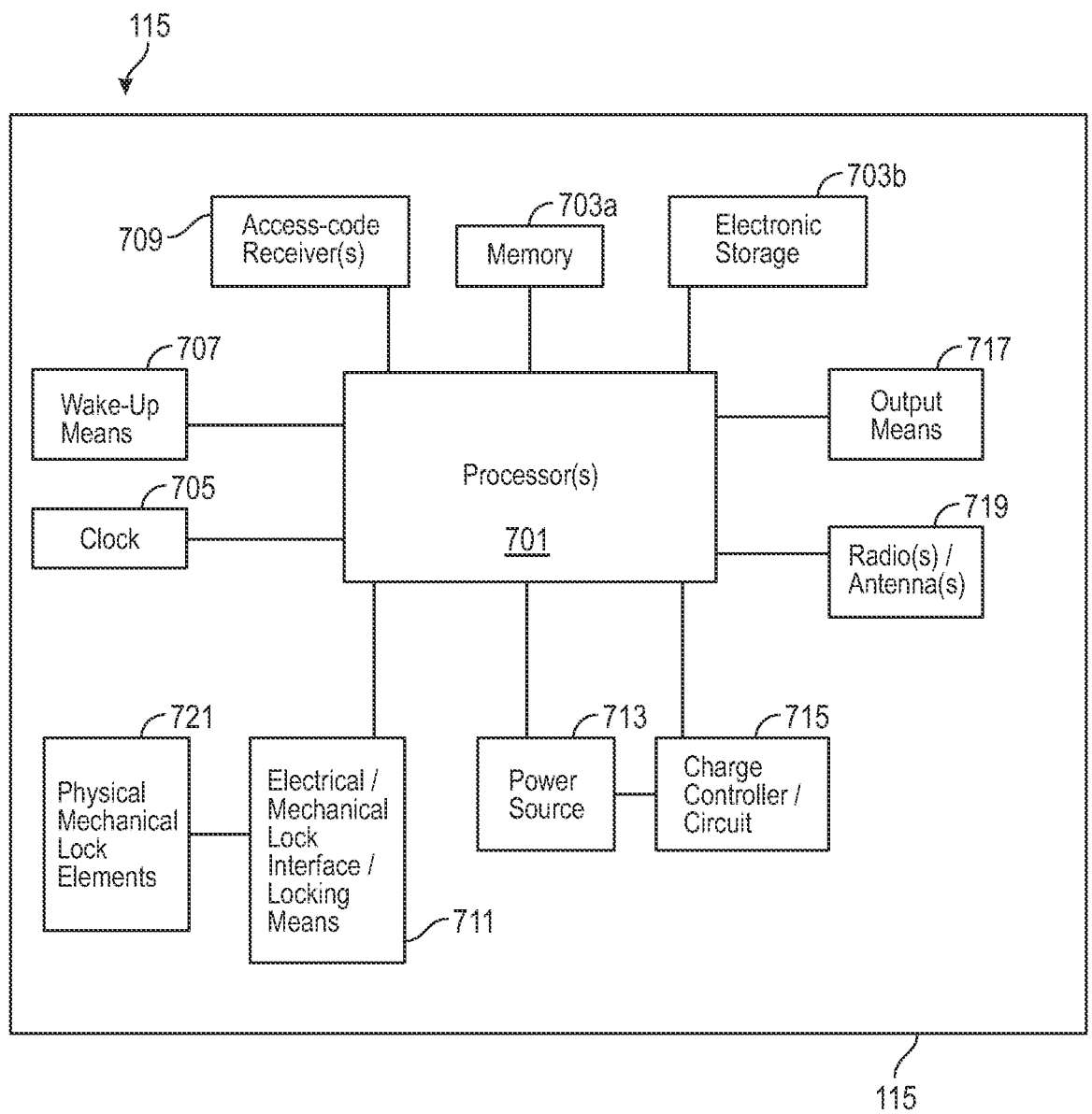
FIG. 7A depicts a block diagram of a given Smart Lock showing at least some electronic hardware and/or circuitry elements of the given Smart Lock.

FIG. 7A may be a block diagram of a given Smart Lock 115 showing at least some electronic hardware and/or circuitry elements of the given Smart Lock 115. FIG. 7A may show a block diagram that also shows at least some hardware (electronic) components/circuitry of a given Smart Lock 115. FIG. 7A may depict a block diagram showing some main/sub-hardware electronics/circuitry elements for a given Smart Lock 115. In some embodiments, at least some electronics/circuitry aspects of a given Smart Lock 115 may be located: internally within the given Smart Lock 115; externally outside of the given Smart Lock 115; on an exterior surface of the given Smart Lock 115; portions thereof; combinations thereof; and/or the like. In some embodiments, at least some electronics/circuitry of the given Smart Lock 115 may be a computer, may be configured as a computer, and/or may function as a computer.

Continuing discussing FIG. 7A, in some embodiments, a given Smart Lock 115 may be configured to repeatably lock and unlock. In some embodiments, Smart Lock 115 may have both electronic circuitry elements and Physical Mechanical Lock Elements 721 (physical-mechanical-lock-elements 721). In some embodiments, Smart Lock 115 may be a physical-lock that locks via Physical Mechanical Lock Elements 721 (physical-mechanical-lock-elements 721) and that at least unlocks via a portion of the electronics (of Smart Lock 115) interacting with the Physical Mechanical Lock Elements 721 (physical-mechanical-lock-elements 721). In some embodiments, Smart Lock 115 may comprise the Physical Mechanical Lock Elements 721 (physical-mechanical-lock-elements 721) and may also comprise the electronics (of Smart Lock 115). In some embodiments, Smart Lock 115 may comprise at least one Physical Mechanical Lock Elements 721 which may be a (physical) mechanical lock and/or a mechanical locking means (such as, but not limited to, a padlock, a disc lock, a cylinder lock, a latch lock, a hasp lock, a door lock, a window lock, a vending-machine lock, a T-handle lock, a bike lock, a motorcycle lock, a RV lock, a dead bolt, a knob lock, a door handle lock, a lever handle lock, a cam lock, a wall mounted lock, a rim latch lock, a cabinet lock, a container lock, a locker lock, a lockout lock, a handcuff lock, a shackle lock, portions thereof, combinations thereof, and/or the like) whose unlocking may be controlled with electronics of Smart Lock 115. In some embodiments, Smart Lock 115 unlocking may be controlled by the Smart Lock 115 receiving a non-timed out access-code (OTP) that solves a cryptographic/cryptological/hash algorithm (predetermined hash-algorithm) running on the Smart Lock 115 (e.g., running on at least some electronics of Smart Lock 115). In some embodiments, the cryptographic/crypto-logical/hash algorithm may be: SHA-3, SHA-2, SHA-1, and/or other hashing algorithms that may be solved by providing a digitized machine readable code to Smart Lock 115. In some embodiments, Smart Lock 115 knows (e.g., has access to) at least the following three (3) items of: information: (i) a time; (ii) its predetermined cryptographic/cryptological/hash algorithm; and (iii) its unique identifier (such as, but not limited to, its serial number [or the like]). Note, in some embodiments, Server(s) 103 also knows (e.g., has access to) these same three (3) items of information of: (i) the time; (ii) predetermined cryptographic/cryptological/hash algorithms for each Smart Lock 115; and (iii) the at least one (unique) identifier (such as, but not limited to, a serial number or the like) for each Smart Lock 115. Note, in some embodiments, with respect to the known "(i) the time," it may be that the given Smart Lock 115 and the Server(s) 103 are synchronized on a same time interval, cycle, and/or cadence—i.e., the geographic times at locations of Smart Locks 115 and/or the geographic local times at locations of Server(s) 103 may not be the "(i) the time" being referred to here. In some embodiments, this "(i) the time" being referred to here may be a "predetermined-time-interval" that continuously counts down to no time remaining and then resets and starts over; wherein this "predetermined-time-interval" may run on the at least some of the electronics of Smart Locks 115 and may be synchronized and running on Server(s) 103 and/or known to Server 103 for each particular Smart Lock 115.

In some embodiments, the "same time interval, cycle, and/or cadence" that may be running in a synchronized fashion on both Smart Locks 115 and on Server(s) 103 may be referred to as this "predetermined-time-interval."

Note, in some embodiments, the predetermined cycle, interval, and/or cadence (the "predetermined-time-interval") may be different between any two physically different Smart Locks 115 (even two or more such Smart Locks 115 of the same model type). However, whatever a given predetermined cycle, interval, and/or cadence (the "predetermined-time-interval") might be for a given Smart Lock 115, if any, that given predetermined cycle, interval, and/or cadence (the "predetermined-time-interval") may be synchronized and/or known to Server 103 for that particular Smart Lock 115 (e.g., as Server 103 may have access to the at least one unique identifier [such as, but not limited to, a serial number or the like] of each Smart Lock 115; and thus, may have a record of the particular predetermined cycle, interval, and/or cadence [the "predetermined-time-interval,"] if any, for each Smart Lock 115). In some embodiments, a given Smart Lock 115 may have two or more different predetermined cycles, intervals, and/or cadences (the "predetermined-time-intervals") running concurrently, for example, to enable access for different types of Users (e.g., owner and tenant).

In some embodiments, Smart Locks 115 (the physical-lock) may comprise at least one form factor that is selected from at least one of: a padlock, a disc lock, a cylinder lock, a latch lock, a hasp lock, a door lock, a window lock, a vending-machine lock, a T-handle lock, a bike lock, a motorcycle lock, a RV lock, a dead bolt, a knob lock, a door handle lock, a lever handle lock, a cam lock, a wall mounted lock, a rim latch lock, a cabinet lock, a container lock, a locker lock, a lockout lock, a handcuff lock, or a shackle lock. See e.g., FIG. 10 to FIG. 34 for various physical lock form factors that Smart Lock 115 may be configured to operate as.

Continuing discussing FIG. 7A, in some embodiments, Smart Lock 115 may comprise one or more of: Processor(s) 701, Memory 703a, Electronic Storage 703b, Access-code Receiver(s) 709, Electrical/Mechanical Lock Interface/Locking Means 711, Power Source 713, portions thereof, combinations thereof, and/or the like. In some embodiments, Smart Lock 115 may further comprise one or more of: Clock 705, Wake-Up Means 707, Charge Controller/Circuit 715, Output Means 717, (optionally) Radio(s)/Antenna(s) 719, Physical Mechanical Lock Elements 721, portions thereof, combinations thereof, and/or the like. In some embodiments of a given Smart Lock 115 Clock 705, Wake-Up Means 707, Charge Controller/Circuit 715, Output Means 717, and/or Radio(s)/Antenna(s) 719, may be optional and/or omitted. In some embodiments, a given Smart Lock 115 may comprise be one or more circuits. In some embodiments, the given Smart Lock 115 may comprise one or more printed circuit board(s) (PCB(s)). In some embodiments, the given Smart Lock 115 may comprise one or more computer/electronics chip(s). In some embodiments, the given Smart Lock 115 may comprise one or more of electrical wiring, fiber optics, communication/data wiring, cabling, bus, motherboard(s), portions thereof, combinations thereof, and/or the like. In some embodiments, at least some of such electronics, hardware, chips, board, PCBs, and/or circuitry may be operationally linked and/or in communication with each other.

Continuing discussing FIG. 7A, in some embodiments, Processor(s) 701 may be one or more processors, including one or more central processors and/or one or more processors for graphics. In some embodiments, Processor(s) 701 may be in communication with one or more of: Memory 703, Memory 703a, Electronic Storage 703b, Clock 705, Wake-Up Means 707, Access-code Receiver(s) 709, Electrical/Mechanical Lock Interface/Locking Means 711, Power Source 713, Charge Controller/Circuit 715, Output Means 717, and/or Radio(s)/Antenna(s) 719, portions thereof, combinations thereof, and/or the like. In some embodiments, Processor(s) 701 may at least partially instruct and/or control one or more of: Memory 703, Memory 703a, Electronic Storage 703b, Clock 705, Wake-Up Means 707, Access-code Receiver(s) 709, Electrical/Mechanical Lock Interface/Locking Means 711, Power Source 713, Charge Controller/Circuit 715, Output Means 717, and/or Radio(s)/Antenna(s) 719, portions thereof, combinations thereof, and/or the like. In some embodiments, such communications may be facilitated via wired connections for electrical (and/or optical) communications. In some embodiments, Processor(s) 701 may receive electrical power necessary for operations from Power Source 713.

Continuing discussing FIG. 7A, in some embodiments, Processor(s) 701 may execute a computer program known as an operating system (e.g., a Microsoft Windows operating system, a Linux operation system, an Apple and/or Macintosh operating system, a mobile computing device operating system, any other suitable operating system, portion thereof, combinations thereof, and/or the like) and/or firmware which may control the execution of other computer programs (e.g., application programs); and may provide for scheduling, input/output (I/O) and other device control, accounting, compilation, storage assignment, data management, memory management, communication; and/or data-flow control. Collectively, Processor(s) 701 and its operating system/firmware may define a computer platform for which the application programs and other computer program languages may be written in. In some embodiments, Processor (s) 701 may also execute one or more computer programs to implement various functions and/or methods of the present invention, such as, but not limited to, the cryptographic/cryptological/hash algorithm(s) and/or software for controlling Electrical/Mechanical Lock Interface/Locking Means 711. In some embodiments, Processor(s) 701 may also execute one or more computer programs for communicating with Server(s) 103 and/or for reporting status of Smart Lock 115 to Server(s) 103. In some embodiments, Clock 705 may be omitted and instead implemented purely as a computer program/software controlled by Processor(s) 701. These computer programs may be written in any type of computer program language, including, but not limited to, a procedural programming language, object-oriented programming language, macro language, portion thereof, combinations thereof, and/or the like.

In some embodiments, using inputs received at Radio(s)/Antenna(s) 719, Processor(s) 701 may execute software to provide one or more of: device (Smart Lock 115) health checks; device (Smart Lock 115) battery 713 level checks; device (Smart Lock 115) batteries 713 level checks; device (Smart Lock 115) and/or its lock status; instructions and/or commands to open or close lock 721; instructions and/or commands to unlock or lock Physical Mechanical Lock Elements 721; remotely change device (Smart Lock 115) configuration settings; provide firmware updates over the air to the device (Smart Lock 115); portions thereof; combinations thereof; and/or the like. See e.g., FIG. 8 and FIG. 9.

These computer programs, including the operating system/firmware, may be stored in Memory 703a and/or in (e.g., non-transitorily stored) Electronic Storage 703b. Note, reference numeral "703" without the "a" or the "b" may refer to Memory 703a, Electronic Storage 703b, or both Memory 703a and Electronic Storage 703b. Memory 703 may refer to Memory 703a, Electronic Storage 703b, or both Memory 703a and Electronic Storage 703b. Memory 703 may store (hold) information on a volatile or non-volatile medium, and may be fixed and/or removable. Memory 703a may refer to volatile computer memory, such as, but not limited to RAM (random access memory) (or DRAM or the like); whereas, Electronic Storage 703b may refer to non-volatile and non-transitory storage (such as, but not limited to, a hard drive, an optical drive, a SSD (solid state drive), a spinning drive, a backup drive, a tape drive, a magnetic drive, and/or the like). Memory 703 may include a tangible computer readable and computer writable non-volatile recording medium, on which signals are stored that define a computer program or information to be used by the computer program. The recording medium may, for example, be disk memory, flash memory, and/or any other article(s) of manufacture usable to record and store information (in a non-transitory fashion). In some embodiments, in operation, Processor(s) 701 may cause(s) data to be read from the nonvolatile recording medium (e.g., Electronic Storage 703b) into a volatile memory (e.g., a random-access memory, or RAM) (e.g., Memory 703a) that may allow for more efficient (i.e., faster) access to the information by the Processor(s) 701 as compared against the nonvolatile recording medium (e.g., Electronic Storage 703b). The Processor(s) 701 may manipulate(s) the data within integrated circuit memory and may then copy the data to the nonvolatile recording medium (e.g., Electronic Storage 703b) after processing may be completed. A variety of mechanisms are known for managing data movement between the nonvolatile recording medium (e.g., Electronic Storage 703b) and the integrated circuit memory element (e.g., Memory 703a), and the invention is not limited to any mechanism, whether now known or later developed. The invention is also not limited to a particular processing unit (e.g., Processor 701) or storage unit (e.g., Memory 703).

In some embodiments, at least some step(s) and method(s) discussed herein and as depicted in the figures may be implemented as non-transitory computer-readable medium including codes executable by a processor, such as Processor(s) 701. That is, such non-transitory computer-readable medium may be the one or more Electronic Storage 703b units. That is, such a processor may be Processor(s) 701; or alternatively, Processor(s) 701 may comprise such a processor.

Continuing discussing FIG. 7A, in some embodiments, Clock 705 may function as a clock of Smart Lock 115. In some embodiments, Clock 705 may allow/permit Smart Lock 115 to know its current time. In some embodiments, Clock 705 may be executed as hardware, software, combinations thereof, and/or the like. In embodiments, where hardware Clock 705 may be omitted, then a clock computer program (software) may be non-transitorily stored in electronic Storage 703b which may be controlled by Processor(s) 701.

In some embodiments, the OTP algorithm (predetermined hash-algorithm) may depend on a critical "real time clock" (RTC) to keep accurate and valid time. In some embodiments, the RTC of a given Smart Lock 115 may be handled, managed, and/or executed by Clock 705. In some embodiments, if the RTC is lost on a given Smart Lock 115 then that Smart Lock 115 could be broadly rendered useless from the point of view of being unlocked. In some embodiments, to minimize loss of the RTC on a given Smart Lock 115, then the RTC may require a constant (electrical) power supply (which may be similar to how a traditional electronic/digital watch requires a battery to maintain its time). In some embodiments, to address a need for constant (electrical) power to the RTC of a given Smart Lock 115, that given Smart Lock 115 may employ one or more of the following strategies (approaches): (1) an aggressive battery 713 management system (approach) (e.g., via charge controller/circuit 715); (2) using a two or more batteries 713 solution (approach) (see e.g., FIG. 7B); (3) an ability to pass a new time value and/or to reconfigure the RTC that has been reset due to power loss; portions thereof; combinations thereof; and/or the like. For example, and without limiting the scope of the present invention, with respect to the (1) strategy of using the aggressive battery 713 management system (approach), some predetermined programmable percentage of the battery life (e.g., the last 30%) may be reserved for long term RTC maintenance; and thus, if this last percentage of the battery life is reached, then the only use of power would be to maintain the RTC and/or to engage a low battery warning, message, and/or notification, which could prevent the User from unlocking that given Smart Lock 115 until its battery 713 may be replaced and/or charged over that minimum percentage of battery life threshold. For example, and without limiting the scope of the present invention, with respect to the (2) strategy of using two or more batteries 713, at least one (first) dedicated battery 713*a* may be used for long-term stable RTC maintenance and at least one other (secondary) battery 713*b* may be used for other Smart Lock 115 electronic functions, such as, but not limited to, unlocking (or locking). see e.g., FIG. 7B for at least one (first) dedicated battery 713*a* and for at least one other (secondary) battery 713*b*. In some embodiments, the (first) dedicated battery 713*a* for RTC maintenance may be smaller than the other (second) battery 713*b*. In some embodiments, the (first) dedicated battery 713*a* for RTC maintenance may be non-rechargeable. In some embodiments, the (first) dedicated battery 713*a* for RTC maintenance may be a NiCAD (NiCad) (nickel-cadmium) battery. In some embodiments, the (first) dedicated battery 713*a* for RTC maintenance may be trickle charged from the other (second) battery 713*b* and/or may be (trickle) recharged using (wireless) energy harvesting. For example, and without limiting the scope of the present invention, with respect to the (3) strategy of passing a new time value to reconfigure the RTC that has been reset due to power loss, this may be delivered (presented) to Smart Lock 115 via a RTC reset/reconfigure instruction/command embedded and/or part of a given access-code that is being provided to the given Smart Lock 115 (which could be, but need not be, in the form of QR code). For example, and without limiting the scope of the present invention, with respect to the (3) strategy of passing a new time value to reconfigure the RTC that has been reset due to power loss, this may be accomplished using a rolling code algorithm (or the like) as a backdoor. Pragmatically, a rolling code algorithm may be less secure than a correctly used OTP algorithm. As such, with any "backdoor," there is a risk of bad actors and steps should and/or may need to be taken to mitigate rolling code exploits. In some embodiments, to help avoid a rolling code exploit by a bad actor, Smart Lock 115 may utilize one or more strategies (approaches) of: (a) the given Smart Lock 115 could detect that RTC is reporting a time (and date) near the UNIX epoch (e.g., a default value after an RTC is reset) and trigger a RTC reconfigure event, wherein the RTC reconfigure would not be accepted unless given Smart Lock 115 had a full power loss event; (b) Server 103 side management would not send the RTC reset command (which might be embedded in the access-code) unless a trusted source directs that given Smart Lock 115 should receive the "backup" OTP key (for a purpose of resetting its RTC), wherein this would help to minimize visibility of the rolling code; (c) the given Smart Lock 115 may have a predetermined limit as to a quantity of RTC resets that may be attempted; combinations thereof; and/or the like. With respect to strategy (b), the trusted source in the self-storage application use case, may be a User of User Device 101 that is an employee and/or agent of that given self-storage facility, such as, but not limited to, a manager, supervisor, or the like.

Continuing discussing FIG. 7A, in some embodiments, Wake-Up Means 707 may function as a means to wake-up Smart Lock 115 from a dormant/sleeping low power mode to an awake mode full power mode of Smart Lock 115. In some embodiments, if Wake-Up Means 707 receives an external input above and/or beyond a minimum threshold (e.g., movement, vibration, oscillation, shaking, jiggling, motion detection, person detection, audio detection, engagement of a button, toggle, switch, and/or the like of Smart Lock 115), then Smart Lock 115 may transition from the dormant/sleeping low power mode to the awake mode full power mode of Smart Lock 115. In some embodiments, the dormant/sleeping low power mode may be the default mode of Smart Lock 115, e.g., when Smart Lock 115 is locked. In some embodiments, Smart Lock 115 may transition from the awake mode full power mode to the dormant/sleeping low power mode, if no inputs are received at Smart Lock 115 for a predetermined amount of time. In some embodiments, Wake-Up Means 707 may comprise at least one of: an accelerometer, a motion detector, an external motion sensor(s), an internal movement sensor, a microphone/acoustic pick-up sensor (e.g., for detecting a wake-up sound/phrase/instruction), an optical sensor, a PIR sensor, an acoustical sensor, a button, a switch, a toggle, a dial, a slide, a membrane switch, a keypad, combinations thereof, and/or the like. In some embodiments, Wake-Up Means 707 may comprise/include a watchdog circuit. In some embodiments, inclusion of Wake-Up Means 707 in Smart Lock 115 may help Smart Lock 115 to conserve battery 713 (or batteries 713) power for longer periods of time before recharging or battery replacement may be needed or desired. Some embodiments of Smart Lock 115 may include Wake-Up Means 707; whereas, other embodiments of Smart Lock 115 may not include Wake-Up Means 707. In some embodiments, the means for inputting the access-code at/on Smart Lock 115 may be the same means for waking up Smart Lock 115, i.e., Wake-Up Means 707 and Access-code Receiver(s) 709 may be the same hardware.

Continuing discussing FIG. 7A, in some embodiments, Access-code Receiver(s) 709 of a given Smart Lock 115 may be one or more input means to Smart Lock 115 that are configured to receive and/or to accept a time sensitive access-code (OTP). In some embodiments, Smart Lock 115 may comprise at least one Access-code Receiver(s) 709. In some embodiments, Smart Lock 115 may comprise one or more Access-code Receiver(s) 709. In some embodiments, Access-code Receiver(s) 709 of a given Smart Lock 115 may be one or more inputs means selected from: a camera; a QR code camera, a barcode scanner; a photo reader; a face recognition camera; an antenna; a radio; an antenna configured to receive incoming wireless (radio or IR) communications (that include an access-code); a radio configured to receive incoming wireless (radio or IR) communications (that include an access-code); an acoustic pick-up sensor; a microphone; a keypad; a keyboard; a touchscreen; a number wheel; combination wheels; a button; a switch; a stylus; a mouse; a trackball; a touchpad; a lever; a slide; a dial; a knob; a means to manually enter the access-code; portions thereof; combinations thereof; and/or the like.

Continuing discussing FIG. 7A, in some embodiments, Electrical/Mechanical Lock Interface/Locking Means 711 (electrical-mechanical-lock-interface 711) may be the electrical interface with the Physical Mechanical Lock Elements 721 of Smart Lock 115. In some embodiments, when Electrical/Mechanical Lock Interface/Locking Means 711 may be electrically activated, then the Physical Mechanical Lock Elements 721 of Smart Lock 115 may physically translate (move) resulting in physical unlocking of Smart Lock 115. In some embodiments, Electrical/Mechanical Lock Interface/Locking Means 711 may be selected from one or more of: a servo motor, a solenoid, an actuator, a switch, a magnetic switch, combinations thereof, and/or the like. In some embodiments, Electrical/Mechanical Lock Interface/Locking Means 711 may be electrically powered from wireless energy harvesting (such as when a given NFC source may be sufficiently close to Electrical/Mechanical Lock Interface/Locking Means 711).

Continuing discussing FIG. 7A, in some embodiments, Power Source(s) 713 may be configured to provide electrical power to at least some of the hardware elements, electronics, circuits, portions thereof, combinations thereof, and/or the like of a given Smart Lock 115. In some embodiments, Power Source(s) 713 may comprise one or more batteries, capacitors, wireless energy harvesters, portions thereof, combinations thereof, and/or the like. In some embodiments, the term "battery" or "batteries" may be interchangeable (or replaceable) with the term "capacitor" and "capacitors." In some embodiments, batteries and/or capacitors may be charged from wireless energy harvesters. In some embodiments, batteries and/or capacitors may power Clock 705 and/or Electrical/Mechanical Lock Interface/Locking Means (electrical-mechanical-lock-interface) 711. In some embodiments, Power Source(s) 713 may be one or more batteries. In some embodiments, Power Source(s) 713 may be one or more rechargeable batteries. In some embodiments, Power Source(s) 713 may be one or more backup batteries. In some embodiments, batteries of Power Source(s) 713 may comprise graphene, lithium, electrolytes, ions, combinations thereof, and/or the like. In some embodiments, Power Source(s) 713 may be one or more AC/DC adapters or electrical power conditioners allowing Smart Lock 115 to receive standardized AC (alternating current) electrical power from an external wired power supply. In some embodiments, Power Source(s) 713 may comprise one or more solar panels for generating electrical power, wherein such one or more solar panels may be located on an external surface of Smart Lock 115 or located externally to Smart Lock 115. In some embodiments, Power Source(s) 713 may comprise one or more energy harvesting means, such as, but not limited to, solar, piezoelectric, coils, antenna(s), portions thereof, combinations thereof, and/or the like. In some embodiments, one or more batteries of Power Source 713 may be configured to provide three (3), four (4), five (5), six (6), seven (7), eight (8), nine (9) or ten (10) years of power for normal operations of Smart Lock 115.

Figure 7B:
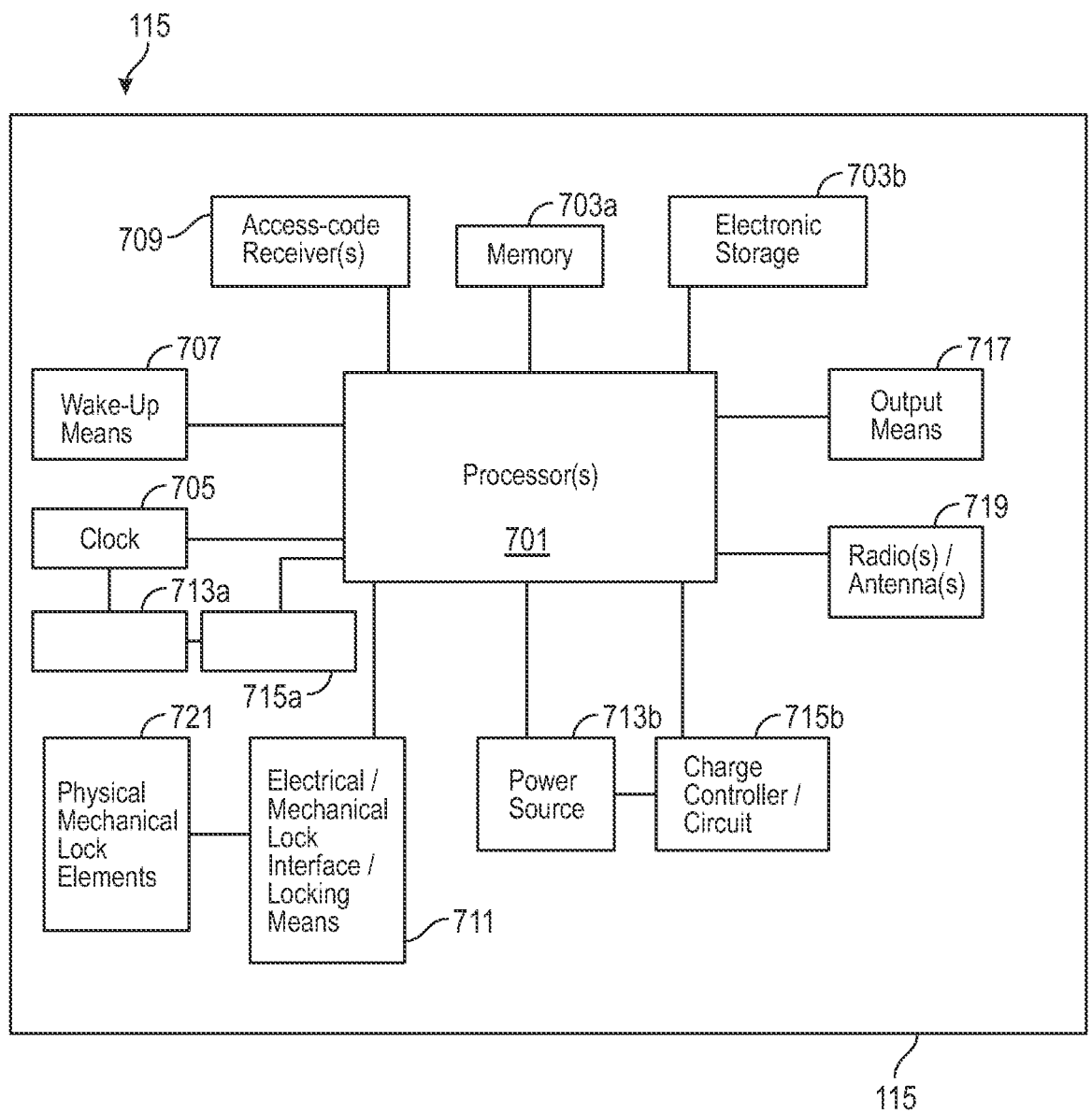
FIG. 7B depicts a block diagram of a given Smart Lock showing at least some electronic hardware and/or circuitry elements of the given Smart Lock that may comprise at least two power sources.

Now discussing FIG. 7B, in some embodiments, Power Source(s) 713 may comprise two or more batteries 713, at least one (first) dedicated battery 713*a* that may be used for long-term powering of the RTC (Clock 705) and at least one other (secondary) battery 713*b* may be used for other Smart Lock 115 electronic functions, such as, but not limited to, unlocking (or locking) of the Physical Mechanical Lock Elements 721 (via use of the electrical-mechanical-lock-interface 711). In some embodiments, the (first) dedicated battery 713*a* for RTC maintenance (powering Clock 705) may be smaller than the other (second) battery 713*b*. In some embodiments, the (first) dedicated battery 713*a* for RTC maintenance (powering Clock 705) may be non-rechargeable. In some embodiments, the (first) dedicated battery 713*a* for RTC maintenance (powering Clock 705) may be a NiCAD (NiCad) (nickel-cadmium) battery. In some embodiments, the (first) dedicated battery 713*a* for RTC maintenance (powering Clock 705) may be trickle charged from the other (second) battery 713*b* and/or may be (trickle) recharged using (wireless) energy harvesting.

In some embodiments, a battery of Smart Lock 115 may be optional and/or omitted. In some embodiments, a given Smart Lock 115 may not comprise a battery 713. In some embodiments, a given Smart Lock 115 may not comprise a battery 713 for powering of the electrical-mechanical-lock-interface 711; wherein in such situations, the electrical-mechanical-lock-interface 711 may be powered by wireless energy harvesting (e.g., a NFC arrangement with an exterior electronic device in proximity to the electrical-mechanical-lock-interface 711). In some embodiments, where Smart Lock 115 may have not battery 713, Smart Lock 115 may receive all necessary electrical power from wireless (radio wave) energy harvesting, that provide sufficient power to first reset, realign, and/or re-synchronize the RTC, as well as, providing sufficient electrical power to engage the Physical Mechanical Lock Elements 721 via the electrical-mechanical-lock-interface 711.

Continuing discussing FIG. 7A, in some embodiments, Charge Controller/Circuit 715 may be configured to optimize (or to try an optimize) power usage and/or power consumption of Smart Lock 115; to control and/or to manage different power usage modes of Smart Lock 115 (such as, but not limited to, the dormant/sleeping low power mode and the awake mode full power mode). In some embodiments, Charge Controller/Circuit 715 may be implemented as a hardware element, a circuit, as software (computer program), portions thereof, combinations thereof, and/or the like. In some embodiments, Charge Controller/Circuit 715 may work in conjunction with Wake-Up Means 707. In some embodiments, inclusion of Charge Controller/Circuit 715 may help one or more batteries of Power Source 713 to have significantly longer battery lives (as compared to a situation with no Charge Controller/Circuit 715).

In some embodiments, battery terminals and/or charging circuits of Smart Lock 115 may be configured to resist or withstand over/under voltage attacks.

Discussing FIG. 7B, in some embodiments, Smart Lock 115 may comprise two charge controllers, a first charge controller 715*a* and a second charge controller 715*b*. In some embodiments, Charge Controller/Circuit 715 may comprise first charge controller 715*a* and second charge controller 715*b*. In some embodiments, inclusion of first Charge Controller/Circuit 715*a* may help one or more first batteries of Power Source 713*a* to have significantly longer battery lives (as compared to a situation with no first Charge Controller/Circuit 715*a*). In some embodiments, second Charge Controller/Circuit 715*b* may be configured to optimize (or to try an optimize) power usage and/or power consumption of Smart Lock 115; to control and/or to manage different power usage modes of Smart Lock 115 (such as, but not limited to, the dormant/sleeping low power mode and the awake mode full power mode). In some embodiments, second Charge Controller/Circuit 715*b* may be implemented as a hardware element, a circuit, as software (computer program), portions thereof, combinations thereof, and/or the like. In some embodiments, second Charge Controller/Circuit 715*b* may work in conjunction with Wake-Up Means 707. In some embodiments, inclusion of second Charge Controller/Circuit 715*b* may help one or more second batteries of Power Source 713*b* to have significantly longer battery lives (as compared to a situation with no Charge Controller/Circuit 715*b*).

Continuing discussing FIG. 7A, in some embodiments, Output Means 717 of a given Smart Lock 115 may be one or more outputs selected from: a visual indicator; a light (such as, but not limited to, a light emitting diode [LED]); a monitor; a screen; a touchscreen; a display; a speaker; a buzzer; a beeper; a bell; a whistle; a siren; an alarm; a printer; a hardwired port (such as, but not limited to, a USB port or the like); portions thereof; combinations thereof; and/or the like. In some embodiments, Output Means 717 may be used to communicate a lock status of Smart Lock 115 (e.g., locked or unlocked), a battery status of Power Source 713, combinations thereof, and/or the like. In some embodiments, a separate but proximate secondary pick-up communication device may be monitoring Output Means 717.

Continuing discussing FIG. 7A, in some embodiments, Smart Lock 115 may comprise at least one Radio/Antenna 719. In some embodiments, Smart Lock 115 may comprise one or more Radio(s)/Antenna(s) 719. In some embodiments, Smart Lock 115 may comprise at least two Radios/Antennas 719. In some embodiments, Radio(s)/Antenna(s) 719 may be configured for remote unlocking or locking of Smart Lock 115 (such as, but not limited to, from Server 103 or from an operator/admin user device authorized by Server 103). In some embodiments, Radio(s)/Antenna(s) 719 may be configured for updating, upgrading, overriding, and/or the like of the configuration settings, providing firmware, resetting the RTC (Clock 705), and/or the like of Smart Lock 115. In some embodiments, Radio(s)/Antenna(s) 719 may be configured for reporting status of Smart Lock 115 to Server(s) 10 3 (and/or [indirectly] to User Device(s) 101/301). In some embodiments, Radio(s)/Antenna(s) 719 may be configured to periodically (and not pervasively) reporting status of Smart Lock 115 to Server(s) 103 (and/or to User Device(s) 101/301). In some embodiments, the status information of Smart Lock 115 may comprise one or more of: locked, unlocked, number of locked/unlocked cycles since last report/check, open, closed, number of open/close cycles since last report/check, battery charge status, signal strength, combinations thereof, and/or the like. In some embodiments, the periodicity of Smart Lock 115 status transmissions may be predetermined and/or selected from: once a month, twice a month, once a week, once every other week, once every other day, once per day, twice per day, three times per day, four times per day, every other hour, every hour, every thirty minutes, or some other time interval. In some embodiments, the periodicity of Smart Lock 115 status transmissions may be set at whatever interval(s) are desired and/or changed as desired. In some embodiments, Radio(s)/Antenna(s) 719 may comprise one or more radios and/or one or more antennas configured for wireless communications. In some embodiments, Processor(s) 701 may also be in communication with Radio(s)/Antenna(s) 719. Processor(s) 701 may control I/O for Radio(s)/Antenna(s) 719, depending upon the instructions that Processor(s) 701 may be processing/executing. Radio(s)/Antenna(s) 719 may permit communication between a given Smart Lock 115 and one or more of: a separate/different computer, a separate/different Smart Lock 115, a smartphone, a laptop, a tablet computer, User Device(s) 101, Other User Device(s) 301, a server (computer) (e.g., Server(s) 103), a router, a network switch, a modem, network hardware, a gateway, a hub, a hotspot, a separate/different antenna, Network 109, portions thereof, combinations thereof, and/or the like.

In some embodiments, Smart Lock 115 may comprise at least one Radio/Antenna 719 may be configured for harvesting wireless (radio wave) energy. In some embodiments, at least one Radio/Antenna 719 may be one or more electrically conductive coil(s) that are configured for harvesting wireless (radio wave) energy. In some embodiments, when a radio wave emitting source comes within vicinity of the coil(s) of at least one Radio/Antenna 719, then at least one Radio/Antenna 719 may harvest, collect, and/or receive energy, which may then be used to electrically power at least some electronics of Smart Lock 115. Such wireless energy capture and use is well-known in the computing and electronics industries and such well-known knowledge is incorporated herein (e.g., wireless smartphone charging). Electrical energy captured from at least one Radio/Antenna 719 (via a proximate NFC source) may be used to power any electronics of Smart Lock 115, such as, but not limited to, any electronics shown in FIG. 7A and/or in FIG. 7B. For example, and without limiting the scope of the present invention, even one or more of: Clock 705, Electrical/Mechanical Lock Interface/Locking Means 711, Power Source 713, battery 713*a*, and/or battery 713*b*, may be electrically powered in this manner.

Note, some embodiments of Smart Lock 115 may be without Radio(s)/Antenna(s) 719. In some embodiments of Smart Lock 115, Radio(s)/Antenna(s) 719 may be optional and/or omitted from Smart Lock 115. In some embodiments, where Radio(s)/Antenna(s) 719 may be omitted from Smart Lock 115, then Radio(s)/Antenna(s) 719 may instead be included in a secondary wireless communication device that may be proximate to Smart Lock 115 and used to monitor Smart Lock 115 (such as, but not limited to, a radio frequency enabled camera and/or motion detector or the like).

Continuing discussing FIG. 7A, in some embodiments, (optional) Radio(s)/Antenna(s) 719 may comprise one or more radios and/or antennas to facilitate wireless communications, such as, but not limited to: WiFi (Wi-Fi), ZigBee, BLE, cellular (such as, but not limited to, NB-ioT, 4G/5G), RFID, NFC, Low Power WAN (such as, but not limited to, Lo-RaWan), low power wireless near-field, combinations thereof, and/or the like. In some embodiments, Radio(s)/Antenna(s) 719 may use one or more predetermined wireless communication protocols. In some embodiments, Radio(s)/Antenna(s) 719 may comprise a network card and/or a network adapter. In some embodiments, Radio(s)/Antenna(s) 719 may be a network card and/or a network adapter.

Continuing discussing FIG. 7A, in some embodiments, (optional) Radio(s)/Antenna(s) 719 may be configured for receiving the access-code (OTP) (in which case, Radio(s)/Antenna(s) 719 may be a type of Access-Code Receiver 709). In some embodiments, (optional) Radio(s)/Antenna(s) 719 may be configured for receiving and/or transmitting locally and/or remotely an open/close command for Smart Lock 115. In some embodiments, (optional) Radio(s)/Antenna(s) 719 may be configured for receiving and/or transmitting locally and/or remotely an unlock or lock command for Smart Lock 115. In some embodiments, (optional) Radio(s)/Antenna(s) 719 may be configured for transmit health/status information periodically, but not pervasively. In some embodiments, (optional) Radio(s)/Antenna(s) 719 may be configured for local User control of Smart Lock 115; but in other embodiments, (optional) Radio(s)/Antenna(s) 719 could have nothing to do with local User control of Smart Lock 115. In some embodiments, (optional) Radio(s)/Antenna(s) 719 may be configured for remote and/or central control/monitoring of Smart Lock 115 (while still maintaining a relatively long battery life).

In some embodiments, Smart Lock 115 may not include at least one Bluetooth chipset and/or the like. In some embodiments, Radio(s)/Antenna(s) 719 may not be at least one Bluetooth chipset and/or the like. In some embodiments, Smart Lock 115 may not be configured for direct device-to-device pairing with an end user terminal device, such as, but not limited to, User Device 101, Other User Device 301, a smartphone, a laptop, a tablet computer, a smartwatch, a mobile computer, and/or the like. In some embodiments, there may be no (direct) wireless communications between Smart Lock 115 and the end-user-interface (such as, but not limited to, website, mobile app, text message, SMS, MMS, email, phone call, and/or the like). In some embodiments, Radio(s)/Antenna(s) 719 is not used to unlock Smart Lock 115.

In some embodiments, the hardware elements, electronics, circuits, portions thereof, combinations thereof, and/or the like of Smart Lock 115, such as shown in FIG. 7A, may be configured to resist or withstand over/under voltage attacks.

In some embodiments, the hardware elements, electronics, circuits, portions thereof, combinations thereof, and/or the like of Smart Lock 115 may be at least mostly (substantially) encased in a housing configured to resist or withstand EMP (electromagnetic pulse) type attacks. In some embodiments, such a housing may be comprised at least in part by a metal, metal alloy, portions thereof, combinations thereof, and/or the like.

The hardware elements, electronics, circuits, portions thereof, combinations thereof, and/or the like (such as, but not limited to, Processor(s) 701, Memory 703, Memory 703a, Electronic Storage 703b, Clock 705, Wake-Up Means 707, Access-code Receiver(s) 709, Electrical/Mechanical Lock Interface/Locking Means 711, Power Source 713, Charge Controller/Circuit 715, Output Means 717, and/or (optional) Radio(s)/Antenna(s) 719, portions thereof, combinations thereof, and/or the like) of a given Smart Lock 115, including their workings and configurations, are well known in the relevant computing and electronics industries and such information is incorporated herein by reference.

In some embodiments, Smart Lock 115 may comprise a keyed mechanical override to provide a mechanical only means of unlocking Smart Lock 115. Some embodiments of Smart Lock 115 may be without such a keyed mechanical override.

In some embodiments, Smart Lock 115 may be a physical-lock. In some embodiments, Smart Lock 115 may comprise physical-mechanical-lock-elements 721 and electronics. In some embodiments, physical-mechanical-lock-elements 721 may be configured to mechanically lock the physical-lock (Smart Lock 115). In some embodiments, the electronics of the physical-lock (Smart Lock 115) may at least comprise: at least one processor 701, at least one electronic storage member 703 (703b), electrical-mechanical-lock-interface 711, at least one access-code-receiver 709, and/or at least one power source 713. In some embodiments, additional electronics of the physical-lock (Smart Lock 115) may be shown in FIG. 7A. In some embodiments, at least one processor 701 may be configured to process (run) the predetermined hash-algorithm. In some embodiments, at least one electronic storage member 703 (703b) may be configured to non-transitorily store the predetermined hash-algorithm. In some embodiments, electrical-mechanical-lock-interface 711 may be configured to interact with the physical-mechanical-lock-elements 721 causing the physical-lock (Smart Lock 115) to unlock when certain conditions are met. In some embodiments, at least one access-code-receiver 709 may be configured to receive the access-code (OTP). In some embodiments, at least one power source 713 may be configured to at least electrically power one or more of: at least one processor 701, at least one electronic storage member 703 (703b), electrical-mechanical-lock-interface 711, and/or at least one access-code-receiver 709. In some embodiments, running on at least some of the electronics of the physical-lock (Smart Lock 115) may be the predetermined-time-interval that continuously counts down to no time remaining and then resets and starts over. In some embodiments, Clock 705 may provide the predetermined-time-interval that continuously counts down to no time remaining and then resets and starts over; whereas, in other embodiments, the predetermined-time-interval may be provided via software that is non-transitorily stored in at least one electronic storage member 703 (703b) and may be processed (run) by at least one processor 701. In some embodiments, wherein the predetermined hash-algorithm has at least one solution per each of the predetermined-time-interval that has time remaining (e.g., has not counted down to zero). In some embodiments, the certain conditions are at least receiving the access-code at the at least one access-code-receiver 709 in a timely manner such that the access-code received is the at least one solution to the predetermined hash-algorithm for a particular of the predetermined-time-internal that has time remaining (e.g., has not counted down to zero). See e.g., FIG. 7A.

In some embodiments, at least a portion of the electronics of the physical-lock (Smart Lock 115) operates in either a low-power mode (default mode) or a normal-power mode (full-power mode). In some embodiments, the electronics of the physical-lock (Smart Lock 115) may further comprise wake-up means 707 that may be configured to transition from the low-power mode to the normal-power mode upon wake-up means 707 receiving an input that exceeds a minimum predetermined threshold. See e.g., FIG. 7A.

In some embodiments, the electronics of the physical-lock (Smart Lock 115) may further comprise at least one antenna 719 or at least one radio 719. In some embodiments, at least one antenna 719 and/or at least one radio 719 may be configured to wirelessly communicate with a computer (e.g., Server 103) that is not in direct wired communication with the electronics of the physical-lock (Smart Lock 115). In some embodiments, the at least one power source 713 may comprise at least one of: a battery and/or a capacitor. See e.g., FIG. 7A.

In some embodiments, at least some of the electronics of FIG. 7A may of a same or similar type of electronics of a given Server 103 (such as, but not limited to processor(s) 701, memory 703a, electronic storage 703b, power source 713, output means 717, radio(s)/antenna(s) 719, and/or the like).

Figure 8:
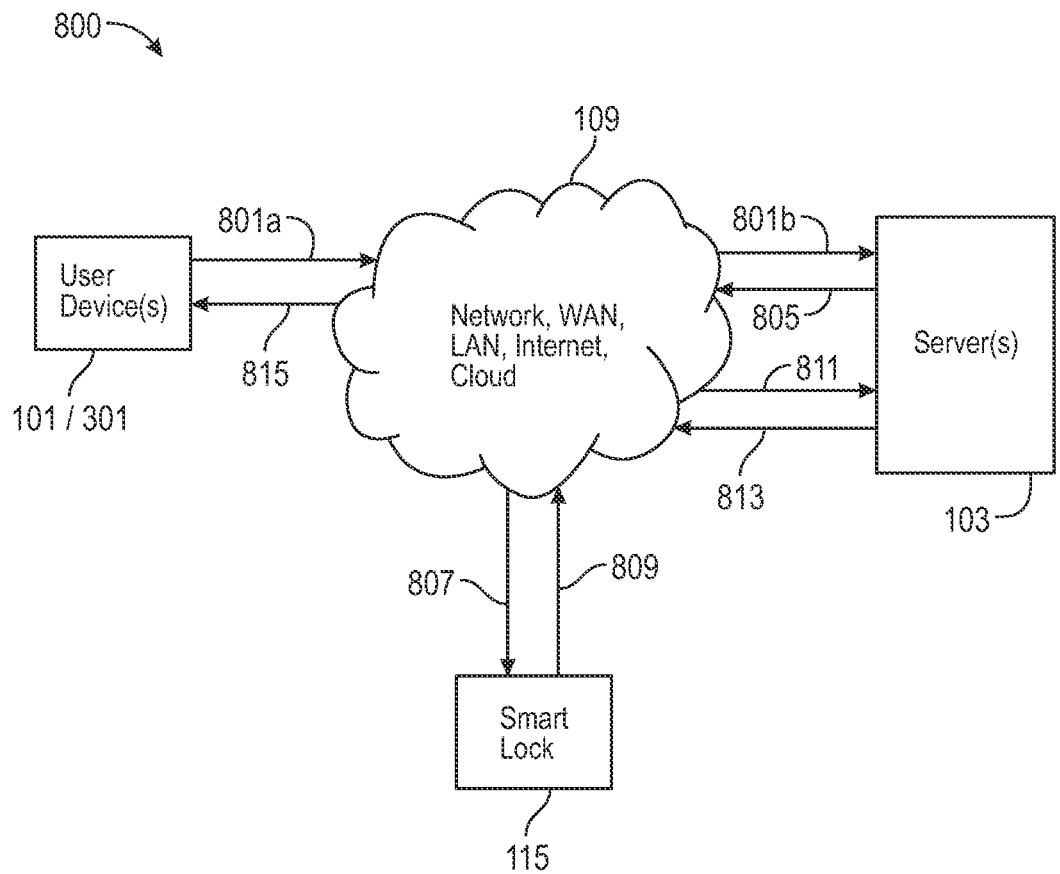
FIG. 8 depicts a block diagram showing communication pathways with respect to checking and/or reporting status of a given Smart Lock according to at least some embodiments of the present invention.

FIG. 8 depicts a block diagram showing communication pathways 800 for checking and/or reporting status of a given Smart Lock 115. In some embodiments, Smart Lock 115 may comprise (optional) Radio(s)/Antenna(s) 719 which may be configured for communications between Smart Lock 115 and Server(s) 103. In some embodiments, communications between Smart Lock 115 and Server(s) 103 may permit status information of Smart Lock 115 to be reported to (communicated to) Server(s) 103. In some embodiments, communications between Smart Lock 115 and Server(s) 103 may be at least partially routed through at least part of Network 109. In some embodiments, Server(s) 103 may provide status information of Smart Lock 115 to be communicated to User(s), Other User(s), User Device(s) 101, and/or Other User Device(s) 301. In some embodiments, the status information of Smart Lock 115 may comprise one or more of: locked, unlocked, number of locked/unlocked cycles since last report/check, open, closed, number of open/close cycles since last report/check, battery charge status, signal strength, combinations thereof, and/or the like.

Continuing discussing FIG. 8, in some embodiments, User(s) and/or Other User(s) may use User Device(s) 101 and/or Other User Device(s) 301 to send/transmit a request 801 for Smart Lock 115 status to Server(s) 103. In some embodiments, request for Smart Lock status transmission 801 may comprise content of User(s), Other User(s), User Device(s) 101, and/or Other User Device(s) 301 requesting status of a particular/given Smart Lock 115. In some embodiments, at least a portion of request for Smart Lock status transmission 801 may utilize at least a portion of Network 109. In some embodiments, a portion of request for Smart Lock status transmission 801 from User Device(s) 101/301 to Network 109 may be designated request for Smart Lock status transmission 801a; whereas, a portion of request for Smart Lock status transmission 801 from Network 109 to Server(s) 103 may be designated request for Smart Lock status transmission 801b. In some embodiments, request for Smart Lock status transmission 801 may be in at least one of the following formats: a text message from User Device(s) 101/301 to Server(s) 103; a SMS message (short message service message) from User Device(s) 101/301 to Server(s) 103; a MMS message (multimedia messaging service message) from User Device(s) 101/301 to Server(s) 103; a phone call from User Device(s) 101/301 to Server(s) 103; a sound recording; a video; an email from the User (Other User) to Server(s) 103; (optionally) from a mobile app running on User Device(s) 101/301 to Server(s) 103; (optionally) from a mobile smartphone wallet pass (or the like app) running on User De-vice(s) 101/301 to Server(s) 103; from a browser, website, web portal, and/or web interface that User Device(s) 101/301 may be using and directed to Server(s) 103; from the User De-vice(s) 101/301 to Server(s) 103; from a messaging platform associated with the User/Other User; from a messaging platform associated with the User Device 101 and/or the Other User Device 301; from a social media platform associated with the User/Other User; from a social media platform associated with the User Device 101 and/or the Other User Device 301; from software running on the User Device 101 and/or the Other User Device 301; combinations thereof; and/or the like.

Continuing discussing FIG. 8, in some embodiments, Server(s) 103 may send/transmit request for Smart Lock status transmission 805 from Server(s) 103 to Smart Lock 115. In some embodiments, request for Smart Lock status transmission 805 may comprise content of Server(s) 103 requesting status of a particular/given Smart Lock 115. In some embodiments, Server(s) 103 may cause request for Smart Lock status transmission 805 to occur based on a regular maintenance schedule that Server(s) 103 may be implementing/executing; and/or Server(s) 103 receiving an appropriate request for Smart Lock 115 status information from authorized person(s) and/or device(s). In some embodiments, authorized person(s) may comprise Users and/or Other Users that Server(s) 103 have records (accessible by Server(s) 103) of being associated, linked, and/or authorized with a particular/given Smart Lock 115 (e.g., by virtue of the at least one (unique) identifier (such as, but not limited to, a serial number [or the like]) of that Smart Lock 115); and/or authorized person(s) may comprise employees and/or independent contractor(s) of a company that may be owning, leasing, renting, controlling, managing, servicing, and/or monitoring the particular/given Smart Lock 115. In some embodiments, authorized device(s) may comprise User Devices 101 and/or Other User Devices 301, that Server(s) 103 have records (accessible by Server(s) 103) of being associated, linked, and/or authorized with a particular/given Smart Lock 115 (e.g., by virtue of a unique serial number of that Smart Lock 115). In some embodiments, at least a portion of request for Smart Lock status transmission 805 may utilize at least a portion of Network 109. In some embodiments, a portion of request for Smart Lock status transmission 805 from Server(s) 103 to Network 109 may be designated request for Smart Lock status transmission 805a; whereas, a portion of request for Smart Lock status transmission 805 from Network 109 to Smart Lock 115 may be designated request for Smart Lock status transmission 805b. In some embodiments, request for Smart Lock status transmission 805 may be in the form/format of a machine-readable communication.

In some embodiments, the Server(s) 103 sending/transmitting request for Smart Lock status transmission 805 from Server(s) 103 to Smart Lock 115 may be omitted or augmented by the Smart Lock 115 (via Radio(s)/Antenna(s) 719) automatically on a predetermined scheduled interval send/transmit the status information to Server(s) 103.

Continuing discussing FIG. 8, in some embodiments, Smart Lock 115 may send/transmit status of Smart Lock transmission 809 from Smart Lock 115 to Server(s) 103. In some embodiments, status of Smart Lock transmission 809 may comprise content of status information of that particular/given Smart Lock 115 that is sending the status transmission. In some embodiments, Smart Lock 115 may cause status of Smart Lock transmission 809 to occur based on a regular/periodic maintenance schedule that Smart Lock 115 may be implementing/executing; and/or Smart Lock 115 receiving an appropriate request for Smart Lock 115 status information from Server(s) 103 (such as, but not limited to, request for Smart Lock status transmission 805). In some embodiments, at least a portion of status of Smart Lock transmission 809 may utilize at least a portion of Network 109. In some embodiments, a portion of request for status of Smart Lock transmission 809 from Smart Lock 115 to Network 109 may be designated status of Smart Lock transmission 809a; whereas, a portion of status of Smart Lock transmission 809 from Network 109 to Server(s) 103 may be designated status of Smart Lock transmission 809b. In some embodiments, status of Smart Lock transmission 809 may be in the form/format of a machine-readable communication.

Continuing discussing FIG. 8, in some embodiments, Server(s) 103 may send/transmit status of Smart Lock transmission 813 from Server(s) 103 to (authorized) User(s), Other User(s), User Device(s) 101, and/or Other User Device(s) 301. In some embodiments, status of Smart Lock transmission 813 may comprise content of status information of a particular/given Smart Lock 115. In some embodiments, Server(s) 103 may cause status of Smart Lock transmission 813 to occur in response to an appropriate and/or authenticated request for Smart Lock status transmission 801. In some embodiments, at least a portion of status of Smart Lock transmission 813 may utilize at least a portion of Network 109. In some embodiments, a portion of request for status of Smart Lock transmission 813 from Server(s) 103 to Network 109 may be designated status of Smart Lock transmission 813a; whereas, a portion of status of Smart Lock transmission 813 from Network 109 to (authorized) User(s), Other User(s), User Device(s) 101, and/or Other User Device(s) 301 may be designated status of Smart Lock transmission 813b. In some embodiments, status of Smart Lock transmission 813 may be in at least one of the following formats: a text message from Server(s) 103 to (authorized/requesting) User Device(s) 101/301; a SMS message from Server(s) 103 to (authorized/requesting) User Device(s) 101/301; a MMS message from Server(s) 103 to (authorized/requesting) User Device(s) 101/301; a phone call from Server(s) 103 to (authorized/requesting) User Device(s) 101/301; an email from Server(s) 103 to (authorized/requesting) the User and/or the Other User; (optionally) a message from Server(s) 103 to a mobile app on User Device(s) 101/301; combinations thereof; and/or the like.

Figure 9:
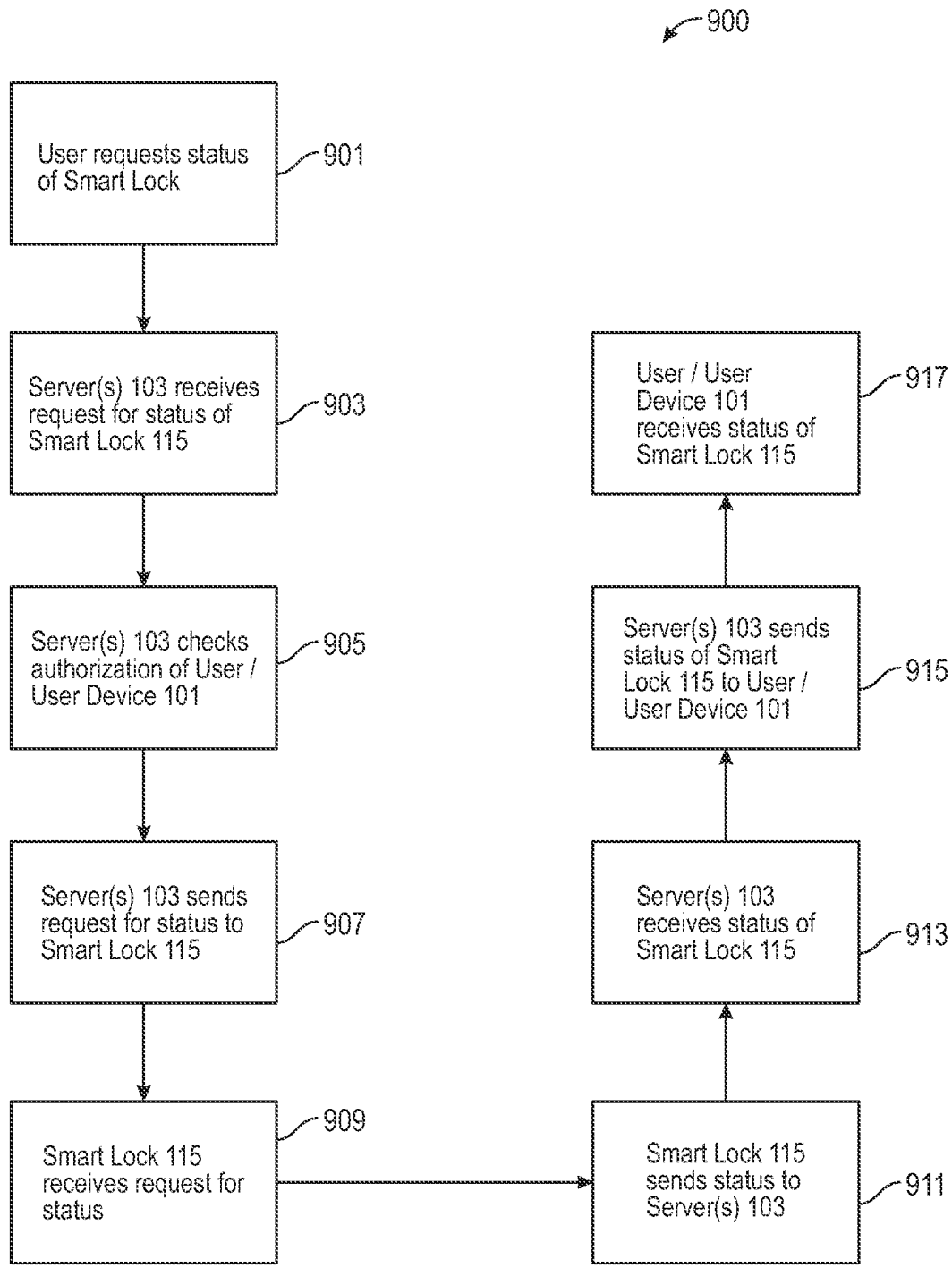
FIG. 9 depicts a method of checking and/or reporting status information of a given/particular Smart Lock.

FIG. 9 depicts a method 900 of checking and/or reporting status information of a given/particular Smart Lock 115. FIG. 9 may be applicable to the communication pathways 800 of FIG. 8. In some embodiments, FIG. 9 may show at least one step of method 900. In some embodiments, FIG. 9 may show one or more steps of method 900. In some embodiments, method 900 may comprise at least one step of: step 901, step 903, step 905, step 907, step 909, step 911, step 913, step 915, step, 917, portions thereof, combinations thereof, and/or the like. In some embodiments, method 900 may comprise one or more steps of: step 901, step 903, step 905, step 907, step 909, step 911, step 913, step 915, step, 917, portions thereof, combinations thereof, and/or the like. In some embodiments, at least some of these steps of method 900 may be executed/performed out of numerical order. In some embodiments, at least one of these steps of method 900 may be optional. In some embodiments, at least one of these steps of method 900 may be omitted and/or skipped.

Continuing discussing FIG. 9, in some embodiments, step 901 may be a step of User(s), Other User(s), User Device(s) 101, and/or Other User Device(s) 301 requesting status of a particular/given Smart Lock 115. In some embodiments, during step 901 User(s) may use User Device(s) 101 to send and/or to transmit this request for Smart Lock 115 status to Server(s) 103. In some embodiments, during step 901 Other User(s) may use Other User De-vice(s) 301 to send and/or to transmit this request for Smart Lock 115 status to Server(s) 103. In some embodiments, step 901 may entail User Device(s) 101 sending request for Smart Lock status transmission 801 to Server(s) 103. In some embodiments, step 901 may entail Other User Device(s) 301 sending request for Smart Lock status transmission 801 to Server(s) 103. In some embodiments, request for Smart Lock status transmission 801 may utilize at least a portion of Network 109. In some embodiments, step 901 and/or request for Smart Lock status transmission 801 may comprise at least one of: a text message from User Device(s) 101/301 to Server(s) 103; a SMS message (short message service message) from User Device(s) 101/301 to Server(s) 103; a MMS message (multimedia messaging service message) from User De-vice(s) 101/301 to Server(s) 103; a phone call from User Device(s) 101/301 to Server(s) 103; a sound recording; a video; a voice command; an email from the User (and/or the Other User) to Server(s) 103; (optionally) from a mobile app running on User Device(s) 101/301 to Server(s) 103; (optionally) from a mobile smartphone wallet pass (or the like app) running on User De-vice(s) 101/301 to Server(s) 103; from a browser, website, web portal, and/or web interface that User Device(s) 101/301 may be using and directed to Server(s) 103; from the User De-vice(s) 101/301 to Server(s) 103; from a messaging platform associated with the User/Other User to Server(s) 103; from a messaging platform associated with the User Device 101 and/or the Other User Device 301 to Server(s) 103; from a social media platform associated with the User/Other User to Server(s) 103; from a social media platform associated with the User Device 101 and/or the Other User Device 301 to Server(s) 103; from software running on the User Device 101 and/or the Other User Device 301 to Server(s) 103; combinations thereof; and/or the like from User Device 101/301 to Server(s) 103, wherein at least some content of the message/transmission may comprise the request for Smart Lock 115 status. In some embodiments, at least some content of the message/transmission of step 901 and/or request for Smart Lock status transmission 801 may comprise information that identifies the User, the Other User, the User Device 101, and/or the Other User Device 301 making the request and/or that includes a serial number of Smart Lock 115 that the User and/or the Other User is interested in learning status information thereof. In some embodiments, the information that identifies the User and/or the Other User may be selected from one or more of: the person's name, the person's address (e.g., physical and/or mailing address), the person's phone number, an email address of the person, combinations thereof, and/or the like. In some embodiments, the information that identifies User Device 101/301 may be selected from one or more of: a MAC address of User Device 101/301, an IP address of User Device 101/301, a serial number of User Device 101/301, SIM card information of User Device 101/301, phone number of User Device 101/301, combinations thereof, and/or the like. In some embodiments, method 900 may begin with step 901. In some embodiments, method 900 may progress from step 901 to step 903.

Continuing discussing FIG. 9, in some embodiments, step 903 may be a step of Server(s) 103 receiving the request from the User(s), Other User(s), and/or from User De-vice(s) 101/301 for status information of Smart Lock 115. In some embodiments, step 903 may be a step of Server(s) 103 receiving the request from step 901. In some embodiments, method 900 may progress from step 903 to step 905.

Continuing discussing FIG. 9, in some embodiments, step 905 may be a step of Server(s) 103 checking authorization of the step 901 request. In some embodiments, the re-quester(s) of the step 901 request may be User(s), Other Users(s), User Device(s) 101, and/or Other Device(s) 301. In some embodiments, authorized requester(s) may be User Device(s) 101, Other User Device(s) 301, User(s), and/or Other User(s) that Server(s) 103 have records (accessible by Server(s) 103) of being associated, linked, and/or authorized with a particular/given Smart Lock 115 (e.g., by virtue of a unique serial number of that Smart Lock 115). In some embodiments, in executing/performing step 905, Server(s) 103 may check (compare) content, data, and/or information of step 901 and/or request for Smart Lock status transmission 801 against a lookup table in a database that is part of Server(s) 103 and/or that is in communication with Server(s) 103. In some embodiments, if this check/comparison is in agreement, then method 900 may progress from step 905 to step 907. In some embodiments, if this check/comparison is not in agreement, then method 900 may not progress from step 905 to step 907; i.e., Server(s) 103 will not provide Smart Lock 115 status information to the re-quester(s) of step 901.

Continuing discussing FIG. 9, in some embodiments, step 907 may be a step of Server(s) 103 sending a request for status of a particular/given Smart Lock 115 to that particular/given Smart Lock 115. In some embodiments, during step 907 Server(s) 103 may send and/or may transmit request for Smart Lock status transmission 805 to a particular/given Smart Lock 115. In some embodiments, step 907 and/or request for Smart Lock status transmission 805 may utilize at least a portion of Network 109. In some embodiments, step 907 and/or request for Smart Lock status transmission 805 may be in the form/format of a machine-readable communication. In some embodiments, method 900 may begin with step 907. In some embodiments, step 901 to 905 may trigger step 907. In some embodiments, method 900 may progress from step 907 to step 909.

Continuing discussing FIG. 9, in some embodiments, step 909 may be a step of the particular/given Smart Lock 115 receiving the request for Smart Lock status transmission 805. In some embodiments, step 909 may be a step of the particular/given Smart Lock 115 receiving the request from step 907. In some embodiments, method 900 may progress from step 909 to step 911.

Continuing discussing FIG. 9, in some embodiments, step 911 may be a step of the particular/given Smart Lock 115 sending its status to Server(s) 103. In some embodiments, during step 911 the particular/given Smart Lock 115 may send and/or may transmit status of Smart Lock transmission 809 to Server(s) 103. In some embodiments, step 911 and/or status of Smart Lock transmission 809 may utilize at least a portion of Network 109. In some embodiments, step 911 and/or status of Smart Lock transmission 809 may be in the form/format of a machine-readable communication. In some embodiments, step 911 and/or status of Smart Lock transmission 809 may include and/or comprise at least some status information of particular/given Smart Lock 115. In some embodiments, method 900 may execute step 911 in response to step 909 (and/or step 907) and/or per a (predetermined) periodic/regular maintenance schedule of particular/given Smart Lock 115. In some embodiments, method 900 may begin with step 911. In some embodiments, method 900 may progress from step 911 to step 913.

In some embodiments, the Server(s) 103 sending/transmitting request for Smart Lock status transmission 805 from Server(s) 103 to Smart Lock 115 (e.g., step 907 and/or step 909) may be omitted or augmented by the Smart Lock 115 (via Radio(s)/Antenna(s) 719) automatically on a predetermined scheduled interval send/transmit the status information to Server(s) 103. In some embodiments, steps 901 to 909 may be omitted and/or skipped and method 900 may begin at step 911.

Continuing discussing FIG. 9, in some embodiments, step 913 may be a step of Server(s) 103 receiving status of the particular/given Smart Lock 115. In some embodiments, step 913 may be a step of Server(s) 103 receiving the Smart Lock 115 status information from step 911. In some embodiments, Server(s) 103 may non-transitorily store and/or archive received Smart Lock 115 status information (for later use) into one or more databases accessible by Server(s) 103. In some embodiments, method 900 may progress from step 913 to step 915. In some embodiments, method 900 may end/terminate up execution of step 913.

Continuing discussing FIG. 9, in some embodiments, step 915 may be a step of Server(s) 103 sending status information of the particular/given Smart Lock 115 to the (authorized) requester(s) of step 901. In some embodiments, step 915 may entail Server(s) 103 sending status of Smart Lock transmission 813 to the (authorized) requester(s) of step 901. In some embodiments, status of Smart Lock transmission 813 may utilize at least a portion of Network 109. In some embodiments, step 915 and/or status of Smart Lock transmission 813 may comprise a text message, a SMS message, a MMS message, an email, a phone call, combinations thereof, and/or the like from Server(s) 103 to the (authorized) requester(s) of step 901, wherein at least some content of the message/transmission may comprise the status information for the particular/given Smart Lock 115. In some embodiments, method 900 may progress from step 915 to step 917. In some embodiments, method 900 may end/terminate up execution of step 915.

Continuing discussing FIG. 9, in some embodiments, step 917 may be a step of at least one requester of step 901 receiving the sent/transmitted status information of the particular/given Smart Lock 115 that was sent/transmitted in step 915. In some embodiments, method 900 may end/terminate up execution of step 917.

Figure 10:
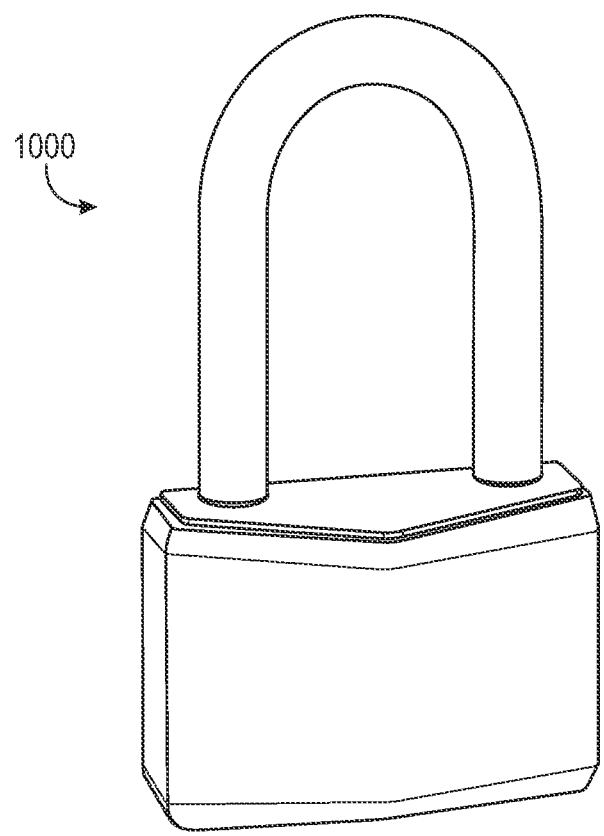
FIG. 10 may show a padlock or a shackle lock (form factor).
Figure 11:
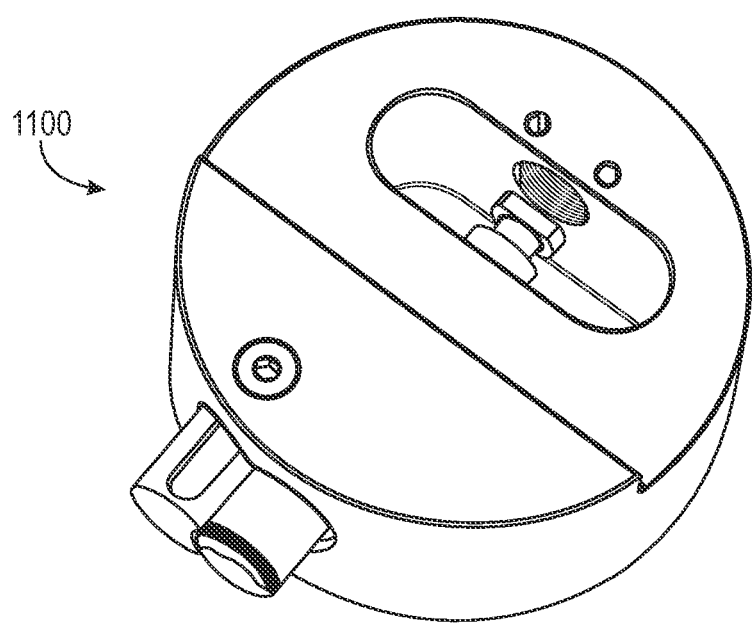
FIG. 11 may show a hidden shackle lock (form factor).
Figure 12:
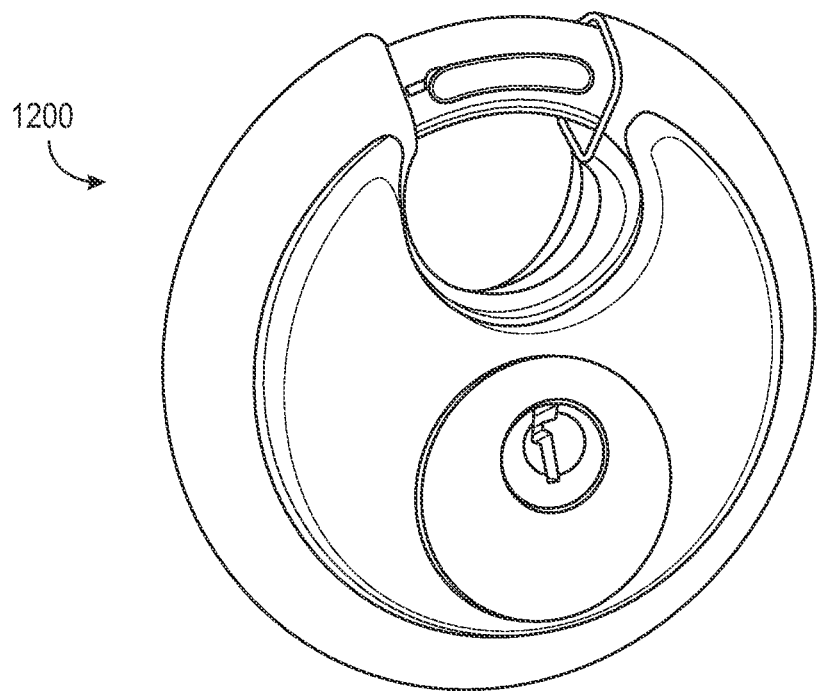
FIG. 12 may show a disc lock (form factor).
Figure 13:
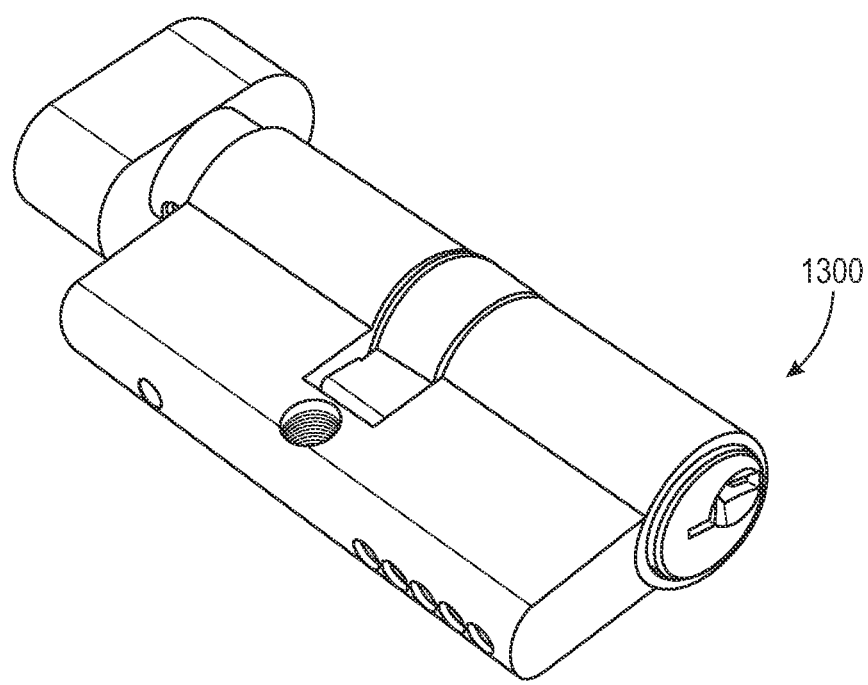
FIG. 13 may show a cylinder lock (form factor).
Figure 14:
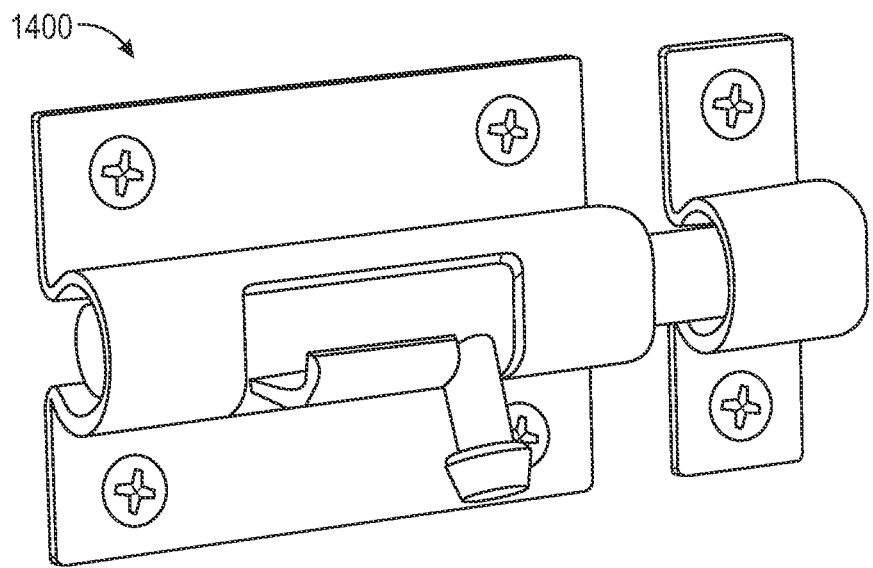
FIG. 14 may show a latch lock (form factor).
Figure 15:
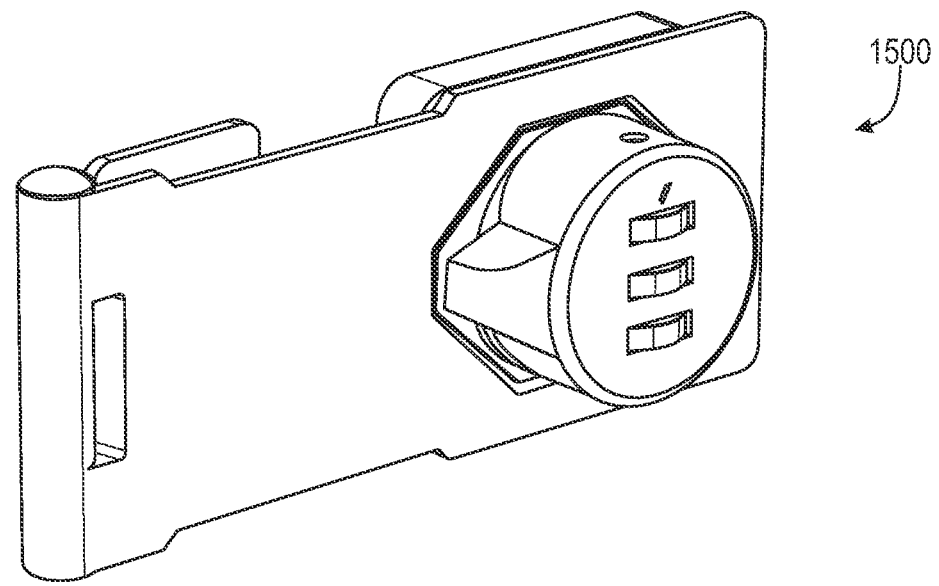
FIG. 15 may show a hasp lock (form factor).
Figure 16:
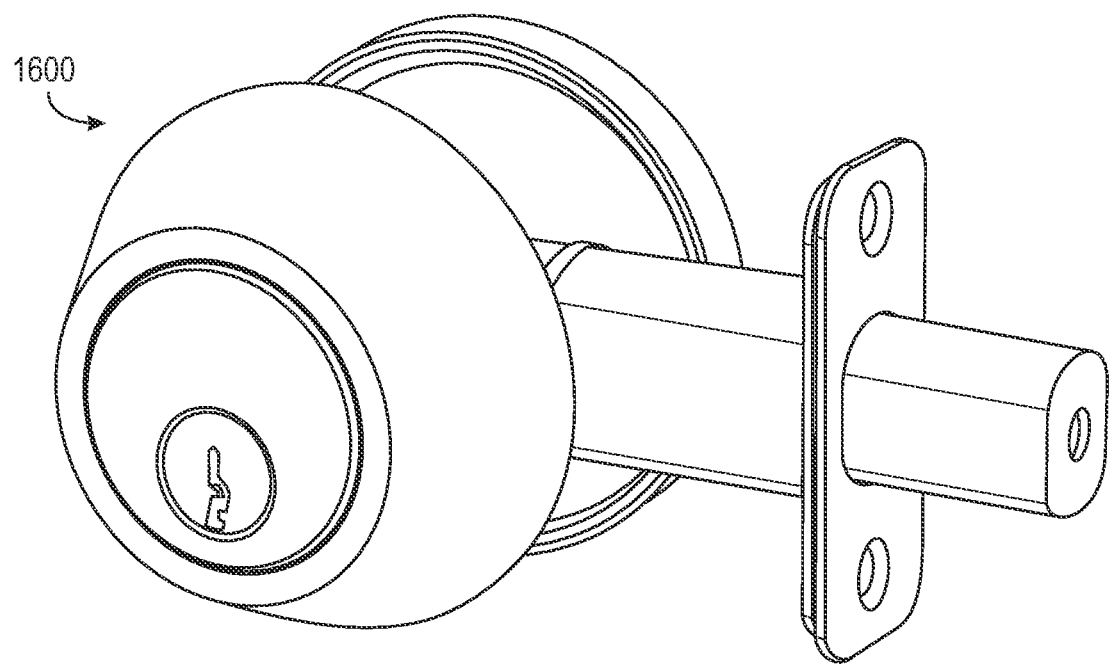
FIG. 16 may show a deadbolt lock or door lock (form factor).
Figure 17:
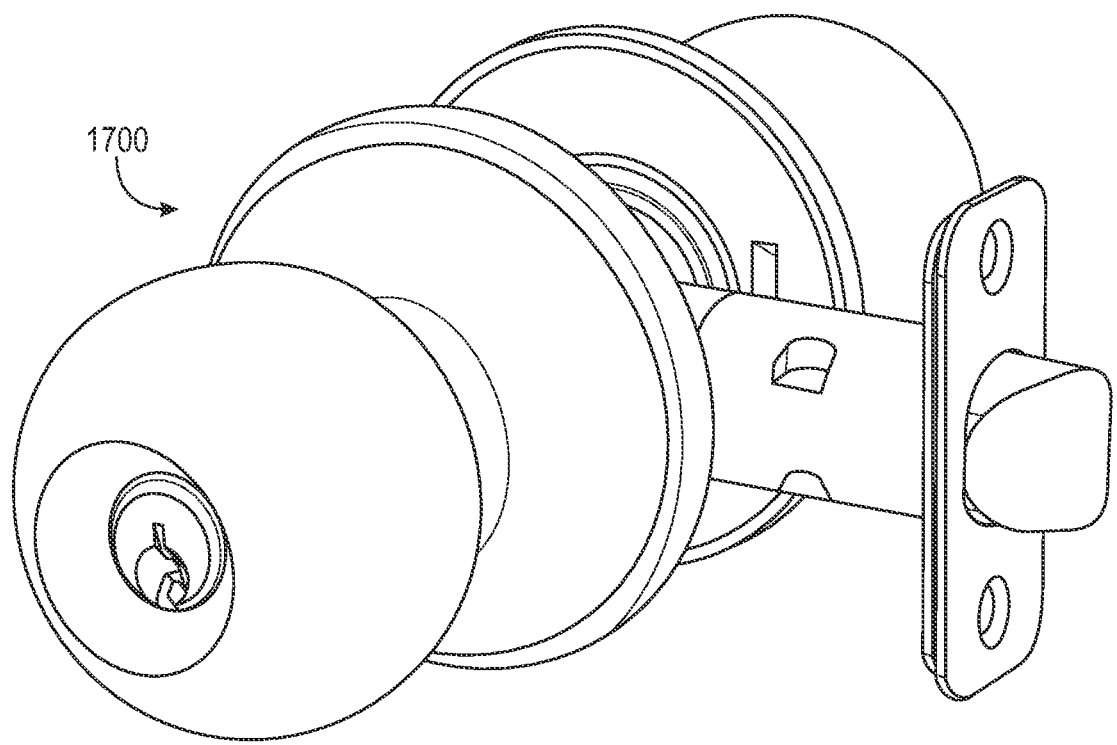
FIG. 17 may show a door knob lock (form factor).
Figure 18:
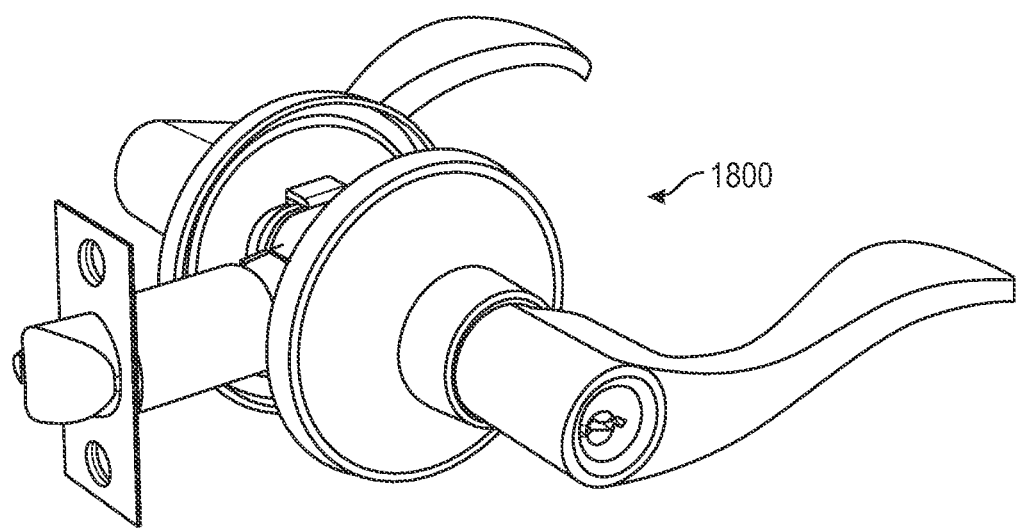
FIG. 18 may show a lever handle lock (form factor).
Figure 19:
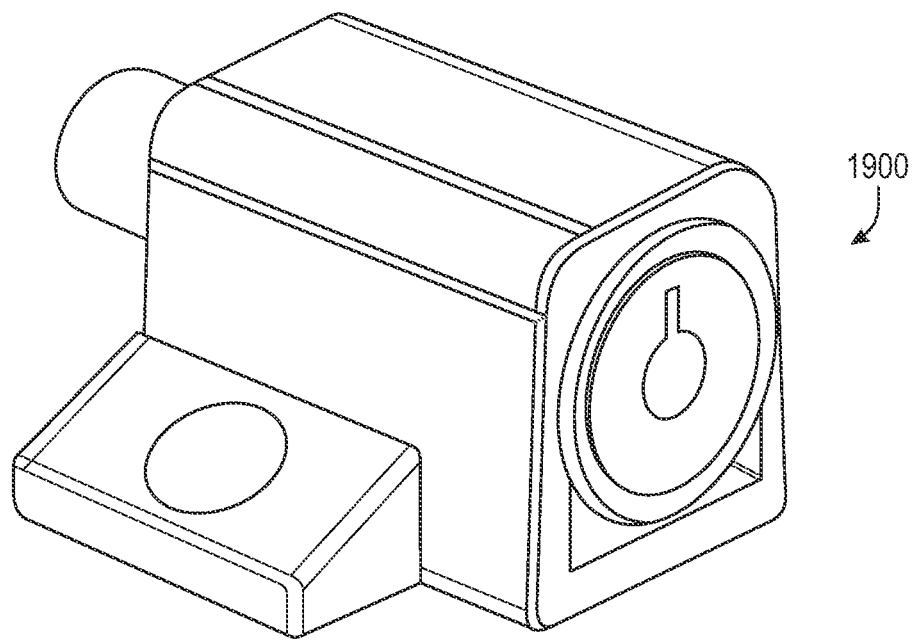
FIG. 19 may show a window lock (form factor).
Figure 20:
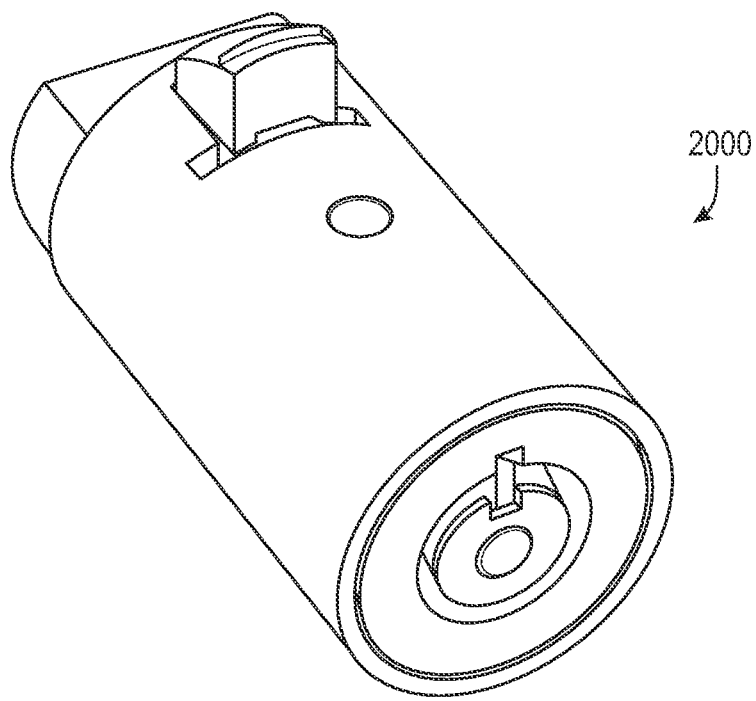
FIG. 20 may show a vending machine lock (form factor).
Figure 21:
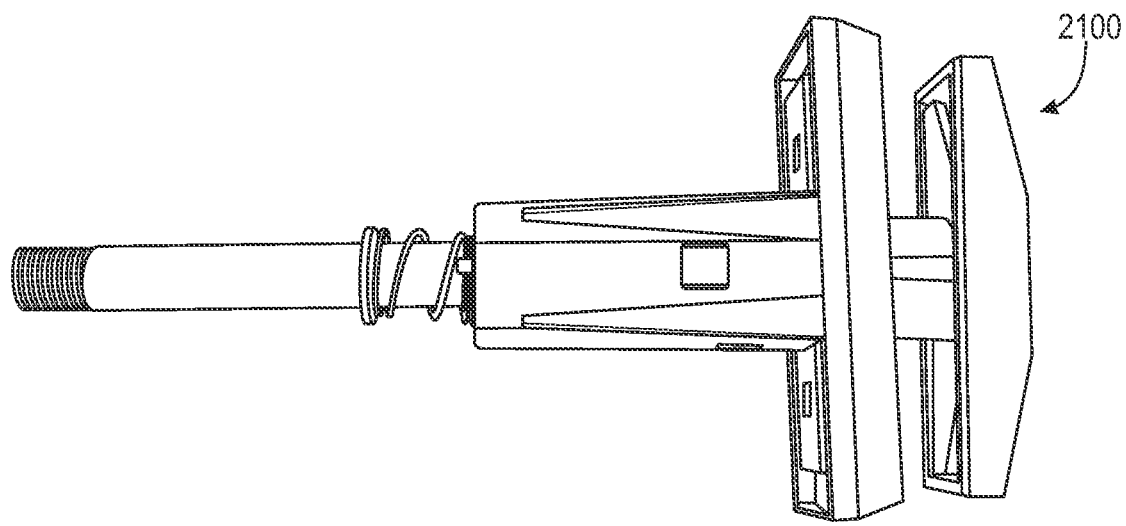
FIG. 21 may show a t-handle lock (form factor).
Figure 22:
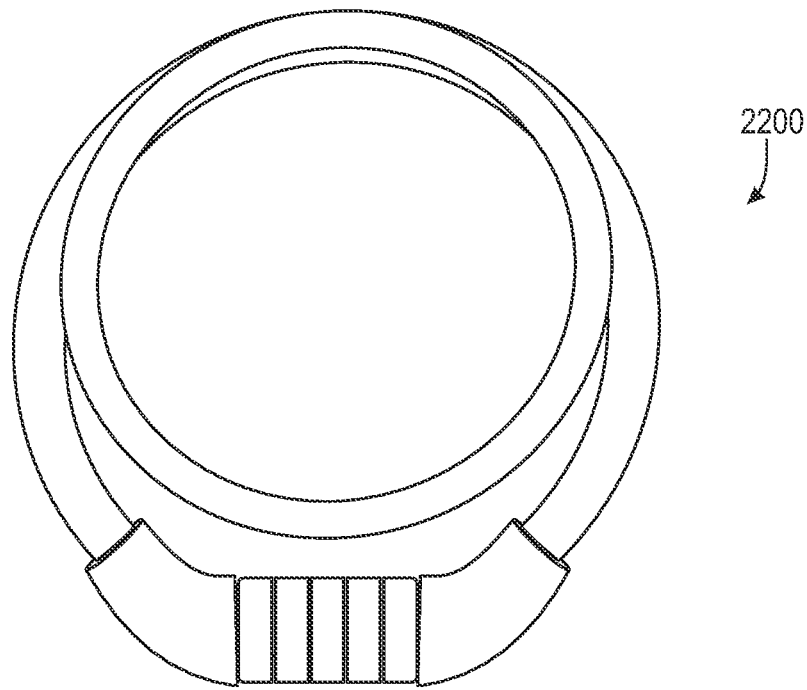
FIG. 22 may show a cable (or chain) bike lock (form factor).
Figure 23:
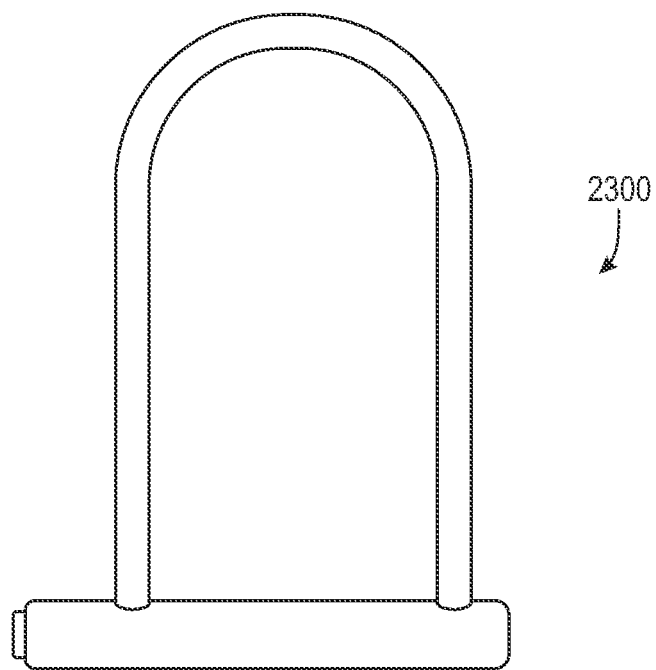
FIG. 23 may show a u-lock (form factor).
Figure 24:
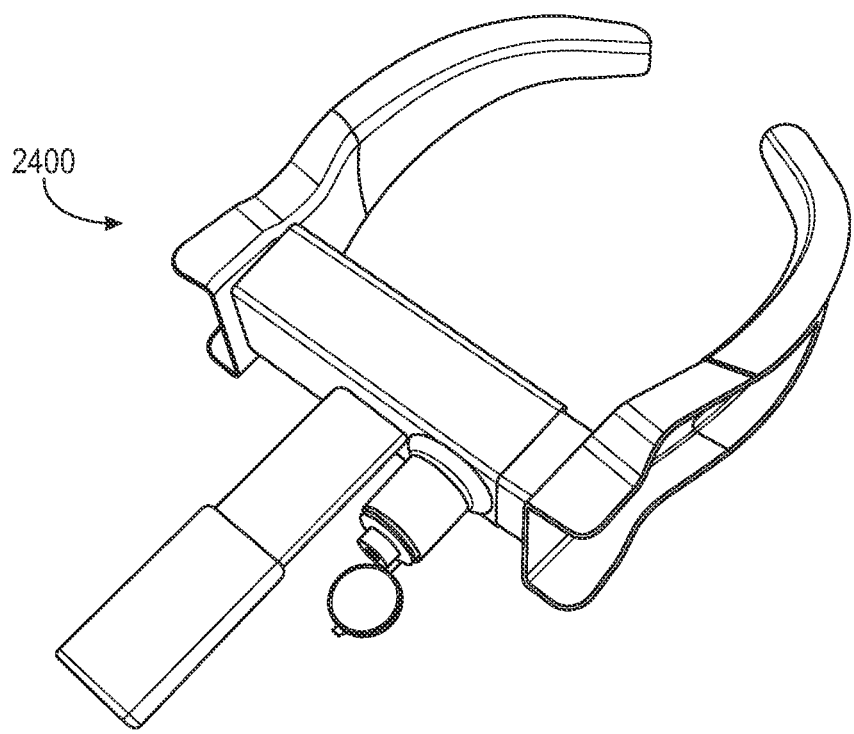
FIG. 24 may show a wheel lock (form factor).
Figure 25:
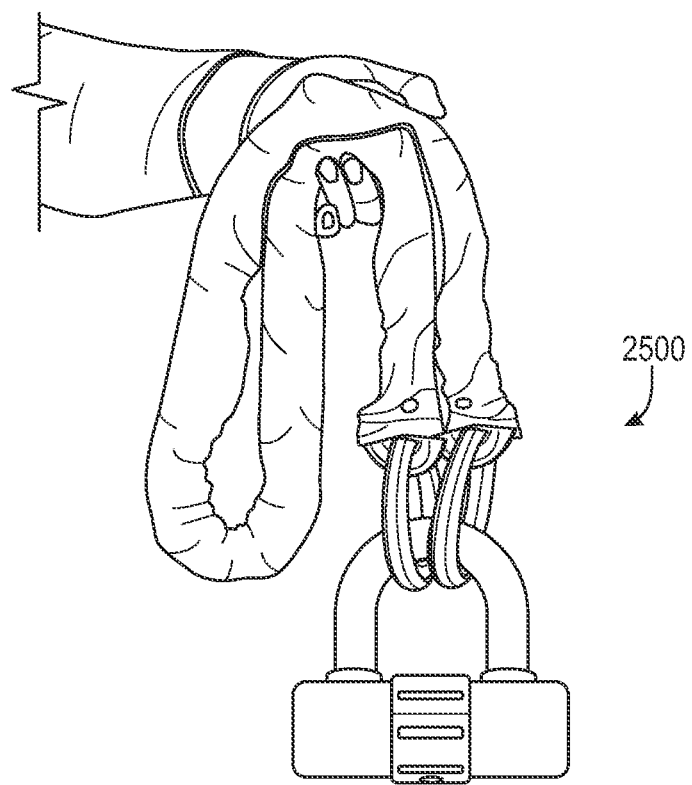
FIG. 25 may show a motorcycle lock (form factor).
Figure 26:
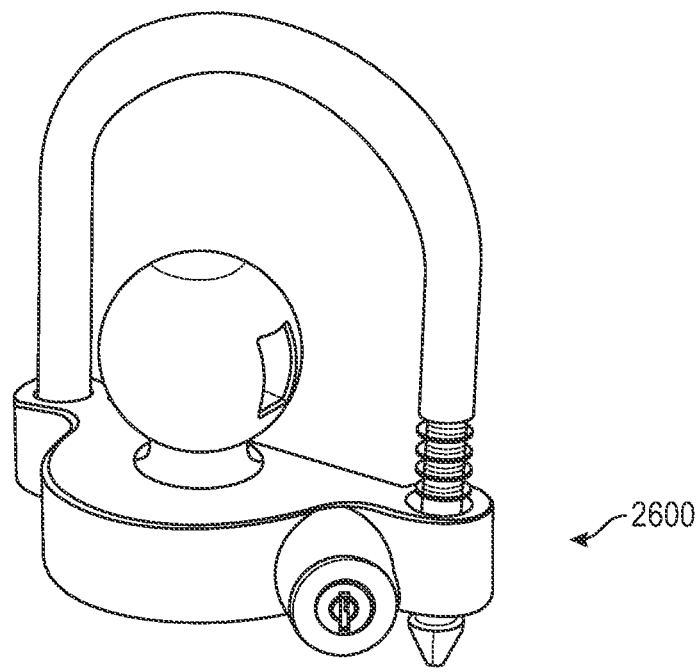
FIG. 26 may show a trailer hitch lock (form factor).
Figure 27:
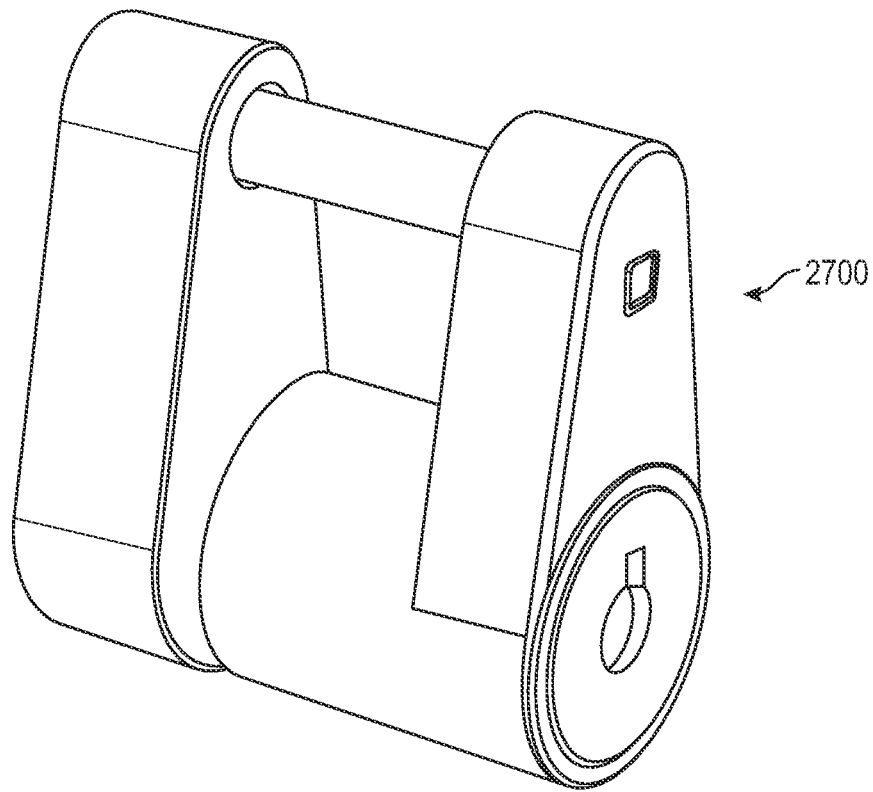
FIG. 27 may show a trailer hitch lock (form factor).
Figure 28:
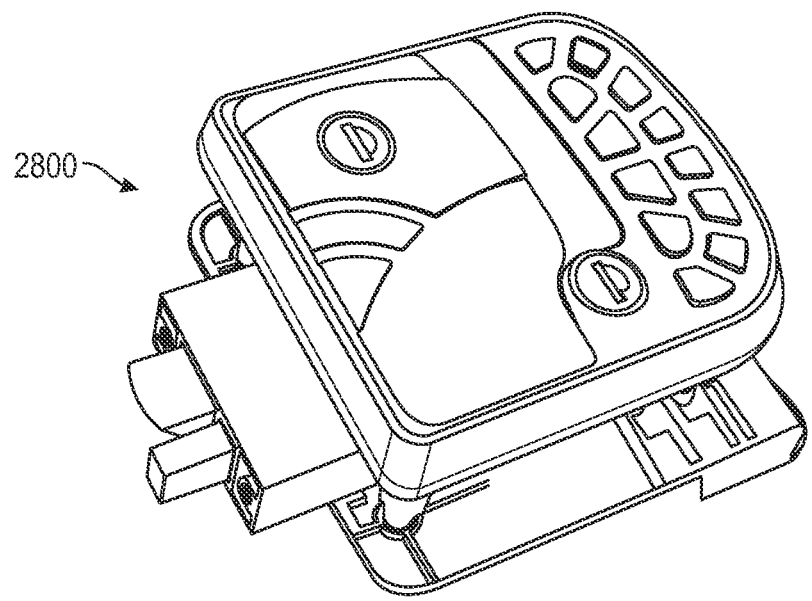
FIG. 28 may show a RV door lock (form factor).
Figure 29:
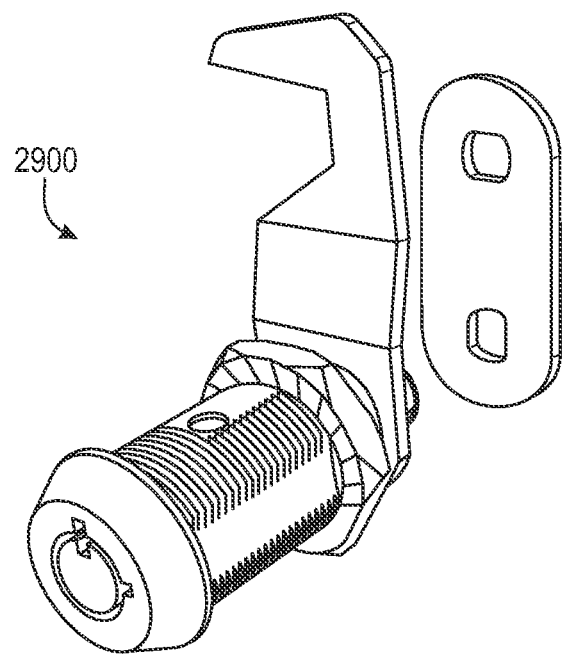
FIG. 29 may show a cabinet lock (form factor).
Figure 30:
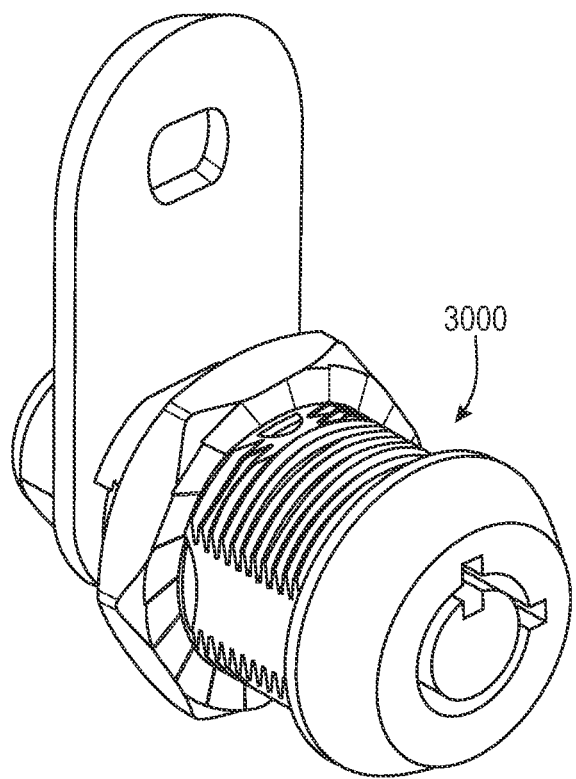
FIG. 30 may show a cabinet lock (form factor).
Figure 31:
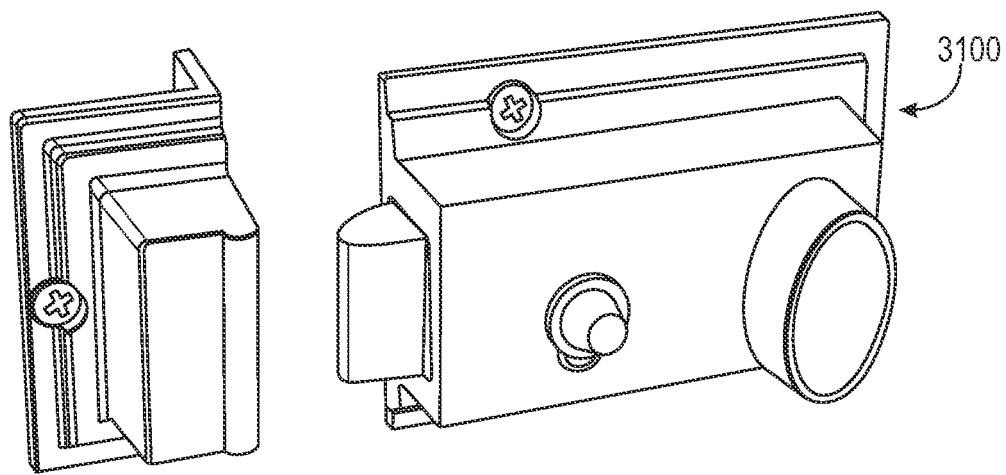
FIG. 31 may show a rim latch lock (form factor).
Figure 32:
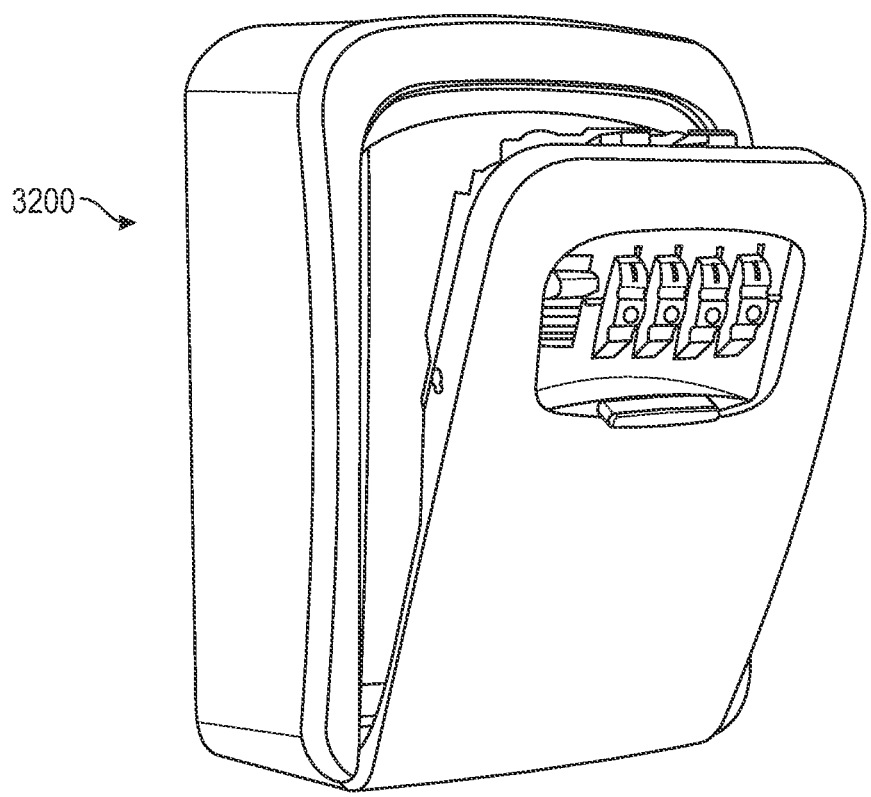
FIG. 32 may show a lock box lock (form factor).
Figure 33:
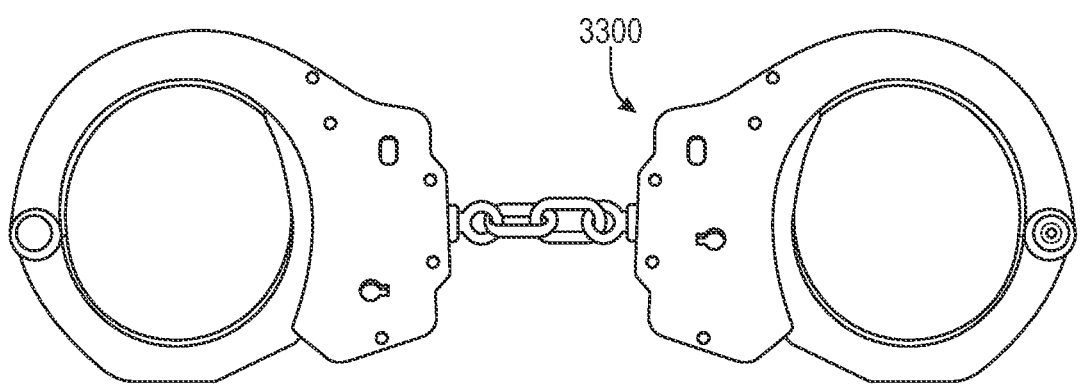
FIG. 33 may show a handcuffs lock (form factor).
Figure 34:
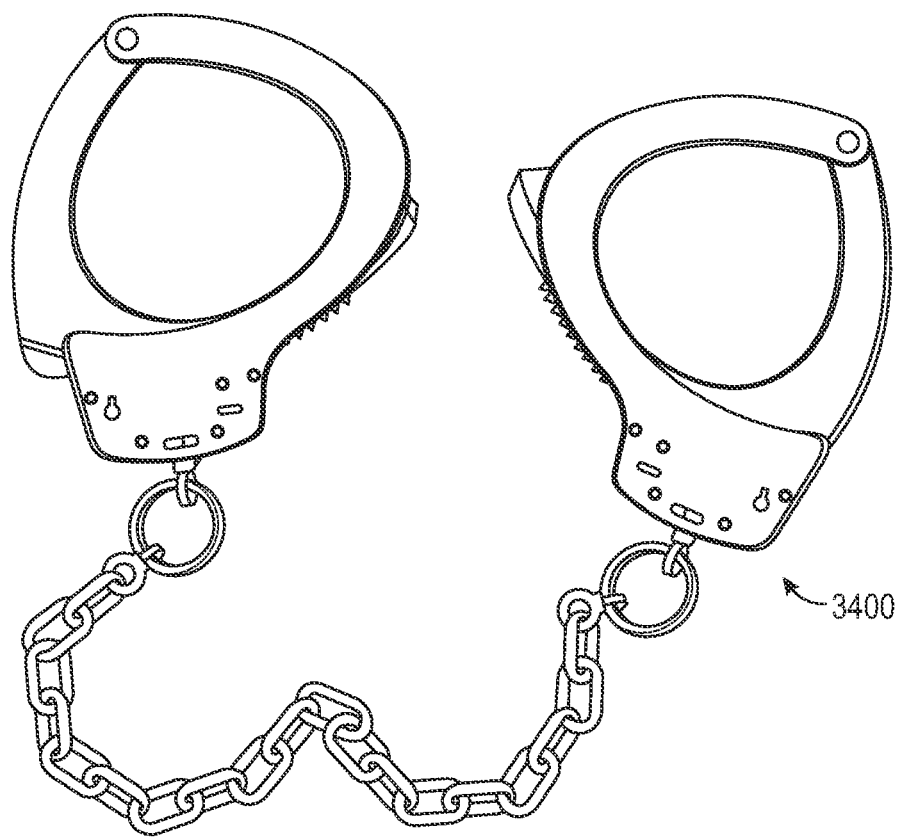
FIG. 34 may show a leg irons (leg/ankle shackle) lock (form factor).

FIG. 10 through and including FIG. 34 show Smart Lock 115 implemented in a variety of different lock form factors. FIG. 10 through and including FIG. 34 show a variety of different lock form factors that Smart Lock 115 may be at least substantially (mostly) implemented in. FIG. 10 may show a padlock or a shackle lock (form factor) 1000. FIG. 11 may show a hidden shackle lock (form factor) 1100. FIG. 12 may show a disc lock (form factor) 1200. FIG. 13 may show a cylinder lock (form factor) 1300. FIG. 14 may show a latch lock (form factor) 1400. FIG. 15 may show a hasp lock (form factor) 1500. FIG. 16 may show a deadbolt lock or door lock (form factor) 1600. FIG. 17 may show a door knob lock (form factor) 1700. FIG. 18 may show a lever handle lock (form factor) 1800. FIG. 19 may show a window lock (form factor) 1900. FIG. 20 may show a vending machine lock (form factor) 2000. FIG. 21 may show a t-handle lock (form factor) 2100. In some embodiments, t-handle locks 2100 may be used as vending machine locks. FIG. 22 may show a cable (or chain) bike lock (form factor) 2200. FIG. 23 may show a u-lock (form factor) 2300. In some embodiments, u-locks 2300 may be used as bike and/or motorcycle locks. FIG. 24 may show a wheel lock (form factor) 2400. FIG. 25 may show a motorcycle lock (form factor) 2500. FIG. 26 may show a trailer hitch lock (form factor) 2600. FIG. 27 may show a trailer hitch lock (form factor) 2700. FIG. 28 may show a RV door lock (form factor) 2800. FIG. 29 may show a cabinet lock (form factor) 2900. FIG. 30 may show a cabinet lock (form factor) 3000. FIG. 31 may show a rim latch lock (form factor) 3100. FIG. 32 may show a lock box lock (form factor) 3200. FIG. 33 may show a handcuffs lock (form factor) 3300. FIG. 34 may show a leg irons (leg/ankle shackle) lock (form factor) 3400. In some embodiments, at least some of the electronics of a given Smart Lock 115 (such as, at least some of the electronics of FIG. 7A) may be at least mostly (substantially) housed within a given housing of the various lock form factors shown in FIG. 10 through and including FIG. 34.

In some embodiments, a given Smart Lock 115 never communicates directly wirelessly, in a device-to-device manner, with a given User Device 101 and/or with a given Other User Device 301. In some embodiments, a given Smart Lock 115 never directly wirelessly transmits to, broadcasts to, and/or emits to a given User Device 101 and/or to a given Other User Device 301, aside from indicator light(s) that may shine out from that given Smart Lock 115 and/or information that may be displayed on a display of that given Smart Lock 115. In some embodiments, a given Smart Lock 115 does not broadcast, transmit, and/or emit radio wave and/or IR signals intended for receipt at a given User Device 101 and/or at a given Other User Device 301. In some embodiments, a given Smart Lock 115 is never device-to-device paired with a given User Device 101 and/or with a given Other User Device 301.

Note, in some embodiments, no end users of a given Smart Lock 115 must locally provision their User Devices 101/301 in physical proximity of the given Smart Lock 115; rather, the relationship between the given Smart Lock 115 and the end users and/or their User Devices 101/301 may be set-up centrally (from the Server 103 side). Recall, "provisioning" may be a term of art in the electronic/computing devices industry that may refer to an initial setup and configuration of a given electronic/computing device before use of the given electronic/computing device as its intended to be used. In some embodiments, neither the primary nor the secondary end users must locally provision their User Devices 101/301 in physical proximity of the given Smart Lock 115; rather, the relationship between the given Smart Lock 115 and the end users and/or their User Devices 101/301 may be set-up centrally (from the Server 103 side). In some embodiments, provisioning of a given Smart Lock 115 is done centrally from Server(s) 103 (which may also be remotely from the given Smart Lock 115 being provisioned), i.e., there is no need for local Smart Lock 115 provisioning. There is no need for a given end User Device 101/301 to be locally involved in provisioning of a given Smart Lock 115. Thus, end User Devices 101/301 do not use a mobile app for provisioning of a given Smart Lock 115. However, the end User Devices 101/301 may utilize a mobile app as a means of user interaction and/or interface (UI) with a given Smart Lock 115; however, there may be no two-way (bidirectional) wireless communication to and/or from the given Smart Lock 115 to that end User Device 101/301; rather a given end User Device 101/301 might be used to provide the access-code to the given Smart Lock 115 (but that given Smart Lock 115 does not [directly] communicate wirelessly to that end User Device 101/301); and/or status requests from a given end User Device 101/301 get routed to Server(s) 103 and then the Server(s) 103 communicate with the target Smart Lock 115; and/or the given Smart Lock 115 reports status information to the Server(s) 103 and then the Server(s) 103 might then report such status information to the given end User Device 101/301. In some embodiments, physical proximity to a given Smart Lock 115 is not necessary to generate an unlock (or lock) event.

In some embodiments, a given Smart Lock 115 may be used in a particular form factor to replace any preexisting physical lock: that used a physical key for unlocking; that used a manually entered combination (or code) for unlocking; that used an audible combination (or code) for unlocking; that received an electronic signal for unlocking; portions thereof; combinations thereof; and/or the like.

Smart Locks 115 and/or methods of unlocking those Smart Locks 115 may be used to control and manage access in a variety of different applications, such as, but not limited to: for controlling access to transient use spaces; for controlling access to self-storage units; for controlling access to warehouses; for controlling access to storage lockers; for controlling access to lockers; for controlling access to gun lockers; for controlling access to gun safes; for controlling access to safes; for controlling access to Air BNB units; for controlling access to hotel/motel/hospitality rooms; for controlling access to real estate listed for sale/lease/rent; for controlling access to a door; for controlling access to a cabinet; for controlling access to a window; for controlling access to a pick-up or drop-off locker; for controlling access to Amazon lockers; for controlling access to mobile PODs; for controlling access to, shared storage space; for controlling access in lockout situations; for controlling access to secure package drops; for bike locks; for motorcycle locks; for keeping a structure locked while returning physical keys; for controlling access to handcuffs, for controlling access to an article and/or object that may be locked; portions thereof; combinations thereof; and/or the like.

In some embodiments, these Smart Locks 115, the Server(s) 103, methods of unlocking Smart Locks 115, and/or systems of using Smart Locks 115 and Server(s) 103, may enable various cloud-based services. For example, and without limiting the scope of the present invention, such cloud-based services may comprise/include management services of the time sensitive access-codes (OTPs). Server(s) 103 may manage who and/or what devices may be authorized to receive such time sensitive access-codes (OTPs). This management of who and/or what may receive the time sensitive access-codes (OTPs) may be done for one or more active users and/or for one or more Smart Locks 115. For example, and without limiting the scope of the present invention, there may be one User and/or one User Device 101 per many Smart Locks 115; or there may be many Users and/or many User Devices 101/301 per one Smart Lock 115; or many Users and/or many User Devices 101/301 per many Smart Locks 115; combinations thereof; and/or the like. In some embodiments, the cloud-based Server(s) 103 management of who and/or what User Devices 101/301 may be authorized to receive such time sensitive access-codes (OTPs) may be distributed via centralized management, such as, but not limited to, a website, automated phone service, automated voice services, mobile wallet passes, and/or a mobile app, with centralized user and/or device management using one or more predetermined rule sets such as, but not limited to, based on time, dates, user profile, location zoning, user geofencing, combinations thereof, and/or the like. In some embodiments, where the given Smart Lock 115 may comprise Radio(s)/Antenna(s) 719, then the cloud-based server(s) 103 may also comprise/include providing status information of the given Smart Lock 115, such as, but not limited to, which users were provided access-codes (including at least one of: date, time, user information, space accessed, and/or the like), providing battery 713 life (status) information, Smart Lock 115 access activity, combinations thereof, and/or the like. In some embodiments, status information of Smart Lock 115 may also be generated/provided by use of a secondary and separate electronic device with a connection to Server(s) 103 that may be placed proximate to Smart Lock 115 and used to monitor that given Smart Lock 115.

In some embodiments, where the given Smart Lock 115 may comprise Radio(s)/Antenna(s) 719, then the (cloud-based and/or remotely located) Server(s) 103 may also comprise/include providing operational (override) control of the given Smart Lock 115, such as, but not limited to unlocking (opening) or locking (closing) that given Smart Lock 115. In some embodiments, where the given Smart Lock 115 may comprise Radio(s)/Antenna(s) 719, then the (cloud-based and/or remotely located) Server(s) 103 may also comprise/include providing updating and/or resetting of firmware, the RTC (Clock 705), configuration settings, combinations thereof, and/or the like with respect to that given Smart Lock 115.

Note, in some embodiments, even without Radio(s)/Antenna(s) 719 as being present as component hardware of a given Smart Lock 115, the (cloud-based and/or remotely located) Server(s) 103 may still be capable of providing at least some information regarding that particular Smart Lock 115, such as, but not limited to: when access information was requested, by who, when, on which date, and what time, and for what space/location, and/or the like.

In some embodiments, Smart Lock 115 may be configured to be used in one or more of the following use cases: where multi-party access is needed/desired (e.g., for locking package drops, key returns, and/or the like); for locking access doors/windows to self-storage units; for locking access doors/windows to warehouses; for locking lockers; for locking storage lockers; for locking Amazon drop-off/pick-up lockers; for locking trunks; for locking containers; for locking access doors/windows to vacant buildings; for locking access doors/windows of Air BNB rentals; for locking access doors/windows to hotel/motel rooms; for locking access doors/windows to moving trucks; for locking access doors/windows to moving storage PODs; for locking access doors/windows to cargo containers; for locking access doors/windows to shared warehousing space; for locking doors; for locking gates; for locking cabinets; for locking drawers; for locking windows; for locking valves; for locking up containers within any such controlled space (for transitory use) 101; overlocking scenarios, portions thereof; combinations thereof; and/or the like.

Beyond the non-pairing access control capability of Smart Lock 115, the remotely located Server(s) 103 associated functionality allows for the added benefit of remote access management in real-time. The systems, the methods, and Smart Lock 115 described herein provide the ability to authorize or deauthorize users within seconds. (While the access control management is active in real-time, the rolling cryptographic hash algorithm allows a previously issued access code to be active for a given predetermined amount of time [such as, but not limited to, one to twenty minutes], e.g., as may be determined by the algorithm reset period.) This can be applicable in multiple use case scenarios, as for example, in the self-storage industry, in particular, in overlock or lock out scenarios there is a critical need for real-time enabling and disabling of access management. (Note the "cloud-managed physical/mechanical combination padlocks," such as taught in U.S. utility patent 10,475, 115 can only provide near real-time enabling of access, but these "cloud-managed physical/mechanical combination padlocks" cannot provide real-time disabling of access.

In some embodiments, Smart Lock 115, systems that use Smart Lock 115, and/or methods that use Smart Lock 115 (e.g., as shown and described herein) may be used in overlock (lock out) scenarios for restricting tenant/renter access (e.g., for non-payment) to a particular property, wherein access to that particular property may be controlled by a given Smart Lock 115.

For example, and without limiting the scope of the present invention, Smart Lock 115, systems that use Smart Lock 115, and/or methods that use Smart Lock 115 (e.g., as shown and described herein) may be used in self-storage overlock (lock out) scenarios, often related to when tenants are not paying rent for the space in a timely fashion. In some embodiments, the User may be the self-storage facility operator/manager and User Device 101 may be a computing device of the self-storage facility operator/manager. In some embodiments, the Other User may be a tenant of a given self-storage unit at that given self-storage facility that the self-storage facility operator/manager operates and/or manages. In some embodiments, the Other User Device 301 may be a computing device of the tenant, such as, but not limited to, a smartphone of the tenant. The User/self-storage facility operator/manager (via their User Device 101) and whether or not the self-storage facility operator/manager is physically present at the given self-storage facility, may readily, and within seconds, authorize or deauthorize the Other Users/Other User Device 301 with respect to a given Smart Lock 115.

In other examples, the process of overlocking with a given Smart Lock 115 may be fully automated or semi-automated when the given Smart Lock 115 access software is integrated to work in conjunction with the self-storage facility property rental management software (or other point-of-sale software such as website which is connected to the facility property rental management software) that is directly and automatically connected to a tenant's property access status, which is most often related to a tenant's payment status. If the facility provides, sells, and/or requires the tenant to utilize a Smart Lock 115 for accessing tenant space or the storage unit door is already pre-outfitted with a given Smart Lock 115, then the overlocking access can automatically remove User(s) access when payment status rules are violated and/or alternatively automatically grant access to unlock when tenant completes payment. In this case, the process is fully automated. In the case of a Smart Lock 115 which is specifically purposed for overlocking, the process would be semi-automatic, as the property manager may need to physically place the Smart Lock 115 lock at a time of timely payment (or other rule) rule violation in order to restrict access. In this case, the access would be then granted automatically when tenant makes payment through the property management software and receives an access-code. In Smart Lock 115 overlock situations; there is no need for the self-storage facility operator/manager to be present; for the tenant to return any lock to the self-storage facility operator/manager; and there are none of the problems associated with a Bluetooth lock (such as, but not limited to, pairing and use of a mobile app) for that particular Smart Lock 115. Smart Lock 115 may be readily used in overlock situations.

Note, Smart Locks 115 may be used in other overlock (lock out) scenarios that are not limited to the self-storage context. That is, whenever a real-estate or property owner or manager has an overlock (lock out) need, a given Smart Lock 115 may accommodate that need. Also note, the property need not be limited to real-estate, but could be personal property, such as, but not limited to, a vehicle or chattel.

As shown and described herein, whether Smart Lock 115 is implemented as a padlock, a cylinder lock, an automated hasp/latch, other locking means, Smart Lock 115, systems that use Smart Lock 115, and/or methods that use Smart Lock 115 provide access control management that is active and in real-time via the rolling cryptographic hash algorithm that allows a previously issued access code to be active for a predetermined window of time, e.g., as determined by the algorithm reset period (which may be from one to twenty minutes in some embodiments). Smart Lock 115 may be used for normal access to a given self-storage unit but also for the self-storage facility operator/manager to (remotely) implement overlocking of that Smart Lock 115, or for self-storage facility management software to automatically implement overlocking of that Smart Lock 115, where either or, both approaches solves the problems/limitations associated with prior art overlocking in a much more optimal manner.

Note the disclosures herein regarding "unlocking" of a given Smart Lock 115 may also be applied to "locking" of the given Smart Lock 115. Note, when a given Smart Lock 115 may be in removable lock form factor as compared to the article(s) being locked, such as the case when Smart Lock 115 may be in a padlock form factor then unlocking of that Smart Lock 115 may proceed according to one or more of the methods described above using the access-code from the Server 103 and locking may be done manually by a given user. Whereas, when a given Smart Lock 115 may be in non-removable lock form factor as compared to the article(s) being locked, such as the case when Smart Lock 115 may be in a door lock form factor, where that door lock may be installed onto the given door, then locking or unlocking of that Smart Lock 115 may proceed according to one or more of the methods described above using the access-code from the Server 103; i.e., in this situation there may be desire for a user that is remote from that door to have that door locked or unlocked.

In some embodiments, a system may comprise at least one Smart Lock 115 and at least one Server 103 or the software running on at least one Server 103. In some embodiments, such a system may further comprise software running on a given end-user-device (e.g., User Device 101 and/or Other User Device 301) if that software was created by the owner (or an agent of that owner) of the software running on Server 103 that generally enables functionality, control, and/or management of Smart Locks 115.

In some embodiments, a system for remote management of Smart Locks 115 may comprise: software that is non-transitorily stored in electronic storage that is configured to be brought into memory and processed by at least one processor of at least one computer-Server 103; and at least one electromechanical-lock 115. In some embodiments, the at least one electromechanical-lock 115 is selected from the Smart Locks 115. In some embodiments, the at least one electromechanical-lock 115 may comprise: at least one unique identifier for the at least one electromechanical-lock 115; physical-mechanical-lock-elements 721 that are configured to mechanically lock and unlock the at least one electromechanical-lock 115; and electronics. In some embodiments, the electronics of the at least one electromechanical-lock 115 may comprise: at least one Processor 701 of the at least one electromechanical-lock 115 that is configured to process at least one predetermined hash-algorithm; at least one electronic storage member 703b that is configured to non-transitorily store the at least one predetermined hash-algorithm; a Clock 705 that tracks a time; at least one access-code-receiver 709 that is configured to receive at least one access-code; and an electrical-mechanical-lock-interface 711 that is configured to interact with the physical-mechanical-lock-elements 721 causing the at least one electromechanical-lock 115 to unlock or lock when certain conditions are met (such as, timely receipt of the at least one access-code at the at least one access-code-receiver 709). In some embodiments, the software (of the at least one Server 103) has access to and/or knows: the at least one identifier for the at least one electromechanical-lock 115, the at least one predetermined hash-algorithm of the at least one electromechanical-lock 115, and to the time of the at least one electromechanical-lock 115.

In some embodiments, the electronics of the at least one electromechanical-lock 115 may further comprise at least one radio 719 that is configured for wireless communications with the at least one computer-Server 103. In some embodiments, the time (of Clock 705 and that the Server 103 also knows) and/or running of the at least one predetermined hash-algorithm are synchronized between the at least one electromechanical-lock 115 and the at least one computer-Server 103, such that the software (of Server 103) is configured to provide the at least one access-code that solves the at least one predetermined hash-algorithm at any moment in time.

In some embodiments, local access control over the at least one electromechanical-lock 115 may be separated (divided) from communications between the at least one electromechanical-lock 115 and the at least one computer-server 103. In some embodiments, the separation (division) between local access control of the at least one electromechanical-lock 115 and the communications between the at least one electromechanical-lock 115 and the at least one computer-Server 103 may enable remote and/or central control of the at least one access-code from the at least one computer-Server 103. In some embodiments, the separation (division) between local access control of the at least one electromechanical-lock 115 and the communications between the at least one electromechanical-lock 115 and the at least one computer-Server 103 may enable remote and/or central distribution of the at least one access-code from the at least one computer-Server 103 to at least one authorized user and/or to at least one authorized end-user-device (e.g., User Device 101 and/or Other User Device 301). In some embodiments, our system(s), method(s), and/or Smart Locks 115 may divide the local access/control of the given Smart Lock 115 completely from the communications between the given Smart Lock 115 and Server 103; and doing so may permit synchronized central storage of unlocking code(s) and central distribution to be able to control/grant access to the given Smart Lock 115, both automatically and remotely.

In some embodiments, provisioning of the at least one electromechanical-lock 115 does not require local onsite use of an end-user-device (e.g., User Device 101 and/or Other User Device 301) with respect to the at least one electromechanical-lock. In some embodiments, provisioning of the at least one electromechanical-lock 115 does not require use of a mobile app running an end-user-device (e.g., User Device 101 and/or Other User Device 301). In some embodiments, our system(s) and/or method(s) do not require near proximity/local device provisioning of end-user-devices (e.g., User Device 101 and/or Other User Device 301) to our Smart Locks 115.

In some embodiments, the at least one electromechanical-lock 115 may be configured for overlocking use applications. In some embodiments, out system(s), method(s), and/or Smart Locks 115 permit lower manufacturing costs, lower ongoing maintenance costs, generally longer battery lives, and may be used for electronic overlocking solutions because the hardware (electronics) choices operates more reliably over time.

In some embodiments, the at least one access-code may be in the form of a QR code (or the like). In some embodiments, the software (of the at least one computer-Server 103) may provide the QR code to an authorized user and/or to an authorized end-user-device (e.g., User Device 101 and/or Other User Device 301). In some embodiments, the at least one access-code-receiver 709 may be at least a QR-code-reader (or the like). In some embodiments, use of the QR code to unlock or lock the electromechanical-lock 115 may be time-sensitive per the time kept by (and/or managed by) Clock 705. As such, the system may provide for the use of dynamically changing issued QR-codes to authorized users and/or to an authorized end-user-devices (e.g., User Devices 101 and/or Other User Devices 301), thereby avoiding the security risk associated with a QR-code "label" affixed to a lock that triggers a phone (and mobile app) to send a signal to the lock via Bluetooth (or the like). Our approach avoids the malware applied to a QR-code label issue.

In some embodiments, our system(s) and/or method(s) of using our Smart Locks 115 allow for contactless unlocking and/or locking of our Smart Locks 115, as well as unlocking and/or locking of our Smart Locks 115 without a need for a mobile app running on a user's end-user-device.

In some embodiments, our system(s) and/or method(s) of provide Smart Lock 115 functionality by the novel system architecture that utilizes dynamically changing, but synchronized, server-based/stored hashing algorithms and Clock 705 times (intervals and/or count-downs).

In some embodiment, our system(s), method(s), and/or Smart Locks 115 have full smart lock functionality but much better battery/power longevity over prior art devices by one or more RTC managements strategies as discussed above (such as, but not limited to, using two separate power-sources, one of which is dedicated to Clock 705).

In some embodiments, our system(s) and/or method(s) make baseline interface with Smart Lock 115 simple to interface with especially in controlled use transitory space applications (such as, but not limited to, self-storage units) where an end user or property manager are often not frequent users of the Smart Lock 115.

With respect to some prior art problems noted above in the background section, such as, that, "the battery powered prior art "smart" locks often have one or more of the following undesirable problems: (1) longevity friction; (2) poor sustained connectivity reliability; (3) locks that are too physically large and/or too physically bulky due to inherent size of embedded/included electronics and/or its battery; (4) too complex to install, setup, and/or use; (5) too expensive to implement and/or maintain; combinations thereof; and/or the like" and that, "The wired prior art "smart" locks generally have the same problems as the battery powered prior art "smart" locks except for the lack of longevity problem" are problems that are corrected and/or fixed by the Smart Locks 115, systems thereof, and/or methods thereof taught in this patent application.

Various Smart Locks, methods of unlocking such Smart Locks, and systems of using such Smart Locks have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of unlocking a lock, wherein the method comprises steps of:
   a step (a) of sending an access-code from at least one computer-server to at least one electronic-device;
   a step (b) of receiving the access-code at the lock;
   a step (c) of checking if the access-code is received in a timely manner at the lock and if the access-code solves a predetermined hash-algorithm running on at least some electronics of the lock; and
   a step (d) of unlocking of the lock if the access-code that was received by the lock in the step (c) was received in the timely manner and if the access-code received at the lock in step (c) solved the predetermined hash-algorithm;
   wherein also running on the at least some of the electronics is a predetermined-time-interval that continuously counts down to no time remaining and then resets and starts over;
   wherein the predetermined hash-algorithm has at least one solution per each of the predetermined-time-interval that has time remaining;
   wherein receiving the access-code at the lock is received in the timely manner, if the received access-code at the lock is the at least one solution to the predetermined hash-algorithm for a particular of the predetermined-time-interval that has not reached zero; and
   wherein the lock is a physical-lock that locks via physical-mechanical-lock-elements and that at least unlocks via a portion of the electronics interacting with the physical-mechanical-lock-elements; wherein the lock comprises the physical-mechanical-lock-elements and comprises the electronics.

2. The method according to claim 1, wherein the lock is selected from at least one of: a padlock, a disc lock, a cylinder lock, a latch lock, a hasp lock, a door lock, a window lock, a vending-machine lock, a T-handle lock, a bike lock, a motorcycle lock, a RV lock, a dead bolt, a knob lock, a door handle lock, a lever handle lock, a cam lock, a wall mounted lock, a rim latch lock, a cabinet lock, a container lock, a locker lock, a lockout lock, a handcuff lock, or a shackle lock.

3. The method according to claim 1, wherein the access-code from the step (a) is determined in a manner that the access-code is intended to unlock the lock by the at least one computer-server also running the predetermined-hash-algorithm and also running the predetermined-time-interval that continuously counts down to no time remaining and then resets and starts over, such that the at least one computer-server knows what code is capable of unlocking the lock at any point in time.

4. The method according to claim 1, wherein the at least one electronic-device is selected from at least one of: a smartphone; a tablet computer; a laptop computer; a mobile computer; a handheld compute; a smartwatch; an electronic fob; a wearable computer; a wearable electronic device; an electronic light source; an electronic speaker; or an electronic device capable of transmitting, broadcasting, emitting, showing, and/or displaying the access-code.

5. The method according to claim 1, wherein the step (a) of the sending of the access-code from the at least one computer-server to the at least one electronic-device is in a format selected from at least one of: a text message; a short message service (SMS) message; a multimedia messaging service (MMS) message; a phone call from the at least one computer-server to the at least one electronic-device; a voicemail from the at least one computer-server to the at least one electronic-device; an email from the at least one computer-server; a notification from a mobile app running on the at least one electronic-device; a phone notification displayed on the at least one electronic-device; a notification configured to be displayed on a display of the at least one electronic-device; configured for receipt in a wallet pass software running on the at least one electronic-device; configured for receipt to a website, a web portal, or a web interface that is accessed by a browser running on the at least one electronic-device; configured for receipt to software running on the at least one electronic-device; or configured for receipt at a mobile app running on the at least one electronic-device from the at least one computer-server.

6. The method according to claim 1, wherein the step (b) of the receiving of the access-code at the lock, is provided to the lock in at least one of the following manners: presenting a display of the at least one electronic-device to an access-code-receiver of the lock, wherein the access-code is displayed on the display; wirelessly broadcasting the access-code from the at least one electronic-device to the access-code-receiver of the lock; speaking the access-code to the access-code-receiver of the lock; playing the access-code to the access-code-receiver of the lock; or entering the access-code into access-code-receiver of the lock.

7. The method according to claim 1, wherein the step (b) of the receiving of the access-code at the lock, is received in at least one of the following manners: an access-code-receiver of the lock reading a display of the at least one electronic-device, wherein the access-code is displayed on the display; the access-code-receiver of the lock receiving a wireless broadcast of the access-code from the at least one electronic-device; the access-code-receiver of the lock hearing the access-code; or the access-code-receiver of the lock receiving the access-code in a manually entered manner.

8. The method according to claim 7, wherein the access-code-receiver of the lock is selected from at least one of: a camera; a QR code camera, a barcode scanner; a photo reader; a face recognition camera; an antenna; a radio; an acoustic pick-up sensor; a microphone; a keypad; a keyboard; a touchscreen; a number wheel; a combination wheel; a button; a switch; a stylus; a mouse; a trackball; a touchpad; a lever; a slide; a dial; a knob; or a means to manually enter the access-code.

9. The method according to claim 1, wherein prior to the method executing the step (a), the method comprises a step of verifying if the at least one electronic-device is authorized to receive the access-code for the lock.

10. The method according to claim 1, wherein prior to the method executing the step (a), the method comprises a step of the at least one computer-server receiving a request for the access-code from the at least one electronic-device.

11. The method according to claim 10, wherein after the method has executed the step of the at least one computer-server receiving the request for the access-code from the at least one electronic-device and before the method has executed the step (a), the method further comprises a step of verifying if the at least one electronic-device is authorized to receive the access-code for the lock.

12. The method according to claim 10, wherein the request is in a form selected from at least one of: a text message; a short message service (SMS) message; a multimedia messaging service (MMS) message; a phone call from the at least one electronic-device; an email from a user; an invitation from the at least one electronic-device, an invitation from a mobile app running on the at least one electronic-device; an invitation from a wallet pass running on the at least one electronic-device; an invitation from software running on the at least one electronic-device; or an invitation from a website, a web portal, or a web interface that the at least one electronic-device is interacting with.

13. The method according to claim 1, wherein prior to the method executing the step (a), the method comprises a step of the at least one electronic-device receiving a request for the access-code from at least one other electronic-device.

14. The method according to claim 1, wherein the step (a) further comprises sending the access-code from the at least one computer-server to the at least one electronic-device and to at least one other electronic-device.

15. The method according to claim 1, wherein the access-code comprises a command for the lock, wherein the lock is configured to act upon the command, wherein the method comprises a step of the lock executing the command after the method has executed the step (b).

16. A method of unlocking a lock, wherein the method comprises steps of:
a step (a) of sending an access-code from at least one electronic-device to at least one other electronic-device;
a step (b) of receiving the access-code at the lock;
a step (c) of checking if the access-code is received in a timely manner at the lock and if the access-code solves a predetermined hash-algorithm running on at least some electronics of the lock; and
a step (d) of unlocking of the lock if the access-code that was received by the lock in the step (c) was received in the timely manner and if the access-code received at the lock in step (c) solved the predetermined hash-algorithm;
wherein also running on the at least some of the electronics is a predetermined-time-interval that continuously counts down to no time remaining and then resets and starts over;
wherein the predetermined hash-algorithm has at least one solution per each of the predetermined-time-interval that has time remaining;
wherein receiving the access-code at the lock is received in the timely manner, if the received access-code at the lock is the at least one solution to the predetermined hash-algorithm for a particular of the predetermined-time-interval that has not reached zero; and
wherein the lock is a physical-lock that locks via physical-mechanical-lock-elements and that at least unlocks via a portion of the electronics interacting with the physical-mechanical-lock-elements; wherein the lock comprises the physical-mechanical-lock-elements and comprises the electronics.

17. The method according to claim 16, wherein prior to the method executing the step (a), the method comprises a step of the at least one electronic-device receiving a request for the access-code from the at least one other electronic-device.

18. The method according to claim 17, wherein after the method has executed the step of the at least one electronic-device receiving the request for the access-code from the at least one other electronic-device and before the method has executed the step (a), the method further comprises a step of verifying if the at least one other electronic-device is authorized to receive the access-code for the lock.

19. A physical-lock comprising:
physical-mechanical-lock-elements that are configured to mechanically lock and unlock the physical-lock; and
electronics, wherein the electronics comprises:
at least one processor that is configured to process at least one predetermined hash-algorithm;
at least one electronic storage member that is configured to non-transitorily store the at least one predetermined hash-algorithm;
electrical-mechanical-lock-interface that is configured to interact with the physical-mechanical-lock-elements causing the physical-lock to unlock or lock when certain conditions are met;
at least one access-code-receiver that is configured to receive an access-code; and at least one power source that is configured to at least electrically power one or more of: the at least one processor, the at least one electronic storage member, the electrical-mechanical-lock-interface, or the at least one access-code-receiver;

wherein running on at least some of the electronics is at least one predetermined-time-interval that continuously counts down to no time remaining and then resets and starts over;

wherein the at least one predetermined hash-algorithm has at least one solution per each of the at least one predetermined-time-interval that has time remaining;

wherein the certain conditions are at least receiving the access-code at the at least one access-code-receiver in a timely manner such that the access-code received is the at least one solution to the at least one predetermined hash-algorithm for a particular of the predetermined-time-interval that has time remaining.

20. The physical-lock according to claim 19, wherein the physical-lock comprises at least one form factor that is selected from at least one of: a padlock, a disc lock, a cylinder lock, a latch lock, a hasp lock, a door lock, a window lock, a vending-machine lock, a T-handle lock, a bike lock, a motorcycle lock, a RV lock, a dead bolt, a knob lock, a door handle lock, a lever handle lock, a cam lock, a wall mounted lock, a rim latch lock, a cabinet lock, a container lock, a locker lock, a lockout lock, a handcuff lock, or a shackle lock.

21. The physical-lock according to claim 19, wherein the at least one access-code-receiver of the physical-lock is selected from at least one of: a camera; a QR code camera, a barcode scanner; a photo reader; a face recognition camera; an antenna; a radio; an acoustic pick-up sensor; a microphone; a keypad; a keyboard; a touchscreen; a number wheel; a combination wheel; a button; a switch; a stylus; a mouse; a trackball; a touchpad; a lever; a slide; a dial; a knob; or a means to manually enter the access-code.

22. The physical-lock according to claim 19, wherein at least a portion of the electronics operates in either a low-power mode or a normal-power mode; wherein the electronics further comprises a wake-up means that is configured to transition from the low-power mode to the normal-power mode upon the wake-up means receiving a predetermined input.

23. The physical-lock according to claim 19, wherein the electronics further comprises at least one antenna or at least one radio, wherein the at least one antenna and/or the at least one radio are configured to wirelessly communicate with a computer that is not in direct wired communication with the electronics.

24. The physical-lock according to claim 19, wherein the at least one power source comprises at least one of: a battery and/or a capacitor.

25. The physical-lock according to claim 19, wherein the electronics comprises at least one clock, wherein the at least one power source comprises at least one first battery and at least one second battery, wherein the at least one first battery is configured for powering the at least one clock, and wherein the at least one second battery is configured for powering the electrical-mechanical-lock-interface.

26. The physical-lock according to claim 19, wherein the electronics comprises at least one clock and comprises at least one battery that is configured and dedicated to powering the at least one clock.

27. The physical-lock according to claim 19, wherein the at least one power source is configured for harvesting radio-waves to provide electrical power to the electrical-mechanical-lock-interface and/or to a clock, wherein the electronics comprises the clock.

28. The physical-lock according to claim 19, wherein the at least one predetermined hash-algorithm is two or more predetermined hash-algorithms, wherein the at least one predetermined-time-interval is two or more predetermined-time-intervals, such that each of the two or more predetermined hash-algorithms has one predetermined-time-interval selected from the two or more predetermined-time-intervals.

29. The physical-lock according to claim 28, wherein the two or more predetermined hash-algorithms and the two or more predetermined-time-intervals run at least partially concurrently together on the physical-lock at a same time, such that at any point in time there are at least two solutions to the two or more predetermined hash-algorithms, wherein the least two solutions are selected from the at least one solution.

30. The physical-lock according to claim 19, wherein unlocking of the physical-lock by the access-code is contactless and/or is done without use of a mobile app.

31. A system for remote management of smart locks, wherein the system comprises:
    software that is non-transitorily stored in electronic storage that is configured to be brought into memory and processed by at least one processor of at least one computer-server;
    at least one electromechanical-lock, wherein the at least one electromechanical-lock comprises:
        at least one unique identifier for the at least one electromechanical-lock;
        physical-mechanical-lock-elements that are configured to mechanically lock and unlock the at least one electromechanical-lock; and
        electronics, wherein the electronics comprises:
            at least one processor of the at least one electromechanical-lock that is configured to process at least one predetermined hash-algorithm;
            at least one electronic storage member that is configured to non-transitorily store the at least one predetermined hash-algorithm;
            a clock that tracks a time;
            at least one access-code-receiver that is configured to receive at least one access-code; and
            an electrical-mechanical-lock-interface that is configured to interact with the physical-mechanical-lock-elements causing the at least one electromechanical-lock to unlock or lock when certain conditions are met;
    wherein the software has access to: the at least one identifier for the at least one electromechanical-lock, the at least one predetermined hash-algorithm of the at least one electromechanical-lock, and to the time of the at least one electromechanical-lock;
    wherein the at least one electromechanical-lock is selected from the smart locks;
    wherein running on at least some of the electronics is at least one predetermined-time-interval that continuously counts down to no time remaining and then resets and starts over;
    wherein the at least one predetermined hash-algorithm has at least one solution per each of the at least one predetermined-time-interval that has time remaining;
    wherein the certain conditions are at least receiving the at least one access-code at the at least one access-code-receiver in a timely manner such that the at least one access-code received is the at least one solution to the at least one predetermined hash-algorithm for a particular of the predetermined-time-interval that has time remaining.

32. The system according to claim 31, wherein the electronics of the at least one electromechanical-lock further comprises at least one radio that is configured for wireless communications with the at least one computer-server.

33. The system according to claim 32, wherein the time and/or running of the at least one predetermined hash-algorithm are synchronized between the at least one electromechanical-lock and the at least one computer-server, such that the software is configured to provide the at least one access-code that solves the at least one predetermined hash-algorithm at any moment in time.

34. The system according to claim 32, wherein local access control over the at least one electromechanical-lock is separated from communications between the at least one electromechanical-lock and the at least one computer-server.

35. The system according to claim 34, wherein the separation between local access control of the at least one electromechanical-lock and the communications between the at least one electromechanical-lock and the at least one computer-server enables central control of the at least one access-code from the at least one computer-server.

36. The system according to claim 34, wherein the separation between local access control of the at least one electromechanical-lock and the communications between the at least one electromechanical-lock and the at least one computer-server enables central distribution of the at least one access-code from the at least one computer-server to at least one authorized user and/or to at least one authorized end-user-device.

37. The system according to claim 32, wherein provisioning of the at least one electromechanical-lock does not require local onsite use of an end-user-device with respect to the at least one electromechanical-lock.

38. The system according to claim 32, wherein provisioning of the at least one electromechanical-lock does not require use of a mobile app running an end-user-device.

39. The system according to claim 32, wherein the at least one electromechanical-lock is configured for overlocking lockout use applications.

40. The system according to claim 31, wherein the at least one access-code is in the form of a QR code, wherein the software provides the QR code to an authorized user and/or to an authorized end-user-device, wherein the at least one access-code-receiver is at least a QR-code-reader, wherein use of the QR code to unlock or lock the electromechanical-lock is time-sensitive per the time.

41. An electronic-device that comprises:
electronics, wherein the electronics comprises:
at least one motion sensor that is active during a lower power sleep mode of the electronic-device;
a wake-up means, wherein the wake-up means is configured to transition the electronic-device from the low power sleep mode to an awake higher power mode upon receiving detection of motion above a predetermined threshold from the at least one motion sensor;
a camera; and
at least one radio that is configured to wirelessly communicate with a computer that is not in direct wired communication with the electronic-device;
at least one power source that is configured to power at least some of the electronics;
at least one processor, wherein the at least one processor is operatively connected to the at least one motion sensor, the wake-up means, the camera, the at least one radio, and the at least one power source;
wherein the camera is turned on in the awake higher power mode;
wherein the electronic-device is not configured to be directly paired with another electronic device.

42. The electronic-device according to claim 41, wherein the electronic-device further comprises a physical-lock and also comprises physical-mechanical-lock-elements that are configured to mechanically lock and unlock the physical-lock.

\* \* \* \* \*